(12) United States Patent
Nakahiro et al.

(10) Patent No.: US 12,347,623 B2
(45) Date of Patent: Jul. 1, 2025

(54) MULTILAYER CERAMIC CAPACITOR

(71) Applicant: Murata Manufacturing Co., Ltd., Nagaokakyo (JP)

(72) Inventors: Hisashi Nakahiro, Nagaokakyo (JP); Ryo Nishimura, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 174 days.

(21) Appl. No.: 17/828,491

(22) Filed: May 31, 2022

(65) Prior Publication Data

US 2022/0392709 A1 Dec. 8, 2022

(30) Foreign Application Priority Data

Jun. 7, 2021 (JP) .................. 2021-095377

(51) Int. Cl.
 *H01G 4/30* (2006.01)
 *H01G 4/008* (2006.01)
 *H01G 4/012* (2006.01)
 *H01G 4/12* (2006.01)

(52) U.S. Cl.
 CPC .............. *H01G 4/30* (2013.01); *H01G 4/008* (2013.01); *H01G 4/012* (2013.01); *H01G 4/12* (2013.01)

(58) Field of Classification Search
 CPC .......... H01G 4/30; H01G 4/012; H01G 4/008; H01G 4/1227; H10G 4/12
 USPC ............. 361/301.4, 311, 321.1, 321.4, 321.5
 See application file for complete search history.

(56) References Cited

U.S. PATENT DOCUMENTS

| | | | |
|---|---|---|---|
| 7,099,141 B1 * | 8/2006 | Kaufman | H01G 2/14 361/275.1 |
| 2011/0141660 A1 | 6/2011 | Jeong et al. | |
| 2017/0154732 A1 | 6/2017 | Morita | |
| 2020/0211774 A1 * | 7/2020 | Onodera | H01G 4/248 |
| 2020/0234880 A1 * | 7/2020 | Kim | H01G 4/012 |

FOREIGN PATENT DOCUMENTS

| | | | |
|---|---|---|---|
| JP | 62-16142 A | | 1/1987 |
| JP | 64-80011 A | | 3/1989 |
| JP | 2009266980 A | * | 11/2009 |
| JP | 2011-124529 A | | 6/2011 |

OTHER PUBLICATIONS

Official Communication issued in corresponding Chinese Patent Application No. 202210433321.5, mailed on Jun. 21, 2024, 7 pages.

* cited by examiner

*Primary Examiner* — Arun Ramaswamy
(74) *Attorney, Agent, or Firm* — Keating & Bennett, LLP

(57) ABSTRACT

A multilayer ceramic capacitor includes a multilayer body including laminated dielectric layers and laminated internal electrode layers on the dielectric layers, and external electrodes connected to the internal electrode layers. The multilayer body further includes an inner layer portion, a first main surface-side outer layer portion, and a second main surface-side outer layer portion. At least one of the first main surface-side outer layer portion or the second main surface-side outer layer portion includes a discharge path along a plane perpendicular or substantially perpendicular to the lamination direction to discharge a chemical element to outside of the multilayer body.

21 Claims, 36 Drawing Sheets

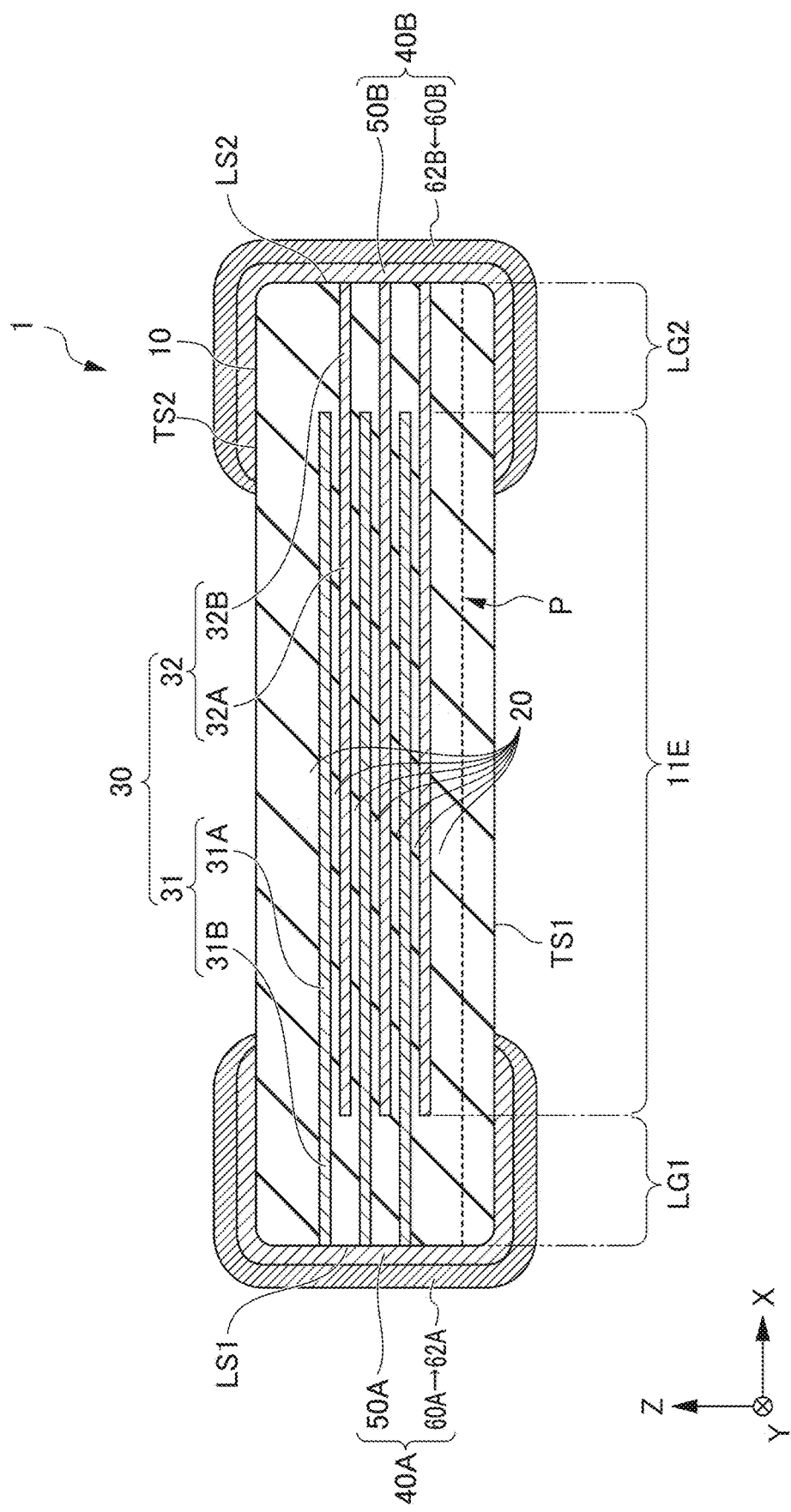

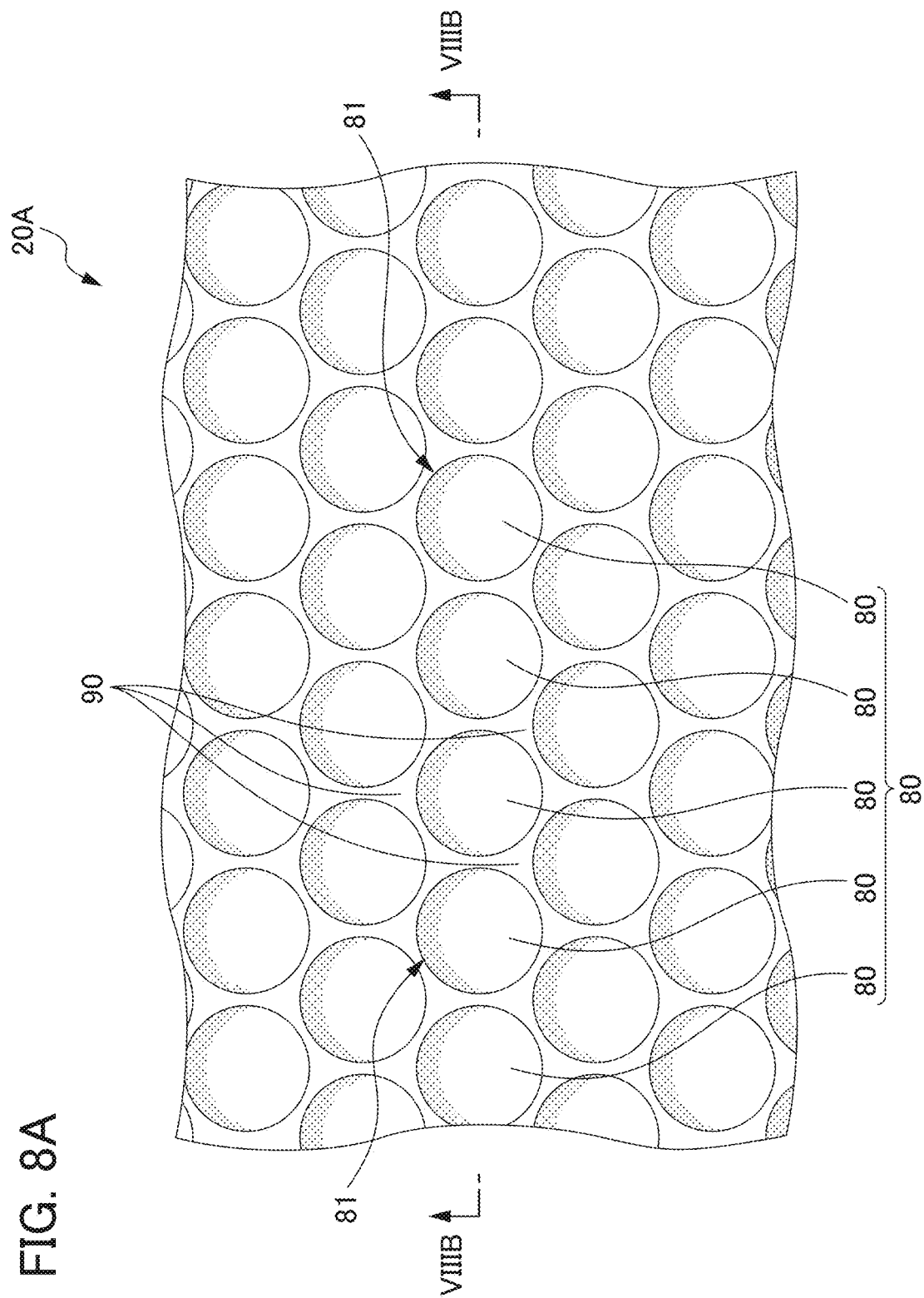

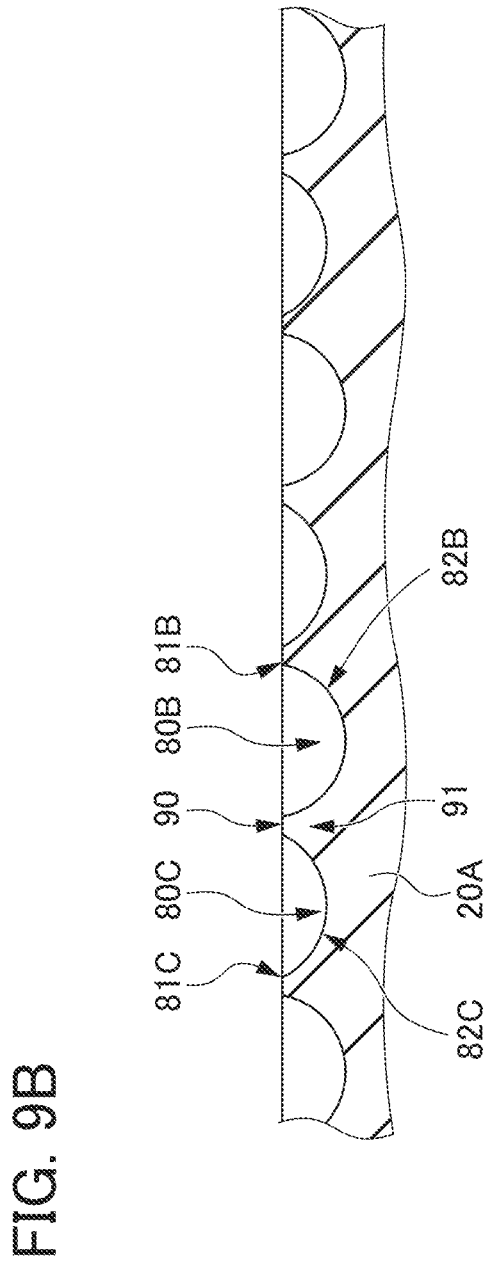

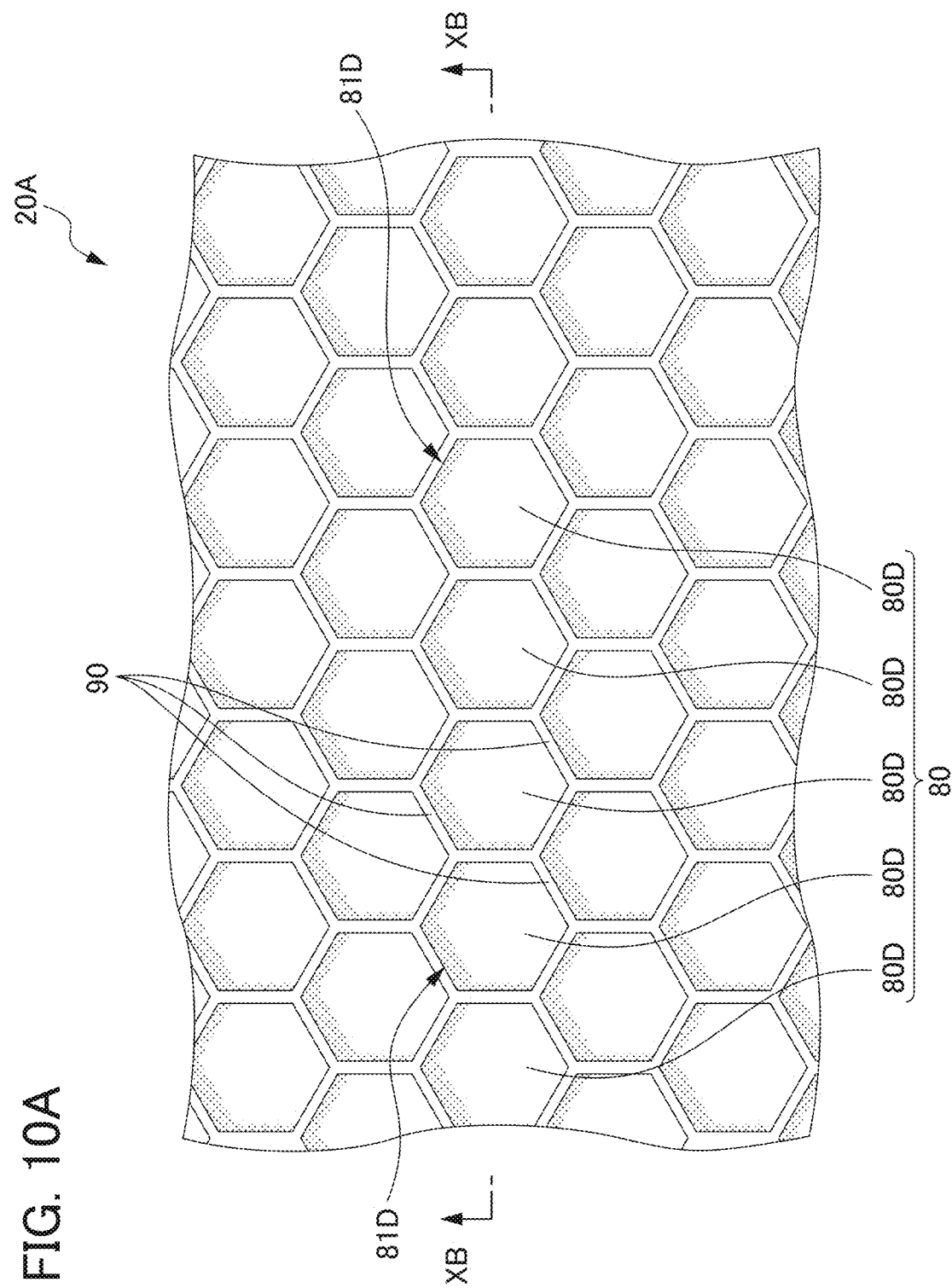

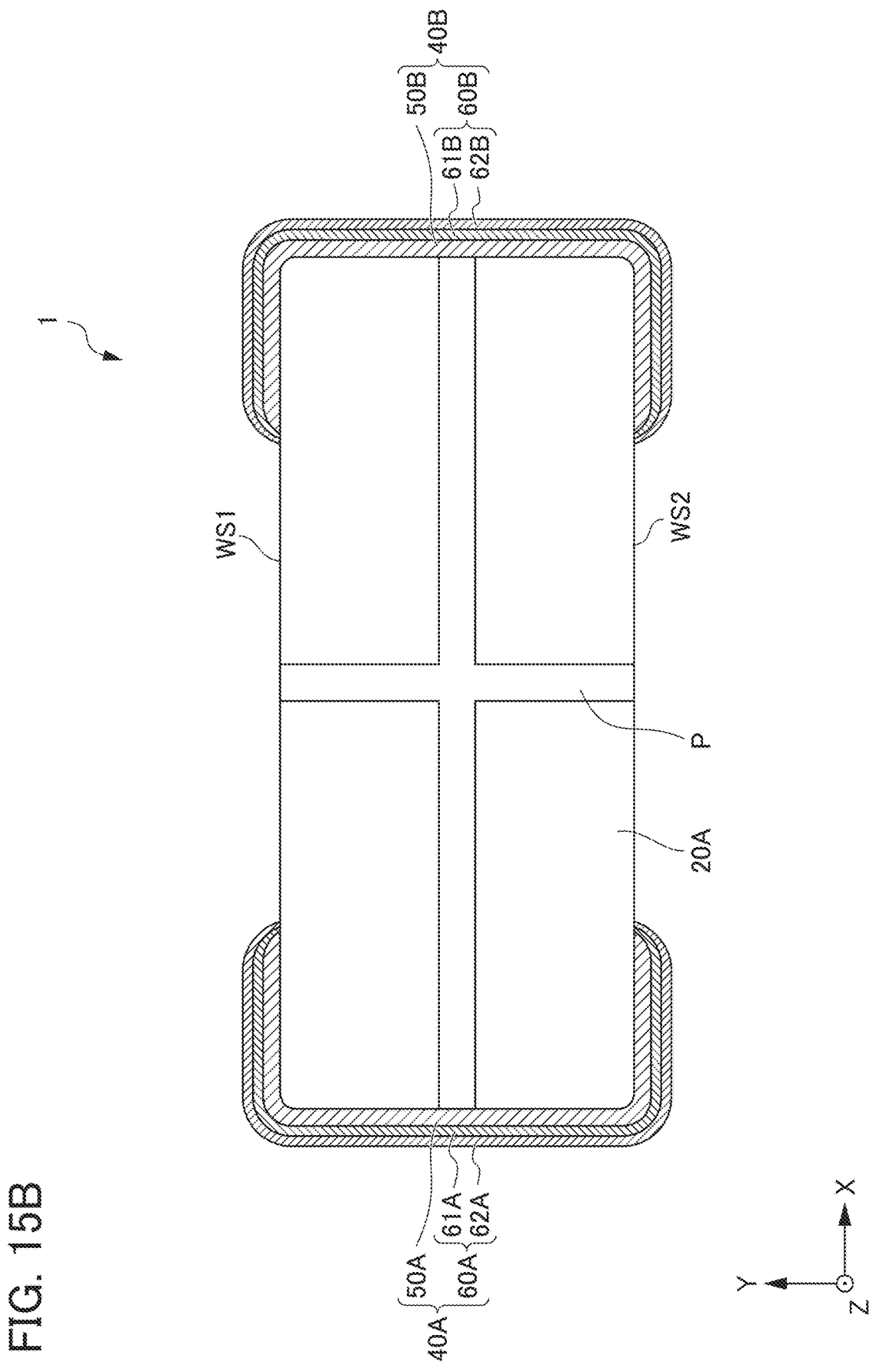

MULTILAYER CERAMIC CAPACITOR

CROSS REFERENCE TO RELATED APPLICATIONS

This application claims the benefit of priority to Japanese Patent Application No. 2021-095377 filed on Jun. 7, 2021. The entire contents of this application are hereby incorporated herein by reference.

BACKGROUND OF THE INVENTION

1. Field of the Invention

The present invention relates to a multilayer ceramic capacitor.

2. Description of the Related Art

A multilayer ceramic capacitor includes a multilayer body and a pair of external electrodes. In the multilayer body, a plurality of dielectric layers and a plurality of internal electrodes are laminated alternately. The pair of external electrodes are each provided on the surface of the multilayer body and electrically connected with the internal electrodes extending on the surface of the multilayer body. Japanese Unexamined Patent Application Publication No. H01-80011 discloses the following problem in that, in such a multilayer ceramic capacitor, when hydrogen is occluded in the internal electrodes, since the hydrogen gradually reduces the surrounding dielectric layers, the insulation resistance is deteriorated. Japanese Unexamined Patent Application Publication No. H01-80011 discloses a solution to this problem by adding Ni, which is a metal that reduces hydrogen-absorption, to the internal electrodes when the internal electrodes including a precious metal as a main component, such as a Ag—Pd alloy, is used.

In recent years, in order to reduce the material cost, not a precious metal such as Ag or Pd, but rather a base metal such as Ni is often used as the material of the internal electrodes. In this regard, Japanese Unexamined Patent Application Publication No. H01-80011 describes that Ni is a "metal that inactivates the absorption of hydrogen". However, according to research by the inventors of preferred embodiments of the present invention, even when Ni is used for the internal electrodes, it has been discovered that the insulation resistance is deteriorated by the influence of hydrogen. Therefore, in order to avoid a problem such as deterioration of the insulation resistance due to the multilayer ceramic capacitor being likely to contain hydrogen, it is desirable to reduce the absolute amount of hydrogen contained in the multilayer ceramic capacitor.

SUMMARY OF THE INVENTION

Preferred embodiments of the present invention provide multilayer ceramic capacitors that are each able to reduce or prevent deterioration of an insulation resistance.

A multilayer ceramic capacitor according to a preferred embodiment of the present invention includes a multilayer body including a plurality of laminated dielectric layers, and a plurality of laminated internal electrode layers on the dielectric layers, the multilayer body further includes a first main surface and a second main surface which oppose each other in a lamination direction, a first end surface and a second end surface which oppose each other in a length direction perpendicular or substantially perpendicular to the lamination direction, and a first side surface and a second side surface which oppose each other in a width direction perpendicular or substantially perpendicular to the lamination direction and the length direction, and external electrodes connected to the internal electrode layers, the multilayer body further includes an inner layer portion including, in the lamination direction, internal electrode layers from an internal electrode layer located closest to the first main surface to an internal electrode layer located closest to the second main surface among the plurality of internal electrode layers, the plurality of internal electrode layers opposing each other with the dielectric layers interposed therebetween in the inner layer portion, a first main surface-side outer layer portion including a plurality of dielectric layers located between the first main surface and an internal electrode layer located closest to the first main surface among the plurality of internal electrode layers, and a second main surface-side outer layer portion including a plurality of dielectric layers located between the second main surface and an internal electrode layer located closest to the second main surface among the plurality of internal electrode layers, wherein at least one of the first main surface-side outer layer portion or the second main surface-side outer layer portion includes a discharge path along a plane perpendicular or substantially perpendicular to the lamination direction to discharge a chemical element to outside of the multilayer body.

According to preferred embodiments of the present invention, it is possible to provide multilayer ceramic capacitors that are each able to reduce or prevent deterioration of an insulation resistance.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 5B is an LT cross-sectional view showing a multilayer ceramic capacitor when a plated layer includes a Sn plated layer alone, and corresponding to FIG. 2.

FIG. 8A is an enlarged view of the VIIIA portion in FIG. 7, and is an enlarged view schematically showing a microscopic state in a planar view of a surface of a first dielectric layer.

FIG. 9B is a diagram of an example of another configuration of a plurality of recesses on the surface of the first dielectric layer, and corresponding to FIG. 8B.

FIG. 10A is a diagram of an example of another configuration of a plurality of recesses on the surface of the first dielectric layer, and corresponding to FIG. 8A.

FIG. 15B is an LW cross-sectional view taken along a plane where a discharge path P is provided, in the multilayer ceramic capacitor of the fourth modified example of the first preferred embodiment of the present invention, and corresponding to FIG. 7.

DETAILED DESCRIPTION OF THE PREFERRED EMBODIMENTS

Preferred embodiments of the present invention and modifications thereto are described in details below with reference to the drawings.

First Preferred Embodiment

Figure 1:
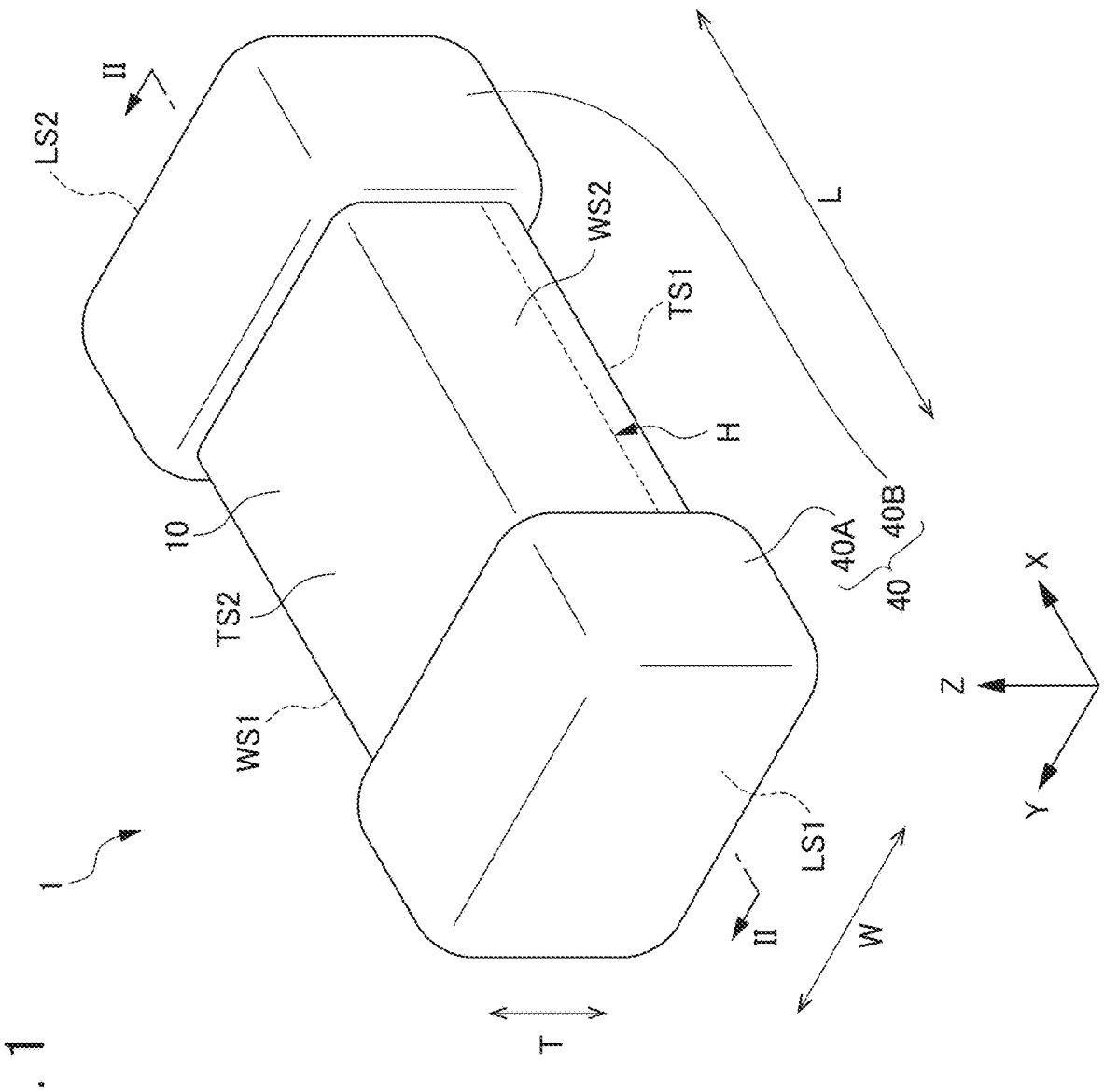
FIG. 1 is an external perspective view of a multilayer ceramic capacitor according to a first preferred embodiment of the present invention.
Figure 2:
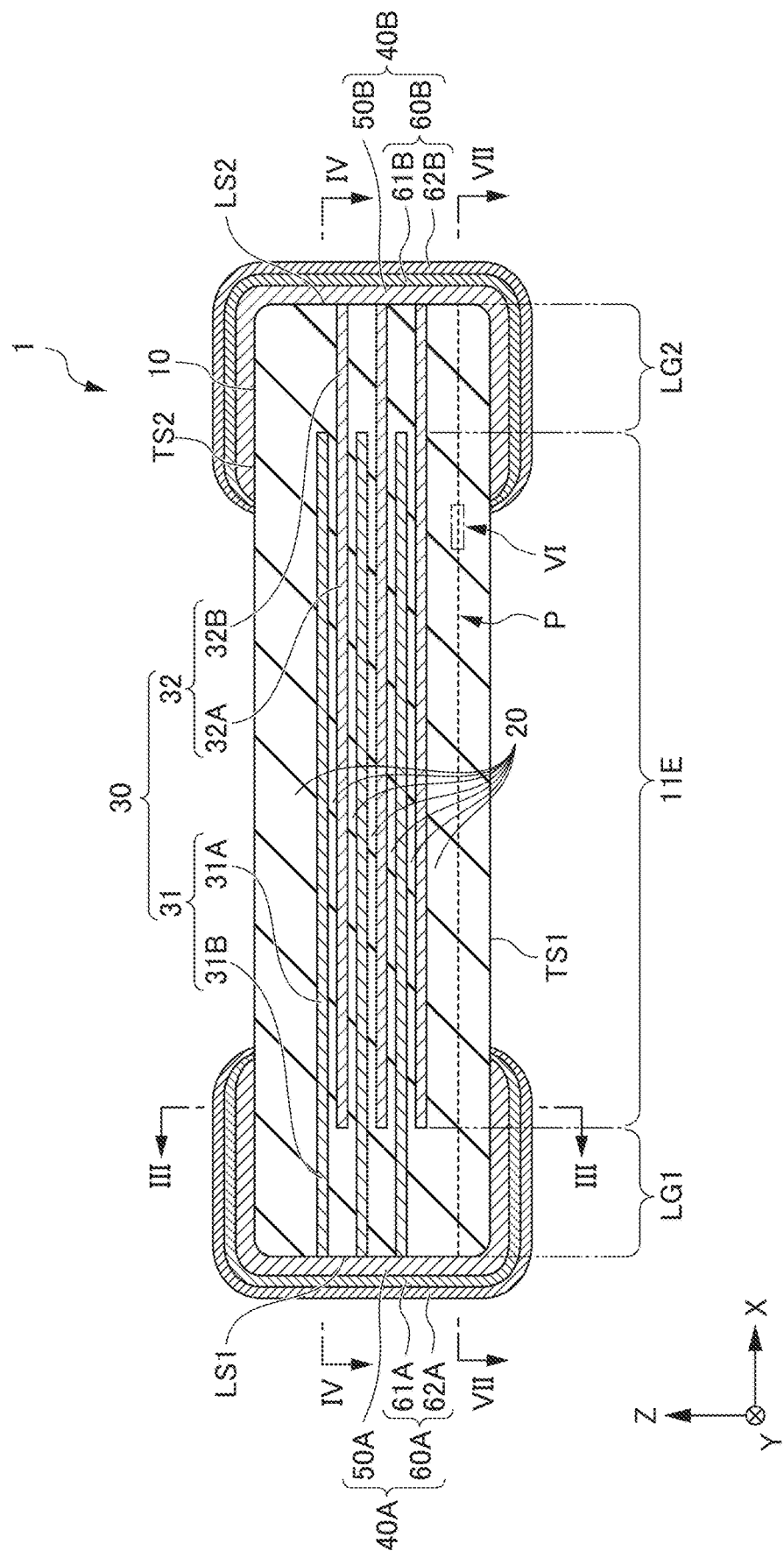
FIG. 2 is an LT cross-sectional view taken along the line II-II of the multilayer ceramic capacitor shown in FIG. 1.
Figure 3:
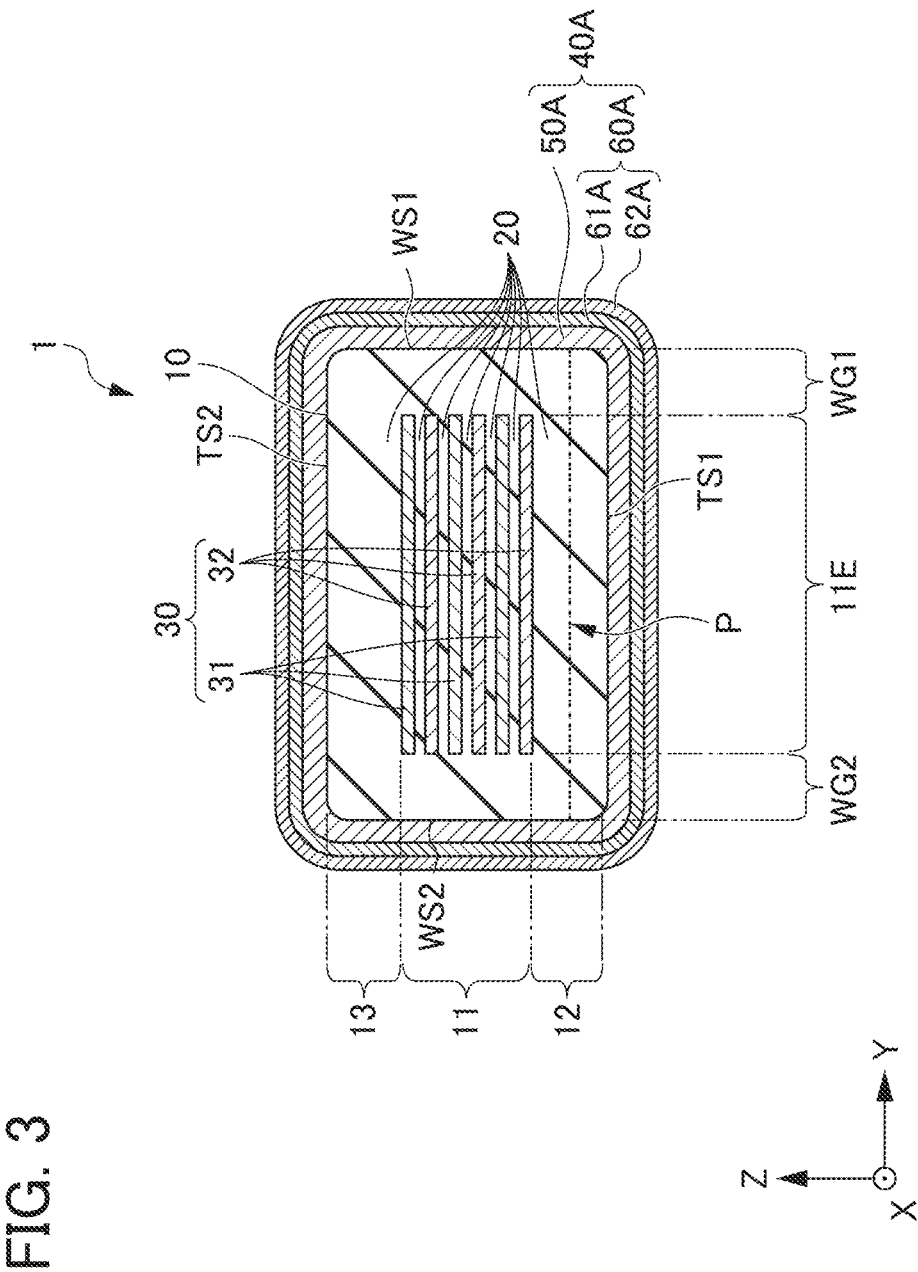
FIG. 3 is a WT cross-sectional view taken along the line III-III of the multilayer ceramic capacitor shown in FIG. 2.
Figure 4:
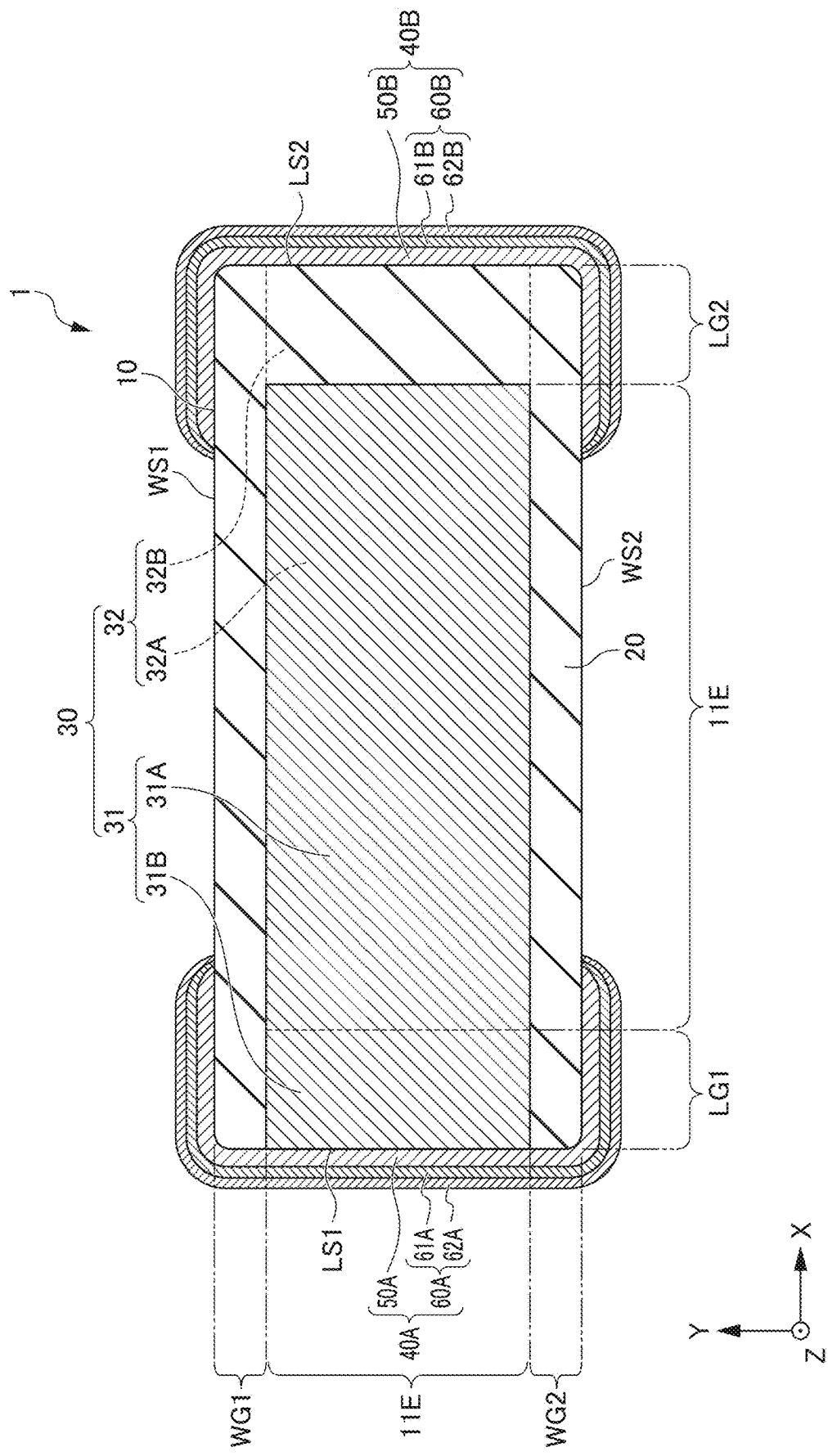
FIG. 4 is an LW cross-sectional view taken along the line IV-IV of the multilayer ceramic capacitor shown in FIG. 2.

Hereinafter, a multilayer ceramic capacitor 1 according to a first preferred embodiment of the present disclosure will be described. FIG. 1 is an external perspective view of the multilayer ceramic capacitor 1 according to the first preferred embodiment of the present invention. FIG. 2 is a cross-sectional view taken along the line II-II of the multilayer ceramic capacitor 1 shown in FIG. 1. FIG. 3 is a cross-sectional view taken along the line III-III of the multilayer ceramic capacitor 1 shown in FIG. 2. FIG. 4 is a cross-sectional view taken along the line IV-IV of the multilayer ceramic capacitor 1 shown in FIG. 2.

The multilayer ceramic capacitor 1 includes a multilayer body 10 and external electrodes 40.

The XYZ Cartesian coordinate system is shown in FIGS. 1 to 4. The multilayer ceramic capacitor 1 and the multilayer body 10 each have a length direction L corresponding to the X direction. The multilayer ceramic capacitor 1 and the multilayer body 10 each have a width direction W corresponding to the Y direction. The multilayer ceramic capacitor 1 and the multilayer body 10 each have a lamination (stacking) direction T corresponding to the Z direction. Herein, the cross section shown in FIG. 2 is also referred to as an LT cross section. The cross section shown in FIG. 3 is also referred to as a WT cross section. The cross section shown in FIG. 4 is also referred to as an LW cross section.

As shown in FIGS. 1 to 4, the multilayer body 10 includes a first main surface TS1 and a second main surface TS2 which oppose each other in the lamination direction T, a first end surface LS1 and a second end surface LS2 which oppose each other in the length direction L perpendicular or substantially perpendicular to the lamination direction T, and a first side surface WS1 and a second side surface WS2 which oppose each other in the width direction W perpendicular or substantially perpendicular to the lamination direction T and the length direction L.

The multilayer body 10 has a rectangular or substantially rectangular parallelepiped shape. The dimension of the multilayer body 10 in the length direction L is not necessarily longer than the dimension of the width direction W. The multilayer body 10 preferably includes rounded corners and ridges. The corners are portions where the three surfaces of the multilayer body intersect, and the ridges are portions where the two surfaces of the multilayer body intersect. Unevenness or the like may be provided on a portion or the entirety of the surface of the multilayer body 10.

The multilayer body 10 includes an inner layer portion 11, and a first main surface-side outer layer portion 12 and a second main surface-side outer layer portion 13 which sandwich the inner layer portion 11 therebetween in the lamination direction T.

The inner layer portion 11 includes a plurality of dielectric layers 20 and a plurality of internal electrode layers 30. The inner layer portion 11 includes, in the lamination direction T, internal electrode layers 30 from the internal electrode layer 30 located closest to the first main surface TS1 to the internal electrode layer 30 located closest to the second main surface TS2. In the inner layer portion 11, a plurality of internal electrode layers 30 oppose each other with the dielectric layer 20 interposed therebetween. The inner layer portion 11 generates a capacitance and substantially defines and functions as a capacitor. The inner layer portion 11 is also referred to as an effective layer portion.

The plurality of dielectric layers 20 are each made of a dielectric material. The dielectric material may be, for example, a dielectric ceramic including components such as a $BaTiO_3$, $CaTiO_3$, $SrTiO_3$, or $CaZrO_3$. Furthermore, the dielectric material may be obtained by adding a sub component such as a Mn compound, an Fe compound, a Cr compound, a Co compound, or a Ni compound to the main component.

The thickness of the dielectric layer 20 is preferably, for example, about 0.5 µm or more and about 10 µm or less. The number of the dielectric layers 20 to be laminated (stacked) is preferably 15 or more and 700 or less, for example. The number of the dielectric layers 20 refers to the total number of dielectric layers in the inner layer portion 11, and dielectric layers in the first main surface-side outer layer portion 12 and the second main surface-side outer layer portion 13.

The plurality of internal electrode layers 30 each include a plurality of first internal electrode layers 31 and a plurality of second internal electrode layers 32. The plurality of first internal electrode layers 31 are each provided on the dielectric layer 20. The plurality of second internal electrode layers 32 are each provided on the dielectric layer 20. The plurality of first internal electrode layers 31 and the plurality of second internal electrode layers 32 are alternately provided via the dielectric layer 20 in the lamination direction T of the multilayer body 10. The first internal electrode layers 31 and the second internal electrode layers 32 each sandwich the dielectric layers 20.

The first internal electrode layer 31 includes a first opposing portion 31A facing the second internal electrode layer 32, and a first extension portion 31B extending from the first opposing portion 31A toward the first end surface LS1. The first extension portion 31B is exposed on the first end surface LS1.

The second internal electrode layer 32 includes a second opposing portion 32A facing the first internal electrode layer 31, and a second extension portion 32B extending from the second opposing portion 32A toward the second end surface LS2. The second extension portion 32B is exposed on the second end surface LS2.

In the present preferred embodiment, the first opposing portion 31A and the second opposing portion 32A are opposed to each other with the dielectric layers 20 interposed therebetween, such that a capacitance is generated, and the characteristics of a capacitor are provided.

The shapes of the first opposing portion 31A and the second opposing portion 32A are not particularly limited. However, for example, they are preferably rectangular or substantially rectangular. However, the corners of the rectangular or substantially rectangular shape may be rounded, or the corners of the rectangular or substantially rectangular shape may be slanted. The shapes of the first extension portion 31B and the second extension portion 32B are not particularly limited. However, for example, they are preferably rectangular or substantially rectangular. However, the corners of the rectangular or substantially rectangular shape may be rounded, or the corners of the rectangular or substantially rectangular shape may be slanted.

The dimension in the width direction W of the first opposing portion 31A may be the same or substantially same as the dimension in the width direction W of the first extension portion 31B, or either of them may be smaller. The dimension in the width direction W of the second opposing portion 32A may be the same or substantially the same as the dimension in the width direction W of the second extension portion 32B, or either of them may be smaller.

The first internal electrode layer 31 and the second internal electrode layer 32 are each made of an appropriate conductive material including, for example, a metal such as Ni, Cu, Ag, Pd, and Au, and an alloy including at least one of these metals. When using an alloy, the first internal electrode layer 31 and the second internal electrode layer 32 may be made of a Ag—Pd alloy or the like, for example.

The thickness of each of the first internal electrode layers 31 and the second internal electrode layers 32 is preferably, for example, about 0.2 µm or more and about 2.0 µm or less. The total number of the first internal electrode layers 31 and the second internal electrode layers 32 is preferably 15 or more and 200 or less, for example.

The first main surface-side outer layer portion 12 is located in the vicinity of the first main surface TS1 of the multilayer body 10. The first main surface-side outer layer portion 12 includes a plurality of dielectric layers 20 located between the first main surface TS1 and the internal electrode layer 30 closest to the first main surface TS1. That is, the first main surface-side outer layer portion 12 includes a plurality of dielectric layers 20. The plurality of dielectric layers 20 are provided between the first main surface TS1 and the internal electrode layer 30 located closest to the first main surface TS1 among the plurality of internal electrode layers 30. The dielectric layers 20 used in the first main surface-side outer layer portion 12 may be the same as the dielectric layers 20 used in the inner layer portion 11.

The second main surface-side outer layer portion 13 is located in the vicinity of the second main surface TS2 of the multilayer body 10. The second main surface-side outer layer portion 13 includes a plurality of dielectric layers 20 located between the second main surface TS2 and the internal electrode layer 30 closest to the second main surface TS2. That is, the second main surface-side outer layer portion 13 includes a plurality of dielectric layers 20. The plurality of dielectric layers 20 are provided between the second main surface TS2 and the internal electrode layer 30 closest to the second main surface TS2 among the plurality of internal electrode layers 30. The dielectric layers 20 used in the second main surface-side outer layer portion 13 may be the same as the dielectric layers 20 used in the inner layer portion 11.

As described above, the multilayer body 10 includes a plurality of stacked dielectric layers 20, and a plurality of stacked internal electrode layers 30 on the dielectric layer 20. That is, the multilayer ceramic capacitor 1 includes the multilayer body 10. In the multilayer body 10, the dielectric layer 20 and the internal electrode layer 30 are alternately laminated.

The multilayer body 10 includes a counter electrode portion 11E. The counter electrode portion 11E refers to a portion where the first opposing portion 31A of the first internal electrode layer 31 and the second opposing portion 32A of the second internal electrode layer 32 oppose each other. The counter electrode portion 11E defines and functions as a portion of the inner layer portion 11. FIG. 4 shows the range of the counter electrode portion 11E in the width direction W and in the length direction L. The counter electrode portion 11E is also referred to as a capacitor active portion.

The multilayer body 10 includes end surface-side outer layer portions. The end surface-side outer layer portions include a first end surface-side outer layer portion LG1 and a second end surface-side outer layer portion LG2. The first end surface-side outer layer portion LG1 includes the dielectric layer 20 and the first extension portion 31B located between the counter electrode portion 11E and the first end surface LS1. The second end surface-side outer layer portion LG2 includes the dielectric layer 20 and the second extension portion 32B located between the counter electrode portion 11E and the second end surface LS2. FIGS. 2 and 4 each show the ranges in the length direction L of the first end surface-side outer layer portion LG1 and the second end surface-side outer layer portion LG2. The first end surface-side outer layer portion LG1 and the second end surface-side outer layer portion LG2 may also be referred to as L gaps or end gaps.

The multilayer body 10 includes side surface-side outer layer portions. Furthermore, the side surface-side outer layer portion includes a first side surface-side outer layer portion WG1 and a second side surface-side outer layer portion WG2. The first side surface-side outer layer portion WG1 includes a dielectric layer 20 located between the counter electrode portion 11E and the first side surface WS1. The second side surface-side outer layer portion WG2 includes the dielectric layers 20 located between the counter electrode portion 11E and the second side surface WS2. FIG. 3 shows the ranges of the first side surface-side outer layer portion WG1 and the second side surface-side outer layer portion WG2 in the width direction W. The first side surface-side outer layer portion WG1 and the second side surface-side outer layer portion WG2 may also be referred to as W gaps or side gaps.

The external electrode 40 includes a first external electrode 40A provided in the vicinity of the first end surface LS1, and a second external electrode 40B provided in the vicinity of the second end surface LS2.

The first external electrode 40A is provided on the first end surface LS1. The first external electrode 40A is connected to the first internal electrode layer 31. The first external electrode 40A may be provided on a portion of the first main surface TS1 and a portion of the second main surface TS2, and a portion of the first side surface WS1 and a portion of the second side surface WS2. In the present preferred embodiment, the first external electrode 40A extends from the first end surface LS1 to a portion of the first main surface TS1, a portion of the second main surface TS2, a portion of the first side surface WS1, and a portion of the second side surface WS2.

The second external electrode 40B is provided on the second end surface LS2. The second external electrode 40B is connected to the second internal electrode layer 32. The second external electrode 40B may be provided on a portion of the first main surface TS1 and a portion of the second main surface TS2, and a portion of the first side surface WS1 and a portion of the second side surface WS2. In the present preferred embodiment, the second external electrode 40B extends from the second end surface LS2 to a portion of the first main surface TS1, a portion of the second main surface TS2, a portion of the first side surface WS1, and a portion of the second side surface WS2.

As described above, in the multilayer body 10, the capacitance is generated by the first opposing portions 31A of the first internal electrode layers 31 and the second opposing portions 32A of the second internal electrode layers 32 opposing each other with the dielectric layers 20 interposed therebetween. Therefore, characteristics of the capacitor are developed between the first external electrode 40A to which the first internal electrode layers 31 are connected and the second external electrode 40B to which the second internal electrode layers 32 are connected.

The first external electrode 40A includes a first base electrode layer 50A and a first plated layer 60A provided on the first base electrode layer 50A.

The second external electrode 40B includes a second base electrode layer 50B and a second plated layer 60B provided on the second base electrode layer 50B.

The first base electrode layer 50A is provided on the first end surface LS1. The first base electrode layer 50A is connected to the first internal electrode layer 31. In the present preferred embodiment of the present invention, the first base electrode layer 50A extends from the first end surface LS1 to a portion of the first main surface TS1, a portion of the second main surface TS2, a portion of the first side surface WS1, and a portion of the second side surface WS2. The first base electrode layer 50A may be provided only on the surface of the first end surface LS1 of the multilayer body.

The second base electrode layer 50B is provided on the second end surface LS2. The second base electrode layer 50B is connected to the second internal electrode layer 32. In the present preferred embodiment of the present invention, the second base electrode layer 50B extends from the second end surface LS2 to a portion of the first main surface TS1, a portion of the second main surface TS2, a portion of the first side surface WS1, and a portion of the second side surface WS2. The second base electrode layer 50B may be provided only on the surface of the second end surface LS2 of the multilayer body.

The first base electrode layer 50A and the second base electrode layer 50B include at least one layer selected from a fired layer, a thin film layer, or other layers. The first base electrode layer 50A and the second base electrode layer 50B may be hereinafter collectively referred to as a base electrode layer.

The base electrode layer of the present preferred embodiment of the present invention is a fired layer, for example. The fired layer preferably includes a metal component and a ceramic component. As a result, the adhesion between the multilayer body 10 and the base electrode layer can be improved. As the metal component included in the fired layer, at least one selected from metals such as, for example, Ni, Cu, Ag, Pd, Au, Ag—Pd alloy is used. Among them, Ni is preferably used. For example, in a case where the internal electrode layer 30 is made of Ni, if the metal of the base electrode layer is Ni which is the same type of metal, the metal bonding strength increases. Therefore, the continuity of the joint between the internal electrode layer 30 and the base electrode layer increases. As a result, a discharge efficiency for discharging hydrogen occluded to the internal electrode layer 30 can be improved, which will be described later.

For the ceramic component, a ceramic material of the same kind as that of the dielectric layer 20 may be used, or a ceramic material of a different kind may be used. The ceramic component includes, for example, at least one selected from $BaTiO_3$, $CaTiO_3$, $(Ba, Ca) TiO_3$, $SrTiO_3$, $CaZrO_3$, or the like.

The fired layer is preferably a laminate chip including internal electrode layers and dielectric layers and a conductive paste applied to the laminate chip simultaneously fired. In this case, a ceramic material of the same kind as that of the dielectric layer 20 is particularly preferably used. Thus, it is preferable that the base electrode layer includes a metal component and a dielectric material.

Furthermore, the fired layer is preferably a laminate chip including internal electrode layers and dielectric layers fired to obtain the multilayer body, following which a conductive paste may be applied to the multilayer body and fired. Furthermore, the fired layer may include a metal component and a glass component.

Furthermore, the base electrode layer may include a plurality of base electrode layers.

The thickness in the length direction of the first base electrode layer 50A provided on the first end surface LS1 is preferably, for example, about 1 μm or more and about 160 μm or less in the middle portion in the height (lamination) direction T and the width direction W of the first base electrode layer 50A.

The thickness in the length direction of the second base electrode layer 50B provided on the second end surface LS2 is preferably, for example, about 1 μm or more and about 160 μm or less at the middle portion in the height direction T and the width direction W of the second base electrode layer 50B.

When the first base electrode layer 50A is provided on a portion of at least one surface of the first main surface TS1 and the second main surface TS2, the thickness of the first base electrode layer 50A provided in this portion in the height direction is preferably, for example, about 1 μm or more and about 40 μm or less at the middle portion in the length direction L and the width direction W of the first base electrode layer 50A provided in this portion.

The first base electrode layer 50A may be provided on a portion of at least one surface of the first side surface WS1 and the second side surface WS2. In this case, the thickness of the first base electrode layer 50A provided in this portion in the width direction is preferably, for example, about 1 μm or more and about 40 μm or less at the middle portion in the length direction L and the height direction T of the first base electrode layer 50A provided in this portion.

The second base electrode layer 50B may be provided on a portion of at least one surface of the first main surface TS1 and the second main surface TS2. In this case, the thickness of the second base electrode layer 50B provided in this portion in the height direction is preferably, for example, about 1 μm or more and about 40 μm or less at the middle portion in the length direction L and the width direction W of the second base electrode layer 50B provided in this portion.

The second base electrode layer 50B may be provided on a portion of at least one surface of the first side surface WS1 and the second side surface WS2. In this case, the thickness of the second base electrode layer 50B provided in this portion in the width direction is preferably, for example, about 1 μm or more and 40 μm or less at the middle portion in the length direction L and the height direction T of the second base electrode layer 50B provided in this portion.

The first plated layer 60A covers the first base electrode layer 50A.

The second plated layer 60B covers the second base electrode layer 50B.

The first plated layer 60A and the second plated layer 60B may include at least one selected from, for example, Cu, Ni, Sn, Ag, Pd, Ag—Pd alloys, Au, or the like. Hereinafter, the first plated layer 60A and the second plated layer 60B are also collectively referred to as a plated layer. More preferably, the plated layer includes, for example, at least one of Cu, Ni, and Sn. Alternatively, the plated layer includes, for example, two or more of Cu, Ni, and Sn.

Each of the first plated layer 60A and the second plated layer 60B may include a plurality of layers.

For example, the plated layer may include a two-layer structure. In the two-layer structure, the Sn plated layer may be provided on the Ni plated layer.

For example, as shown in FIGS. 2 to 4, the first plated layer 60A may include a first Ni plated layer 61A and a first Sn plated layer 62A. The first Ni plated layer 61A may be provided on the first base electrode layer 50A. The first Sn plated layer 62A may be provided on the first Ni plated layer 61A.

The second plated layer 60B may include a second Ni plated layer 61B and a second Sn plated layer 62B. The second Ni plated layer 61B is provided on the second base electrode layer 50B. The second Sn plated layer 62B is provided on the second Ni plated layer 61B.

The Ni plated layer reduces or prevents the erosion of the base electrode layer by solder at the time of mounting the multilayer ceramic capacitor 1. Furthermore, the Sn plated layer improves the wettability of solder when mounting the multilayer ceramic capacitor 1. Thus, it is possible to easily mount the multilayer ceramic capacitor 1.

Furthermore, the configuration of the two plated layers including only the Ni plated layer and the Sn plated layer without a Cu plated layer to be described later makes it possible to provide a thinner external electrode 40. Therefore, the degree of freedom in design of the dimensions of the multilayer body 10 is improved, and thus it is possible to contribute to capacitance expansion. Even when a Cu plated layer is not provided, it is still possible to ensure moisture resistance by the base electrode layer.

Figure 5A:
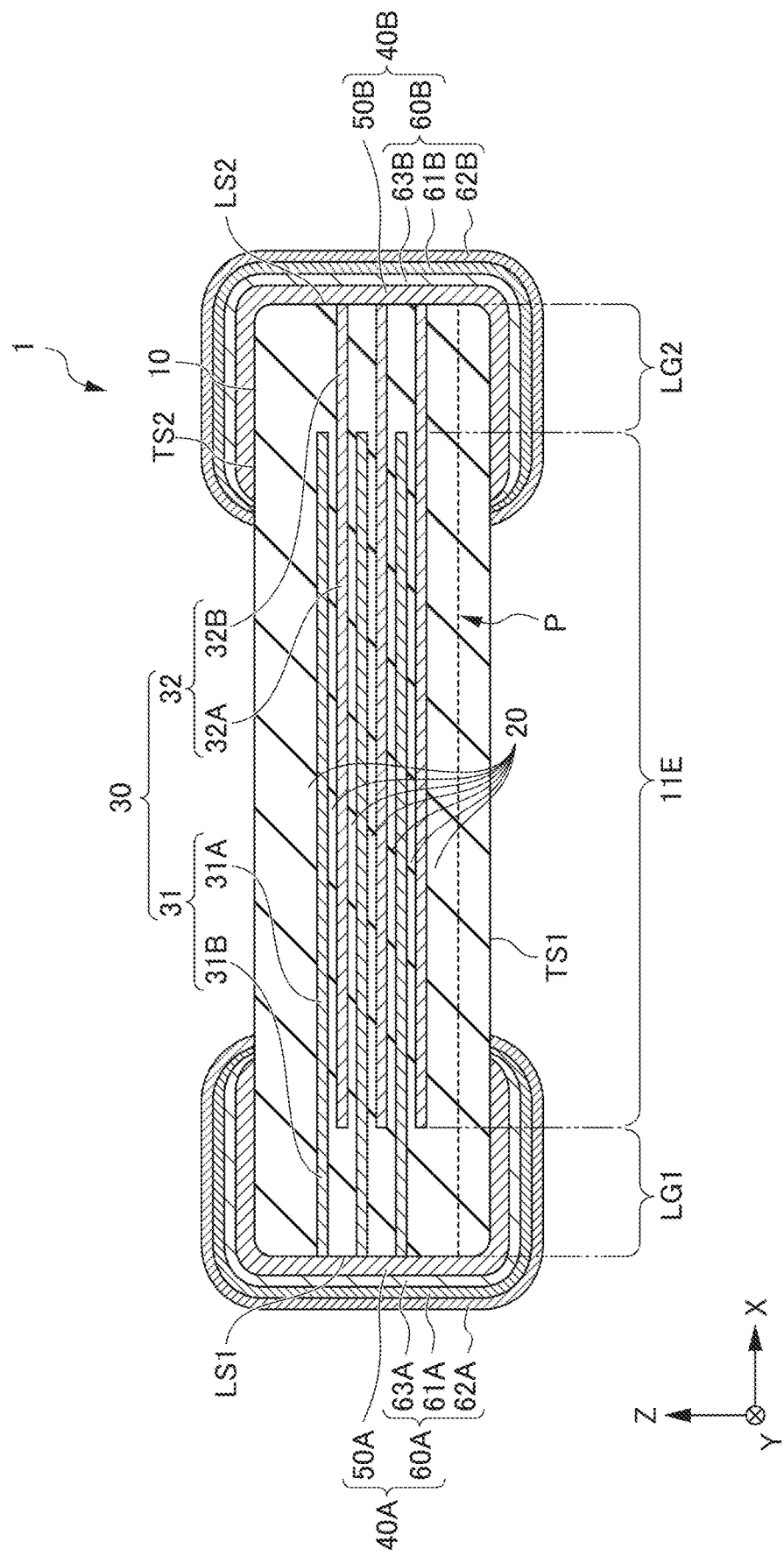
FIG. 5A is an LT cross-sectional view showing a multilayer ceramic capacitor when a plated layer includes a three-layer structure, and corresponding to FIG. 2.

The plated layer is not limited to the two-layer structure. The plated layer preferably includes, for example, a three-layer structure including a Cu plated layer, a Ni plated layer, and a Sn plated layer. FIG. 5A is a LT cross-sectional view showing a multilayer ceramic capacitor 1 when a plated layer has a three-layer structure, and corresponding to FIG. 2.

For example, as shown in FIG. 5A, the first plated layer 60A preferably includes a first Cu plated layer 63A, a first Ni plated layer 61A, and a first Sn plated layer 62A. The first Cu plated layer 63A is provided on the first base electrode layer 50A. The first Ni plated layer 61A is provided on the first Cu plated layer 63A. The first Sn plated layer 62A is provided on the first Ni plated layer 61A.

The second plated layer 60B preferably includes a second Cu plated layer 63B, a second Ni plated layer 61B, and a second Sn plated layer 62B. The second Cu plated layer 63B is provided on the second base electrode layer 50B. The second Ni plated layer 61B is provided on the second Cu plated layer 63B. The second Sn plated layer 62B is provided on the second Ni plated layer 61B.

The Cu plated layer has high moisture resistance. Therefore, by providing the Cu plated layer, it is possible to further reduce or prevent moisture from entering the inside of the external electrode 40 from the outside.

The plated layer may be made solely from a Sn plated layer. FIG. 5B is an LT cross-sectional view showing a multilayer ceramic capacitor 1 when a plated layer includes solely a Sn plated layer, and corresponding to FIG. 2.

For example, as shown in FIG. 5B, the first plated layer 60A may include the first Sn plated layer 62A. The first Sn plated layer 62A is provided on the first base electrode layer 50A.

The second plated layer 60B may include the second Sn plated layer 62B. The second Sn plated layer 62B is provided on the second base electrode layer 50B.

The configuration of the plated layer including only the Sn plated layer without the Cu plated layer and the Ni plated layer makes it possible to provide a thinner external electrode 40. Therefore, the degree of freedom in design of the dimensions of the multilayer body 10 is improved, and thus it is possible to contribute to capacitance expansion. In this case, Ni may be used as a metal of the base electrode layer. Thus, with only the base electrode layer, it is possible to reduce or prevent the erosion of the external electrode by solder when mounting the multilayer ceramic capacitor 1.

Figure 5C:
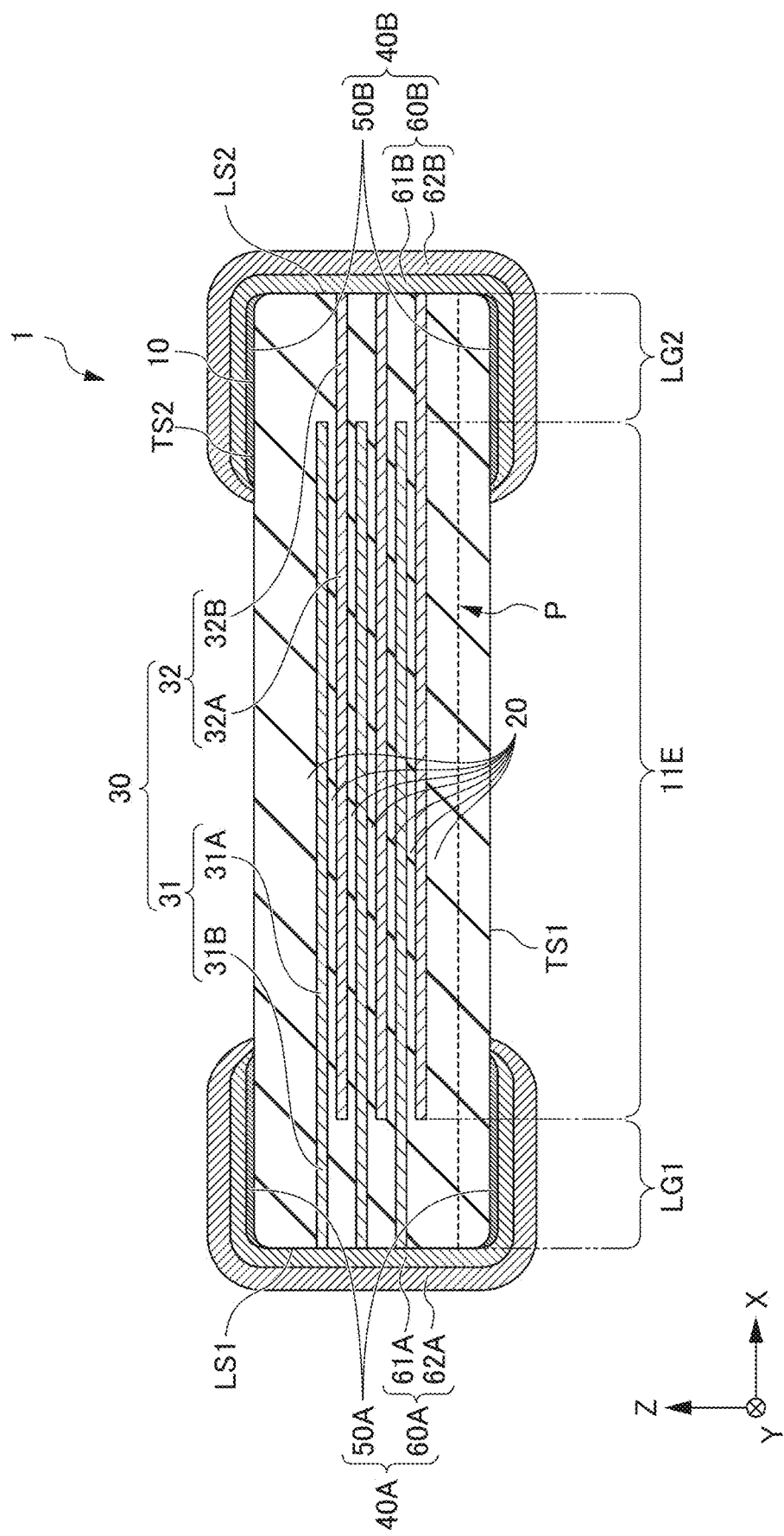
FIG. 5C is an LT cross-sectional view showing a multilayer ceramic capacitor in which a plated layer is directly on a first end surface and a second end surface, and corresponding to FIG. 2.

The plated layer may be directly provided on the first end surface LS1 and the second end surface LS2. FIG. 5C is an LT cross-sectional view showing a multilayer ceramic capacitor 1 in which the plated layer is provided directly on the first end surface LS1 and the second end surface LS2, and corresponding to FIG. 2.

In the example illustrated in FIG. 5C, the first base electrode layer 50A is not provided on the first end surface LS1 of the multilayer body. The first base electrode layer 50A is provided on a portion of the first main surface TS1 and a portion of the second main surface TS2 in the vicinity of the first end surface LS1. Although not shown, the first base electrode layer 50A is provided on a portion of the first side surface WS1 and a portion of the second side surface WS2 in the vicinity of the first end surface LS1.

The first plated layer 60A is provided directly on the multilayer body 10 on the first end surface LS1. On the first main surface TS1, the second main surface TS2, the first side surface WS1, and the second side surface WS2, the first plated layer 60A covers the first base electrode layer 50A provided on the first main surface TS1, the second main surface TS2, the first side surface WS1, and the second side surface WS2. Thus, the first plated layer 60A is provided on the first end surface LS1 without the base electrode layer interposed therebetween.

In the example shown in FIG. 5C, the second base electrode layer 50B is not provided on the second end surface LS2. The second base electrode layer 50B is provided on a portion of the first main surface TS1 and a portion of the second main surface TS2 in the vicinity of the second end surface LS2. Although not shown, the second base electrode layer 50B is provided on a portion of the first side surface WS1 and a portion of the second side surface WS2 in the vicinity of the second end surface LS2.

The second plated layer 60B is provided directly on the multilayer body 10 on the second end surface LS2. On the first main surface TS1, the second main surface TS2, the first side surface WS1, and the second side surface WS2, the second plated layer 60B covers the second base electrode layer 50B provided on the first main surface TS1, the second main surface TS2, the first side surface WS1, and the second side surface WS2. Thus, the second plated layer 60B is provided on the second end surface LS2 without the base electrode layer interposed therebetween.

In this case, it is preferable that the first plated layer 60A and the second plated layer 60B each include a plurality of layers.

For example, as shown in FIG. 5C, the first plated layer 60A preferably includes the first Ni plated layer 61A and the first Sn plated layer 62A. The first Ni plated layer 61A is provided on the first end surface LS1. The first Sn plated layer 62A is provided on the first Ni plated layer 61A.

For example, as shown in FIG. 5C, the second plated layer 60B preferably includes the second Ni plated layer 61B and the second Sn plated layer 62B. The second Ni plated layer 61B is provided on the second end surface LS2. The second Sn plated layer 62B is provided on the second Ni plated layer 61B.

More specifically, the first Ni plated layer 61A is provided directly on the multilayer body 10, on the first end surface LS1. On the first main surface TS1, the second main surface TS2, the first side surface WS1, and the second side surface WS2, the first Ni plated layer 61A covers the first base electrode layer 50A provided on the first main surface TS1, the second main surface TS2, the first side surface WS1, and the second side surface WS2. The first Sn plated layer 62A covers the first Ni plated layer 61A.

The second Ni plated layer 61B is provided directly on the multilayer body 10, on the second end surface LS2. On the first main surface TS1, the second main surface TS2, the first side surface WS1, and the second side surface WS2, the second Ni plated layer 61B covers the second base electrode layer 50B provided on the first main surface TS1, the second main surface TS2, the first side surface WS1, and the second side surface WS2. The second Sn plated layer 62B covers the second Ni plated layer 61B.

Thus, by using Ni as a metal of the plated layer provided directly on the multilayer body 10, even without providing the base electrode layer, it is possible to reduce or prevent the erosion of the external electrode by solder at the time of mounting the multilayer ceramic capacitor 1. Furthermore, providing the Sn plated layer improves the wettability of the solder when mounting the multilayer ceramic capacitor 1. This facilitates the mounting of the multilayer ceramic capacitor 1.

Furthermore, since the first end surface and the second end surface are not provided with a base electrode layer, it is possible to provide a thinner external electrode 40. Therefore, the degree of freedom in design of the dimensions of the multilayer body 10 is improved, and thus it is possible to contribute to capacitance expansion.

The external electrode 40 may include only the plated layer without the base electrode layer.

The thickness per layer of the plated layer including the first plated layer 60A and the second plated layer 60B is preferably about 1 μm or more and about 15 μm or less, for example. That is, for example, the thickness of each of the first Cu plated layer 63A, the first Ni plated layer 61A, the first Sn plated layer 62A, the second Cu plated layer 63B, the second Ni plated layer 61B, and the second Sn plated layer 62B as described above is preferably about 1 μm or more and about 15 μm or less.

As in the various examples described above, the external electrode 40 preferably includes an inner layer including Ni as a metal component and an outer layer including Sn as a metal component. The outer layer is provided on the outer surface-side of the inner layer. The inner layer including Ni as a metal component is preferably provided on the surface of the multilayer body 10 where the internal electrode layers 30 are exposed. The outer layer including Sn as a metal component preferably covers the inner layer. For example, the first external electrode 40A may include a first inner layer including Ni as a metal component and a first outer layer including Sn as a metal component. The first inner layer may be provided on the first end surface LS1. The first outer layer may be provided on an outer surface-side of the first inner layer. The second external electrode 40B may include a second inner layer including Ni as a metal component and a second outer layer including Sn as a metal component. The second inner layer may be provided on the second end surface LS2. The second outer layer may be provided on the outer surface-side of the second inner layer. As the external electrode 40 including Ni as a main component of the metal component, for example, a fired layer including Ni may be used, or a Ni plated layer may be used. As the outer layer including Sn as a main component of the metal component, for example, a Sn plated layer may be used.

When the dimension in the length direction of the multilayer ceramic capacitor 1 including the multilayer body 10 and the external electrode 40 is defined as the L dimension, the L dimension is preferably about 0.02 mm or more and about 2.1 mm or less, for example. Furthermore, when the dimension in the height direction of the multilayer ceramic capacitor 1 is defined as the T dimension, the T dimension is preferably about 0.01 mm or more and about 1.8 mm or less, for example. Furthermore, when the dimension in the width direction of the multilayer ceramic capacitor 1 is defined as the W dimension, the W dimension is preferably about 0.01 mm or more and about 1.8 mm or less, for example.

The multilayer ceramic capacitor 1 of the present preferred embodiment includes a discharge path P. The discharge path P can discharge a chemical element to the outside of the multilayer body 10.

The discharge path P is provided in at least one of the first main surface-side outer layer portion 12 and the second main surface-side outer layer portion 13 of the multilayer body 10. In the present preferred embodiment, the discharge path P is provided in the first main surface-side outer layer portion 12. The discharge path P is provided along the LW cross-section, i.e., a plane perpendicular or substantially perpendicular to the stacking (lamination) direction T. In other words, the discharge path P is provided along a plane extending in the length direction L and the width direction W.

Figure 6:
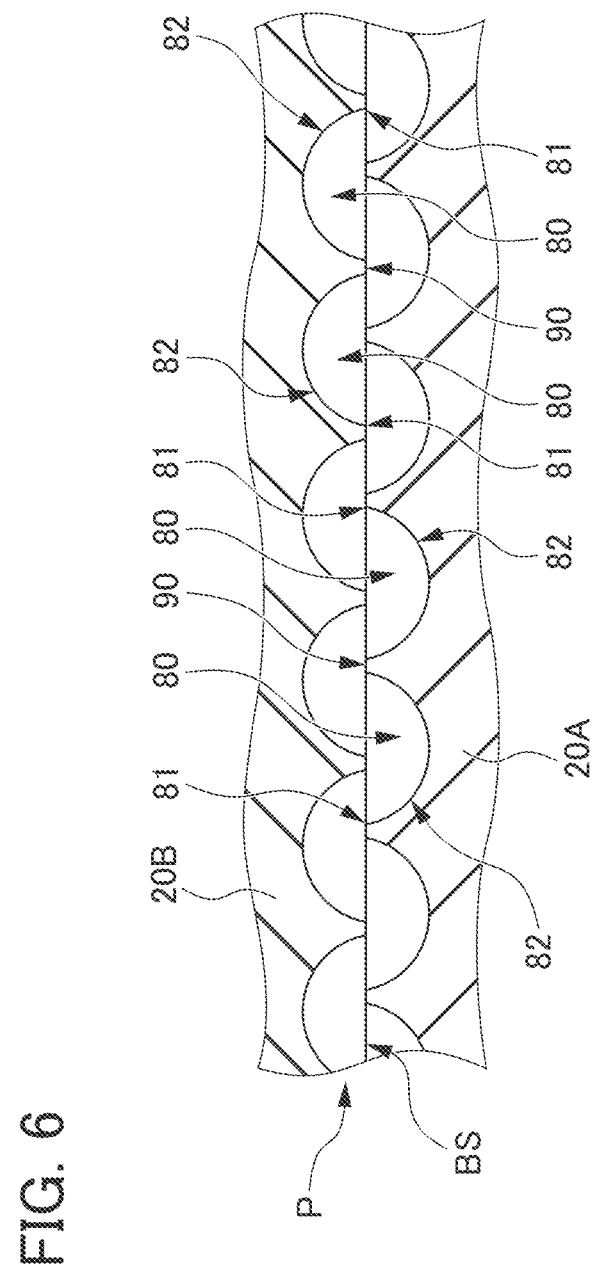
FIG. 6 is an enlarged view of the VI portion in FIG. 2, and is an enlarged cross-sectional view schematically showing a cross section of a discharge path.

FIG. 6 is an enlarged view of the VI portion in FIG. 2, and is an enlarged cross-sectional view schematically showing a cross section of the discharge path P.

As shown in FIG. 6, the discharge path P includes a plurality of cavities 80. The plurality of cavities 80 are provided in a plane perpendicular or substantially perpendicular to the stacking direction T. The cavities 80 may each include a spherically curved surface. The plurality of cavities 80 are coupled together to provide the discharge path P.

The discharge path P is, for example, provided between the plurality of dielectric layers 20 including the first main surface-side outer layer portion 12. FIG. 6 illustrates an example where the discharge path P is provided at a boundary surface BS between the first dielectric layer 20A and the second dielectric layer 20B. The first dielectric layer 20A and the second dielectric layer 20B are included in the plurality of dielectric layers 20 including the first main surface-side outer layer portion 12. The second dielectric layer 20B is overlaid with the first dielectric layer 20A.

More specifically, a plurality of recesses are provided in the surface of the first dielectric layer 20A which opposes the second dielectric layer 20B. Furthermore, a plurality of recesses are provided in the surface of the second dielectric layer 20B which opposes the first dielectric layer 20A. The surfaces each including the plurality of recesses are opposed to each other. With such a configuration, the plurality of recesses provide the plurality of cavities 80. Furthermore, the plurality of recesses provided in the first dielectric layer 20A, and the plurality of recesses provided in the second dielectric layer 20B are provided at positions shifted from each other in a direction perpendicular or substantially perpendicular to the stacking direction T. For example, FIG. 6 shows an example in which the plurality of recesses provided in the first dielectric layer 20A, and the plurality of recesses provided in the second dielectric layer 20B are provided at positions shifted from each other in the length direction L. With such a configuration, the plurality of cavities 80 is connected to each other to provide the discharge path P.

Figure 7:
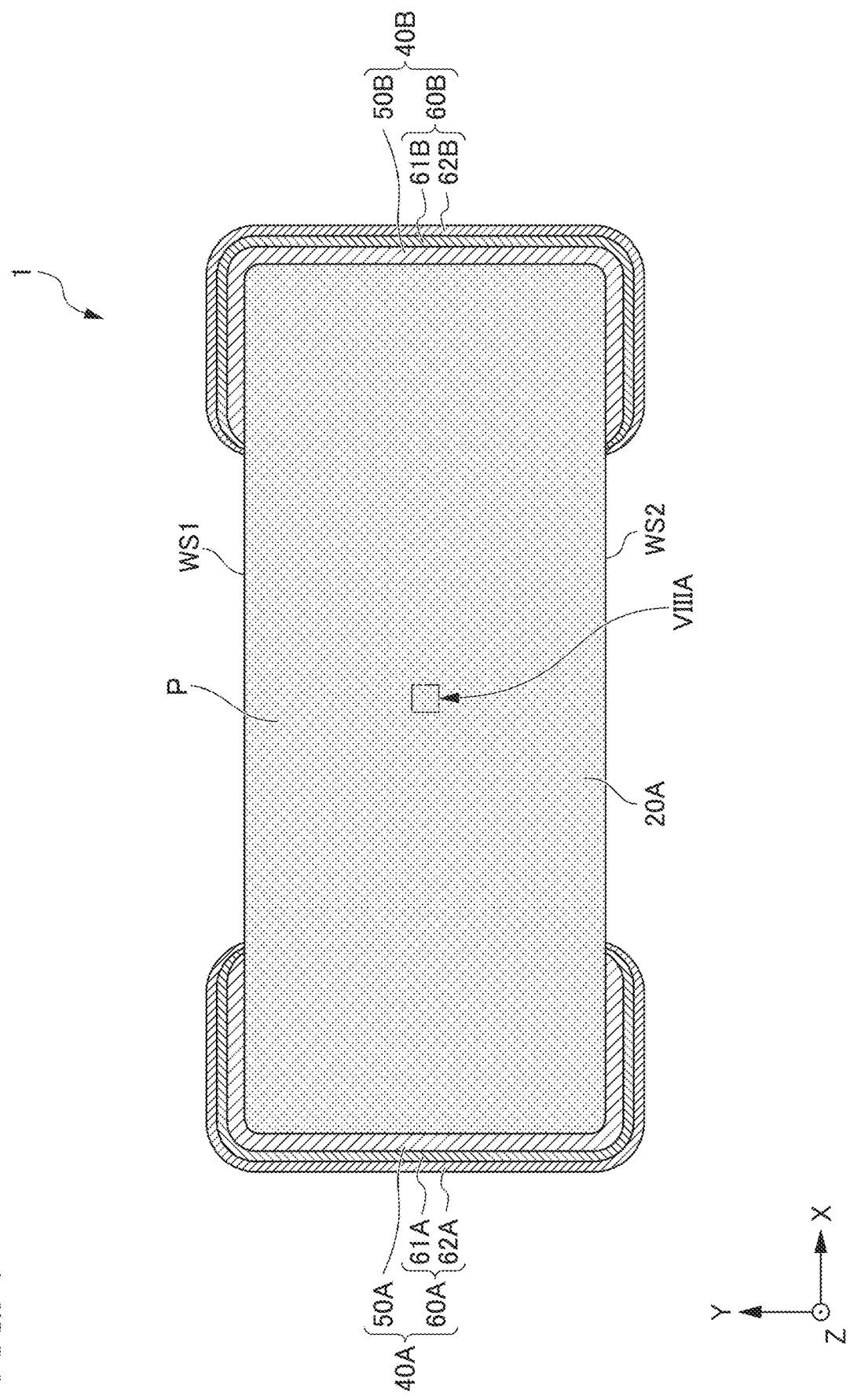
FIG. 7 is a cross-sectional view taken along the line VII-VII of the multilayer ceramic capacitor shown in FIG. 2, and is an LW cross-sectional view taken along a plane where the discharge path is provided.

FIG. 7 is an LW cross-sectional view taken along the line VII-VII of the multilayer ceramic capacitor 1 shown in FIG. 2, and is a cross-sectional view taken along a plane along the boundary surface BS between the first dielectric layer 20A and the second dielectric layer 20B, i.e., a plane where the discharge path P is provided. In other words, FIG. 7 is a diagram of a surface of the first dielectric layer 20A facing the second dielectric layer 20B among the plurality of dielectric layers 20 included in the first main surface-side outer layer portion 12.

Figure 8B:
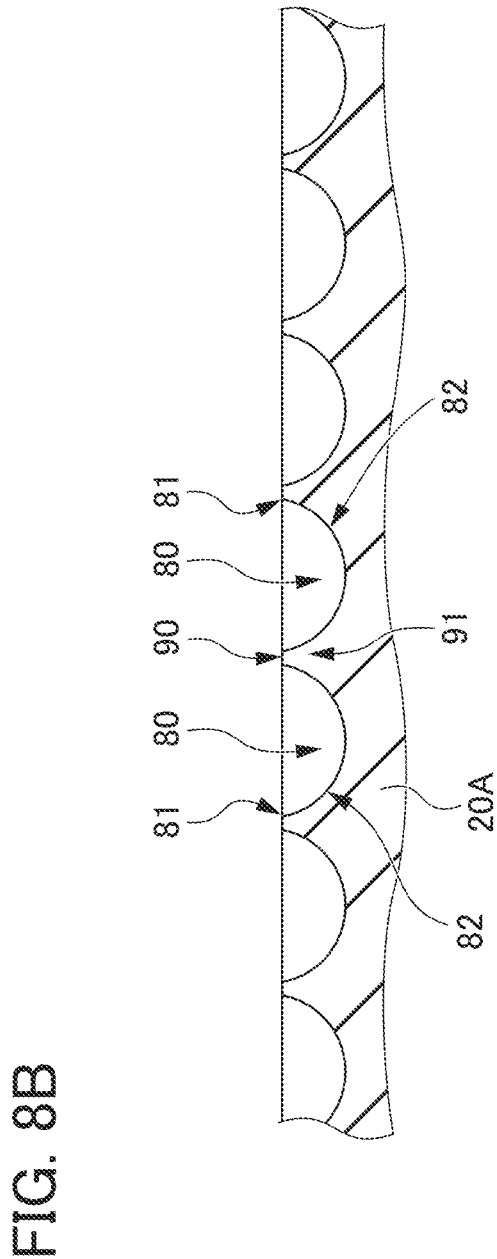
FIG. 8B is an enlarged cross-sectional view schematically showing a cross section near the surface of the first dielectric layer along the line VIIIB-VIIIB of the surface in the FIG. 8A.

FIG. 8A is an enlarged view of the VIIIA portion in FIG. 7, and is an enlarged view schematically showing a microscopic state in a plane view of the surface of the first dielectric layer 20A. FIG. 8B is an enlarged cross-sectional view schematically showing a cross-section near the surface of the first dielectric layer 20A along the line VIIIB-VIIIB of the surface of FIG. 8A. In FIG. 8B, only the first dielectric layer 20A is shown, and the second dielectric layer 20B is not shown.

As shown in FIGS. 8A and 8B, the plurality of recesses each including a spherical curved surface is provided on the surface of the first dielectric layer 20A. Here, the plurality of recesses are portions that provide the cavities 80 in FIG. 6. For this reason, like the cavities 80, the plurality of recesses is each denoted by the reference numeral 80.

The plurality of recesses 80 are provided on the surface of the first dielectric layer 20A. In the present preferred embodiment, the plurality of recesses 80 having the same size or substantially the same size are provided in a plane.

As shown in FIG. 8A, the plurality of recesses 80 may be provided, for example, in a hexagonal close-packed shape on the surface of the first dielectric layer 20A. By providing the plurality of recesses 80 in such a hexagonal close-packed shape, it is possible to provide the plurality of recesses 80 on the surface of the first dielectric layer 20A at a high density. For example, the plurality of recesses 80 may be provided such that an average of 5 or more and 7 or less other recesses 80 are located around a single recess 80. Thus, it is possible to provide the plurality of recesses 80 on the surface of the first dielectric layer 20A at a high density. By providing the recesses 80 at a high density in this manner, the discharge path P can be easily provided. In addition, the fluid can easily pass through the discharge path P. The plurality of recesses 80 may be regularly arranged. However, the plurality of recesses 80 may not be regularly arranged.

Each of the plurality of recesses 80 includes an opening 81 and a wall 82. As shown in FIG. 8A, in the present preferred embodiment of the present invention, the opening 81 includes an outer edge portion of the recess 80. The opening 81 has a circular or substantially circular shape, for example.

As shown in FIG. 8B, the wall 82 of the recess 80 includes a spherical curved surface in the cross section. That is, the wall 82 of the recess 80 includes a concave curved surface. The concave curved surface may be a portion of the surface of the sphere. The wall surface of the recess 80 may have a hemispherical shape. However, the wall surface 82 of the recess 80 may have a spherical curved surface less than a hemisphere.

The surface of the first dielectric layer 20A includes the plurality of recesses 80 and a plurality of land portions 90. The plurality of recesses 80 each include a spherical curved surface. The plurality of land portions 90 are regions in which the plurality of recesses 80 are not provided.

The average inlet size of the plurality of recesses 80 provided on the surface of the first dielectric layers 20A is preferably about 0.2 µm or more and about 2 µm or less, for example. The average depth of the plurality of recesses 80 provided on the surface of the first dielectric layers 20A is preferably about 0.1 µm or more and about 1 µm or less, for example.

Here, the depth of the recess 80 is defined as the maximum value of the distance in the depth direction of the recess 80 from the deepest portion of the recess 80 to the opening 81 of the recess 80.

The average depth of the plurality of recesses 80 provided on the surface of the first dielectric layer 20A may be, for example, about 25% or more and about 50% or less of the plurality of recesses 80 of the average inlet size.

The plurality of recesses 80 are also similarly provided on the surface of the second dielectric layer 20B facing the first dielectric layer 20A. Thus, the surfaces each including the plurality of recesses 80 are opposed to each other. This provides the plurality of cavities 80 and the discharge path P. Here, the cavities 80 providing the discharge path P each include a spherical curved surface. As a result, the resistance when the fluid passes through the discharge path P is reduced.

Here, the height in the stacking direction T of the cavity 80 is the same as or similar to the depth of the recess 80. Therefore, it is preferable that the average height of the plurality of cavities 80 in the stacking direction T is about 0.1 µm or more and about 1 µm or less, for example. As a result, the discharge path P can be easily provided.

The shape of the cavities 80 providing the discharge path P is not particularly limited. However, the cavities 80 are each preferably provided such that dielectric pillars 91 remain. Here, the dielectric pillars 91 are each provided by a solid portion of the dielectric material located between the plurality of cavities 80. That is, the solid portion located between the plurality of recesses 80 shown in FIG. 8 provides the dielectric pillars 91.

Here, at the boundary surface BS of the plurality of dielectric layers 20, there are portions where the opposing cavities 80 are connected to each other and portions where the opposing land portions 90 are in contact with each other. Thus, the land portions 90 of the surface of the dielectric layer 20 is in contact with the land portions 90 of the surface of the opposing dielectric layer 20. This provides the solid portion of the dielectric material located between the plurality of cavities 80. As a result, the dielectric pillar 91 is provided.

The plurality of cavities 80 are coupled together to provide the discharge path P. When viewed in a three-dimensional manner, a portion of one cavity 80 is coupled to a portion of another cavity 80. Such a connection state between the plurality of cavities is consecutive, thus providing the path P through which a chemical element can be discharged. In addition, in the plane in which the cavities 80 are provided, it is only necessary to provide the discharge path P in which a chemical element can be discharged by continuing the connection state between the plurality of cavities in any of the paths. Thus, some cavities may be isolated from the plurality of cavities 80.

With such a configuration, it is possible to establish a portion, where the first main surface-side outer layer portion 12 closer to the first main surface TS1 than the location where the cavities 80 are provided, is in contact with the first main surface-side outer layer portion 12 closer to the second main surface TS2 than the location where the cavities 80 are provided. Therefore, it is possible to improve the adhesion between the first main surface-side outer layer portion 12 closer to the first main surface TS1 than the location where the cavities 80 are provided, and the first main surface-side outer layer portion 12 closer to the second main surface TS2 than the location where the cavities 80 are provided. That is, it is possible to improve the adhesion between the first dielectric layer 20A and the second dielectric layer 20B between which the discharge path P is provided. As a result, the discharge path P can be provided in the first main surface-side outer layer portion 12 while maintaining the connectivity of the first main surface-side outer layer portion 12 itself.

With the above configuration, the plurality of cavities 80 can be easily connected to each other. Furthermore, it is possible to provide the continuous cavities 80. The continuous cavities 80 allow a chemical element to be discharged out of the multilayer body 10 within the range from the first end surface LS1 to the second end surface LS2, on the same plane. Therefore, even when hydrogen is occluded in the internal electrode layer 30, the hydrogen occluded in the internal electrode layer 30 is easily discharged from the external electrode 40 to the outside of the multilayer ceramic capacitor 1 through the cavities 80.

Figure 9A:
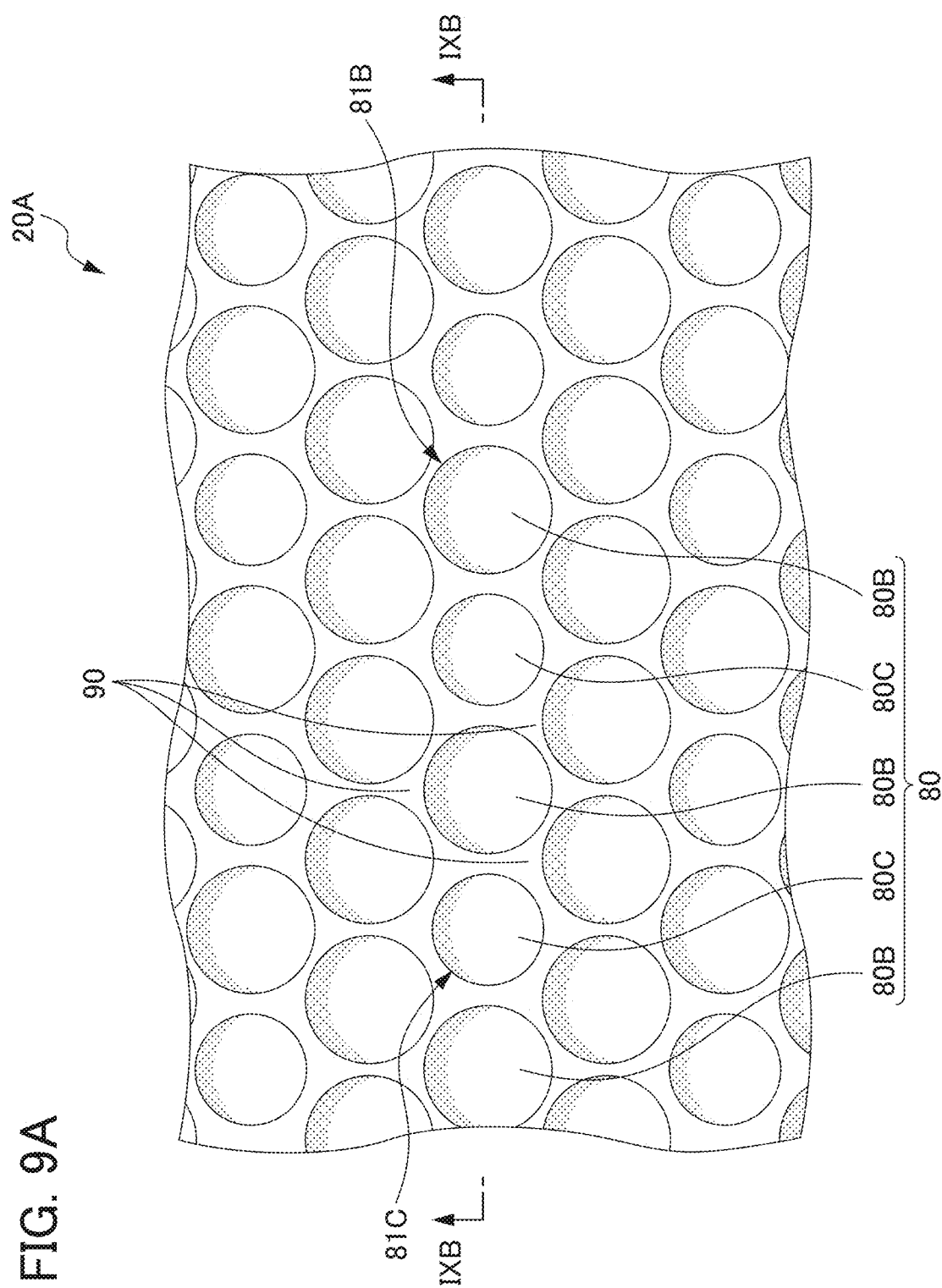
FIG. 9A is a diagram of an example of another configuration of a plurality of recesses on the surface of the first dielectric layer, and corresponding to FIG. 8A.

The plurality of recesses 80 provided on the surfaces of the dielectric layers 20A and 20B opposing each other are not limited to those shown in FIG. 8A and FIG. 8B. For example, the plurality of recesses 80 may be those as shown in FIGS. 9A and 9B. FIGS. 9A and 9B are diagrams of other examples of the plurality of recesses 80. FIG. 9A corresponds to FIG. 8A. FIG. 9B corresponds to FIG. 8B.

As shown in FIGS. 9A and 9B, the plurality of recesses 80 may include recesses of differing inlet sizes. For example, as shown in FIGS. 9A and 9B, the plurality of recesses 80 may include recesses 80B and recesses 80C. The recesses 80B each have a larger inlet size relative to the average inlet size. The recesses 80C each have a smaller inlet size relative to the average inlet size. In this case, the average depth of the recesses 80C each having an inlet size smaller than the average inlet size may be smaller than the average depth of the recesses 80B, each having a larger inlet size with respect to the average inlet size. The recesses 80B each having a larger inlet size with respect to the average inlet size, and the recesses 80C each having a smaller inlet size with respect to the average inlet size may be regularly arranged. Alternatively, they may not be regularly arranged. Furthermore, the plurality of recesses 80 may include a plurality of recesses in which the inlet sizes differ in a stepwise manner or randomly.

The plurality of recesses 80B and 80C of different inlet sizes each include, for example, circular or substantially circular openings 81B and 81C, and walls 82B and 82C each including a spherical curved surface. The openings 81B and 81C are not limited to being circular or substantially circular, and may have other shapes. The wall 82B of the recess 80B may include a hemispherical or substantially hemispherical shape, or a spherical curved surface less than a hemisphere, for example. Furthermore, the wall 82C of the recess 80C may include a spherical curved surface less than the hemisphere.

Also in this case, it is preferable that the average inlet size of the plurality of recesses 80 is about 0.2 μm or more and about 2 μm or less, for example. The average depth of the plurality of recesses 80 is preferably about 0.1 μm or more and about 1 μm or less, for example.

Figure 10B:
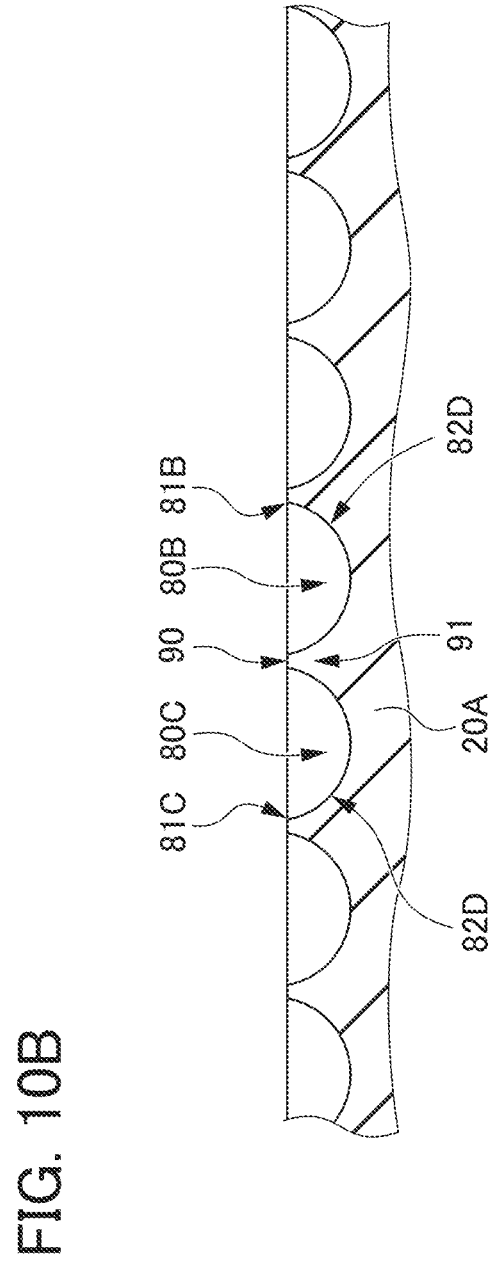
FIG. 10B is a diagram of an example of another configuration of a plurality of recesses on the surface of the first dielectric layer, and corresponding to FIG. 8B.

The plurality of recesses 80 provided on the surfaces of the dielectric layers 20A and 20B opposing each other may include a configuration shown in FIGS. 10A and 10B. FIGS. 10A and 10B are diagrams of other examples of the plurality of recesses 80. FIG. 10A corresponds to FIG. 8A. FIG. 10B corresponds to FIG. 8B.

As shown in FIGS. 10A and 10B, the plurality of recesses 80 may include recesses 80D. The recesses 80D each include an opening 81D having a hexagonal or substantially hexagonal shape. This makes it possible to provide the plurality of recesses 80 at a higher density.

Also in this case, the wall surface 82D of the recess 80D may include a spherical curved surface. That is, the wall surface 82D of the recess 80D may include a concave curved surface including a portion of the surface of the sphere.

Also in this case, it is preferable that the average inlet size of the plurality of recesses 80 is about 0.2 μm or more and about 2 μm or less, for example. The average depth of the plurality of recesses 80 is preferably about 0.1 μm or more and about 1 μm or less, for example.

The recesses of different inlet sizes and different shapes of openings as shown in FIGS. 8A and 8B, FIGS. 9A and 9B, and FIGS. 10A and 10B may coexist. Furthermore, the average inlet size of the plurality of recesses 80 provided on the surface of the first dielectric layer 20A, and the average inlet size of the plurality of recesses 80 provided on the surface of the second dielectric layer 20B may differ.

The discharge path P includes a path connecting between an opening H provided on the surface of the multilayer body 10 which is exposed from the external electrode 40 and the first end surface LS1 on which the first external electrode 40A is provided, and a path connecting between the opening H provided on the surface of the multilayer body 10 which is exposed from the external electrode 40 and the second end surface LS2 on which the second external electrode 40B is provided. The opening H is preferably provided on at least one of the first side surface WS1 or the second side surface WS2, for example. In the present preferred embodiment of the present invention, the openings H are provided on the first side surface WS1 and the second side surface WS2.

FIG. 1 shows the region of the opening H provided in the second side surface WS2. The opening H is provided in the surface of the multilayer body 10 exposed from the first external electrode 40A and the second external electrode 40B. That is, the opening H is provided in the exposed surface of the multilayer body 10. In the present preferred embodiment of the present invention, the opening H is provided at the same or substantially the same location in the stacking direction T as the plane in which the discharge path P is provided, on the first side surface WS1 and the second side surface WS2. In the present preferred embodiment of the present invention, the opening H is provided as a continuous portion from the planar discharge path P. Therefore, the opening H has a shape the same as or similar to the cross section of the discharge path P shown in FIG. 6.

In the present preferred embodiment of the present invention, the plurality of cavities 80 providing the discharge path P is provided over the entire or substantially the entire surface of the dielectric layer 20, i.e., on the entire or substantially the entire surface of the plane perpendicular or substantially perpendicular to the stacking direction T, between the plurality of dielectric layers 20 including the first main surface-side outer layer portion 12. More specifically, as shown in FIG. 7, the recesses 80 providing the discharge path P are provided over the entire or substantially the entire surface of the first dielectric layer 20A. That is, the discharge path P is substantially provided on the entire or substantially the entire surface of the plane perpendicular or substantially perpendicular to the stacking direction T of the first dielectric layer 20A.

Thus, the plurality of cavities 80 are preferably provided over the entire or substantially the entire surface of the dielectric layer 20 that provides at least one of the first main surface-side outer layer portion 12 or the second main surface-side outer layer portion 13. As a result, the total area of the path through which the fluid passes can be increased.

With the above configuration, the path connecting between the opening H provided on the surface of the multilayer body 10 which is exposed from the external electrode 40, and the first end surface LS1 where the first external electrode 40A is provided, and the path connecting between the opening H provided on the surface of the multilayer body 10 which is exposed from the external electrode 40, and the second end surface LS2 where the second external electrode 40B is provided, are provided as the discharge path P.

Thus, the plurality of cavities 80 preferably have a continuous path from at least the first end surface LS1 and the second end surface LS2 to the first side surface WS1 or the second side surface WS2 of the multilayer body 10. That is, preferably, the plurality of cavities 80 are provided on the same plane from the first end surface LS1 to the second end surface LS2. The plurality of cavities 80 can discharge a chemical element to the outside of the multilayer body 10.

In the present preferred embodiment of the present invention, the discharge path P is provided as a path connecting the surface of the multilayer body 10 covered by the external electrode 40 and the surface of the multilayer body 10 exposed from the external electrode 40. With such a configuration, even when hydrogen is occluded in the internal electrode layer 30, the hydrogen occluded in the internal electrode layer 30 can be discharged to the outside of the multilayer ceramic capacitor 1 through the external electrode 40 and the discharge path P. Furthermore, even when the hydrogen is occluded in the external electrode 40, it is possible to discharge the hydrogen occluded in the external electrode 40 to the outside of the multilayer ceramic capacitor 1. Therefore, the amount of hydrogen included in the internal electrode layer 30 can be reduced, and the diffusion of hydrogen into the dielectric layer 20 can be reduced. As a result, it is possible to reduce or prevent the deterioration of the insulation resistance of the multilayer ceramic capacitor 1.

Conventionally, multilayer ceramic capacitors including a multilayer body and a pair of external electrodes are known. In the multilayer body, a plurality of dielectric layers and a plurality of internal electrodes are laminated alternately. The pair of external electrodes are provided on the surface of the multilayer body and in electrical conduction with the internal electrodes extending on the surface of the multilayer body. Then, for example, Ni plating may be applied on the surface of the external electrode to prevent solder erosion during mounting. Furthermore, in order to improve the solderability during mounting by soldering, for example, Sn plating may be applied on the Ni plating. The plating such as Ni or Sn is usually formed by the method of electrolytic plating, for example. Japanese Unexamined Patent Application, Publication No. H01-80011 discloses the following problems in that, when hydrogen is generated by the chemical reaction in the plating step, and the hydrogen is occluded to the internal electrodes, since the hydrogen gradually reduces the surrounding dielectric layers, the insulation resistance of the multilayer ceramic capacitor deteriorates. Japanese Unexamined Patent Application, Publication No. H01-80011 discloses a solution to this problem wherein Ni, which is a metal that reduces hydrogen-absorption, is added to the internal electrodes when the internal electrodes containing a precious metal as a main component, such as a Ag—Pd alloy, is used.

In recent years, in order to reduce the material cost, not a precious metal such as Ag or Pd, but rather a base metal such as Ni is often used as a material of the internal electrodes. In this regard, Japanese Unexamined Patent Application, Publication No. H01-80011 describes that Ni is a "metal that inactivates the absorption of hydrogen". However, according to research conducted by the inventors of preferred embodiments of the present invention, even when Ni is used for the internal electrodes, it has been discovered that the insulation resistance is deteriorated by the influence of hydrogen. When a metal such as Ni capable of absorbing hydrogen is used as a base metal used as a material of the internal electrodes and the external electrodes including the plated layers, the absorbed hydrogen is released to some extent depending on temperature conditions. In particular, when a high-temperature and high-humidity loading test such as a PCBT test is performed, the phenomena remarkably appear. The absorbed hydrogen is released and diffuses into the dielectric layers, which may lead to deterioration of the insulation resistance (IR). Therefore, in order to avoid problems such as deterioration of the insulation resistance due to the multilayer ceramic capacitor is likely to include hydrogen, it is preferable to reduce the absolute amount of hydrogen included in the multilayer ceramic capacitor.

According to the configuration of the present preferred embodiment of the present invention, even when hydrogen is occluded in the internal electrode layers 30, the hydrogen occluded in the internal electrode layers 30 can be discharged to the outside of the multilayer ceramic capacitor 1 through the discharge path P. Therefore, the amount of hydrogen included in the internal electrode layer 30 can be reduced, and the diffusion of hydrogen into the dielectric layer 20 can be reduced. As a result, it is possible to reduce or prevent the deterioration of the insulation resistance of the multilayer ceramic capacitor 1.

As a method of discharging hydrogen occluded in the internal electrode layers 30 through the discharge path P from the external electrodes 40 to the outside of the multilayer ceramic capacitor 1, it is possible to use the following method.

The completed multilayer ceramic capacitor 1 is put into an oven and subjected to heat treatment at a temperature of about 150° C. for about one hour, for example. The atmosphere in the oven at this time is not particularly limited. By performing such heat treatment, hydrogen atoms accumulated in the internal electrode layers 30 and the external electrodes 40 can be bonded as hydrogen molecules. The bonded hydrogen molecules can be discharged to the outside of the multilayer ceramic capacitor 1 through the discharge path P.

In the configuration of the present preferred embodiment, particularly favorable effects can be obtained when the external electrodes 40 include a plurality of layers. For example, the external electrodes 40 may each include an inner layer and an outer layer. The outer layer is provided on the outer surface-side of the inner layer. The outer layer is less permeable to hydrogen than the inner layer. The outer layer preferably covers the inner layer directly or indirectly. For example, the external electrodes 40 may each include, for example, an inner layer including Ni as a metal component, and an outer layer including Sn as a metal component, which is provided on the outer surface-side of the inner layer. The Sn plated layer permeates less hydrogen than the Ni plated layer, or the fired layer including Ni as a metal component. Even in the multilayer ceramic capacitor 1 including such external electrodes 40, it is possible to discharge the hydrogen occluded in the internal electrode layer 30 through the discharge path P provided in the inner layer of the external electrode 40 and the multilayer body 10, to the outside of the multilayer ceramic capacitor 1.

Figure 11A:
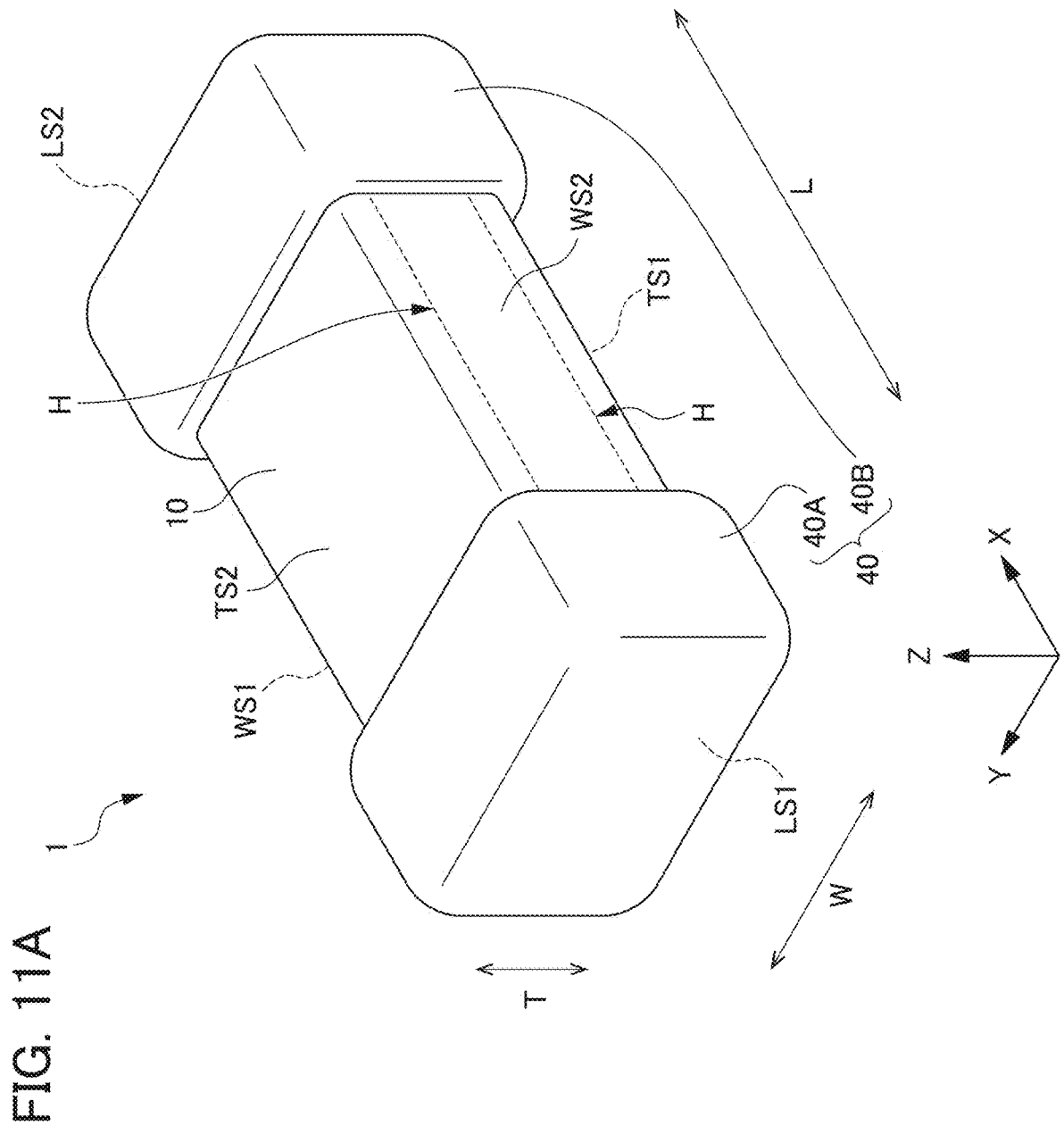
FIG. 11A is an external perspective view of a multilayer ceramic capacitor of a first modified example of the first preferred embodiment of the present invention, and corresponding to FIG. 1.
Figure 11B:
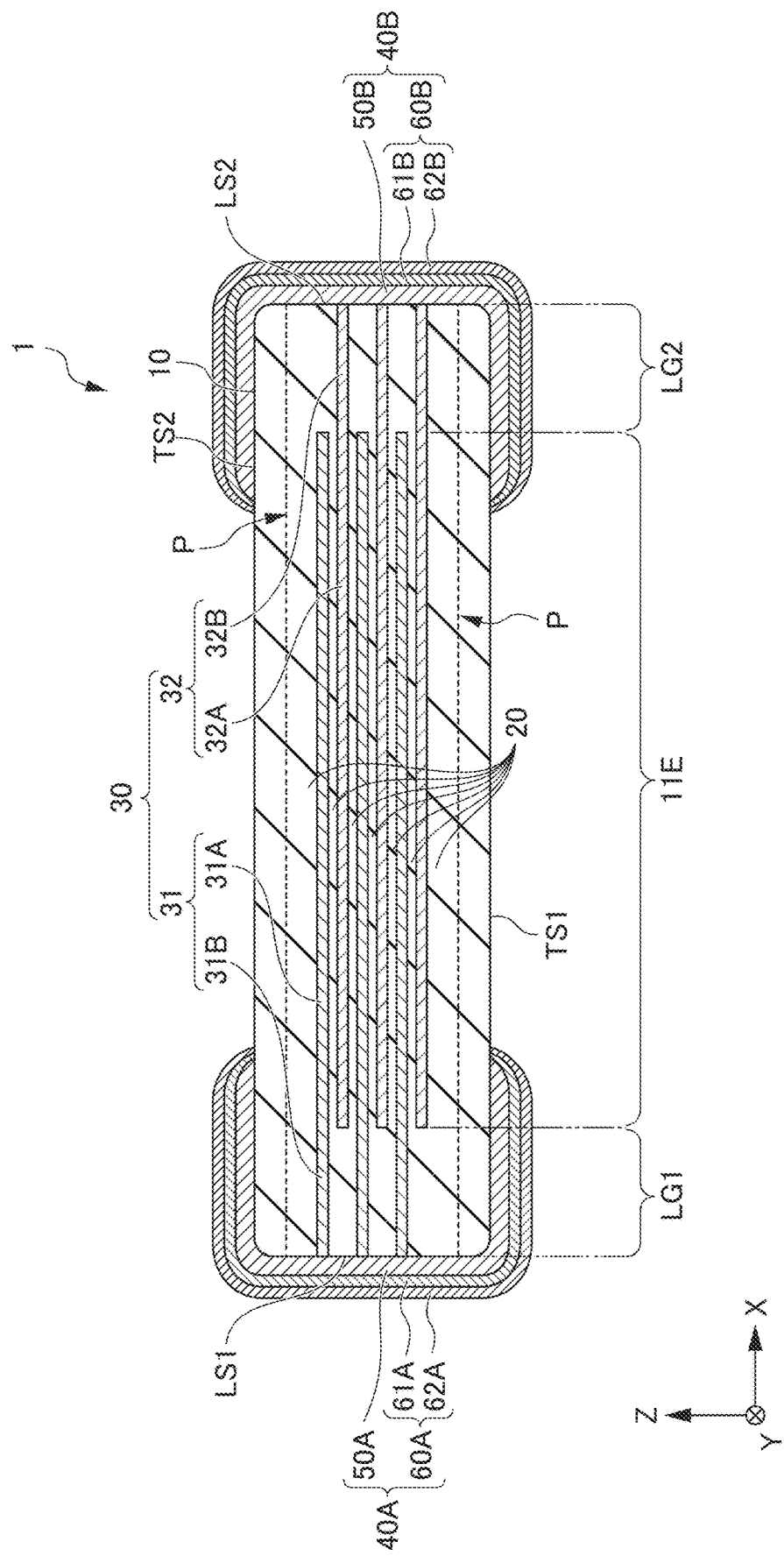
FIG. 11B is a LT cross-sectional view taken along the line XIB-XIB of the multilayer ceramic capacitor shown in FIG. 11A, and corresponding to FIG. 2.

Hereinafter, a first modified example of the multilayer ceramic capacitor 1 of the present preferred embodiment of the present invention will be described. In the following, components which are the same as or corresponding to those of the first preferred embodiment of the present invention are denoted by the same reference numerals, and detailed description thereof is omitted. FIG. 11A is an external perspective view of a multilayer ceramic capacitor 1 of the first modified example of the present preferred embodiment of the present invention, and corresponds to FIG. 1. FIG. 11B is a LT cross-sectional view taken along the line XIB-XIB of the multilayer ceramic capacitor shown in FIG. 11A. FIG. 11B corresponds to FIG. 2.

In this modified example, a discharge path P is provided on the first main surface-side outer layer portion 12 and the second main surface-side outer layer portion 13 of the multilayer body 10. A discharge path P as shown in FIG. 7 is provided in the second main surface-side outer layer portion 13. The discharge path P shown in FIG. 7 is the same as or similar to the discharge path P provided in the first main surface-side outer layer portion 12.

In the first side surface WS1 and the second side surface WS2, the opening H is also provided in the second main surface-side outer layer portion 13. The opening H is an opening the same as or similar to the opening H provided in the first main surface-side outer layer portion 12. FIG. 11A shows a region of the opening H provided in the first main surface-side outer layer portion 12 in the vicinity of the first main surface TS1, and a region of the opening H provided in the second main surface-side outer layer portion 13 in the vicinity of the second main surface TS2.

In this manner, it is preferable that the discharge paths P are provided in the first main surface-side outer layer portion 12 and the second main surface-side outer layer portion 13. In other words, it is preferable that the discharge paths P are provided on both sides of the first main surface-side outer layer portion 12 and the second main surface-side outer layer portion 13. With such a configuration, it is possible to discharge the hydrogen occluded in the internal electrode layers 30 to the outside of the multilayer ceramic capacitor 1 from not only one of the surfaces, but from the discharge paths P provided on both surfaces of the first main surface-side outer layer portion 12 and the second main surface-side outer layer portion 13. Furthermore, even in a case where the plurality of cavities 80 providing the discharge paths P are provided on both sides of the first main surface-side outer layer portion 12 and the second main surface-side outer layer portion 13, the plurality of cavities 80 are preferably provided on the entire or substantially the entire surface of the first main surface-side outer layer portion 12 and the entire or substantially the entire surface of the second main surface-side outer layer portion 13.

Figure 12A:
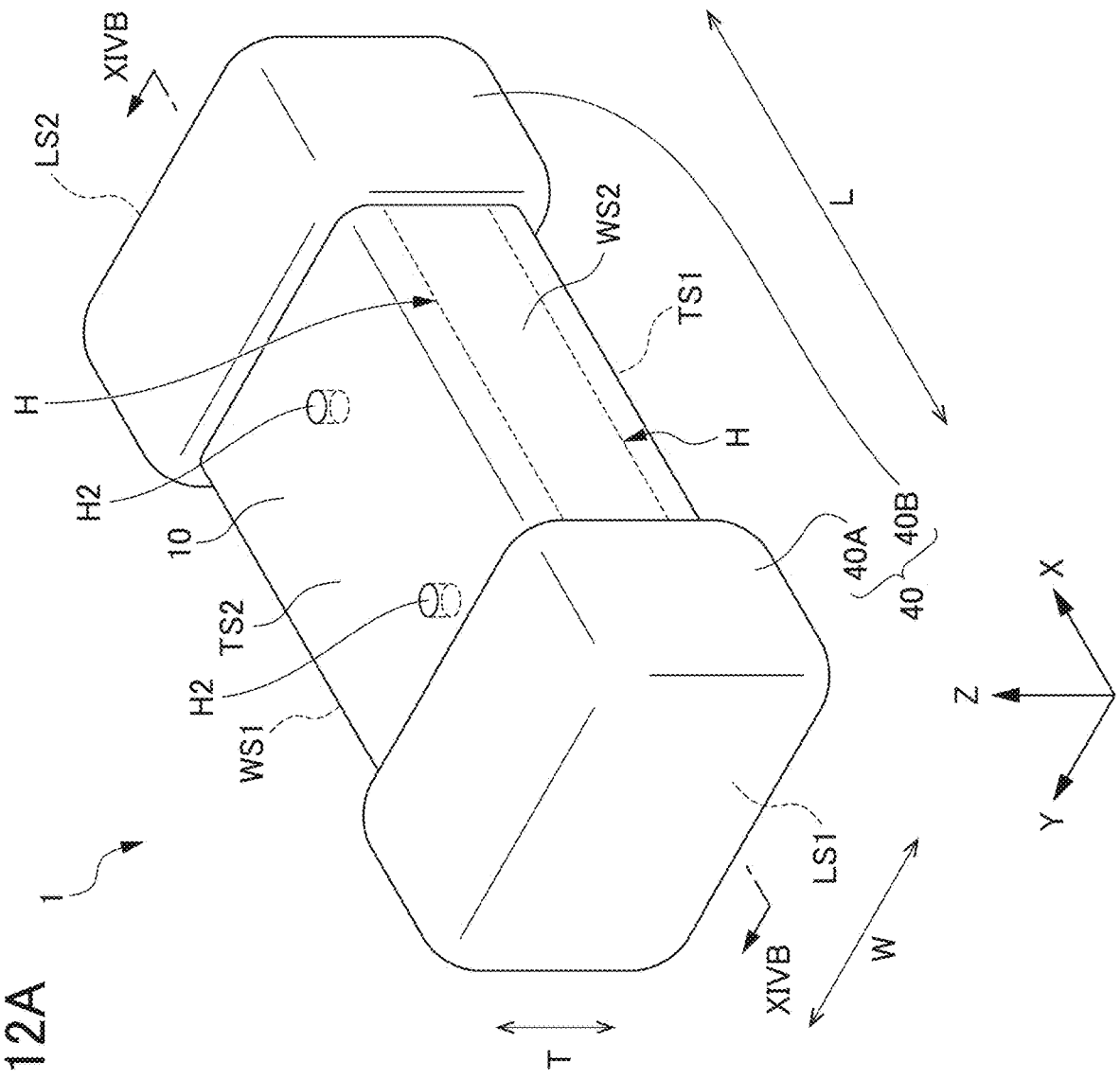
FIG. 12A is an external perspective view of a multilayer ceramic capacitor in which openings are provided in a first main surface and a second main surface.
Figure 12B:
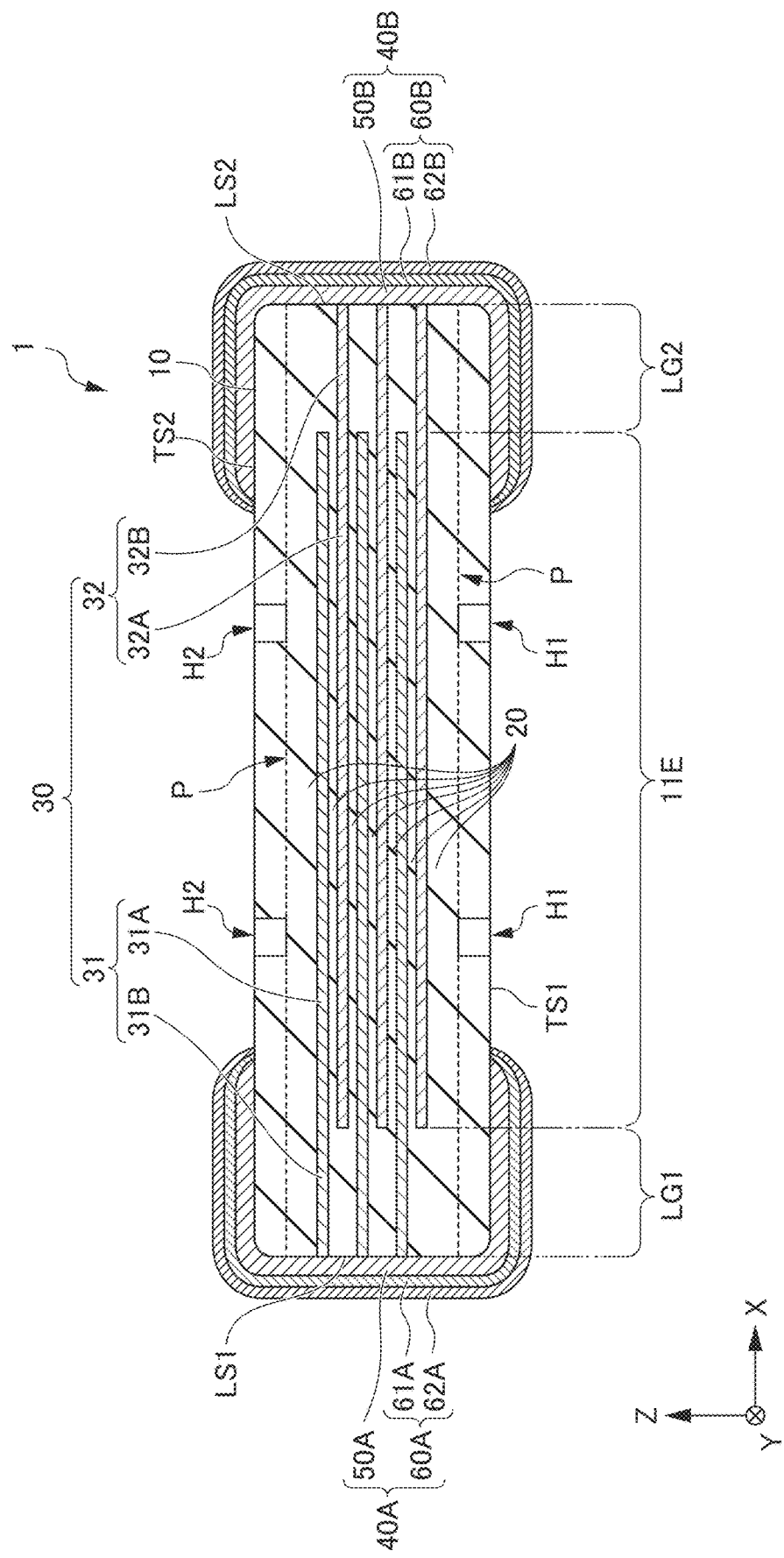
FIG. 12B is an LT cross-sectional view of the multilayer ceramic capacitor in which the openings are provided on the first main surface and the second main surface, and corresponding to the FIG. 11B.

It should be noted that, as shown in FIGS. 12A and 12B, an opening may be provided on either the surface of the first main surface TS1 or the surface of the second main surface TS2. FIG. 12A is an external perspective view of the multilayer ceramic capacitor 1 in which openings are provided in the first main surface TS1 and the second main surface TS2. FIG. 12B is an LT cross-sectional view of the multilayer ceramic capacitor 1 in which openings are provided in the first main surface TS1 and the second main surface TS2. FIG. 12B corresponds to FIG. 11B.

In this manner, discharge holes may be provided to communicate between the discharge path P provided by the plurality of cavities 80 and the first main surface TS1. The openings H1 of the discharge holes may be provided in the first main surface TS1. Also, discharge holes may be provided to communicate between the discharge path P provided by the plurality of cavities 80 and the second main surface TS2. The openings H2 of the discharge holes may be provided in the second main surface TS2. As a result, hydrogen occluded in the internal electrode layer 30 can be more efficiently discharged to the outside of the multilayer ceramic capacitor 1. Therefore, the advantageous effects of the present preferred embodiment can be more effectively provided.

When an opening is provided in either the surface of the first main surface TS1 or the surface of the second main surface TS2, the opening may also be provided in the first side surface WS1 and the second side surface WS2, or the opening may not be provided in the first side surface WS1 and the second side surface WS2.

The shape of the discharge hole is not particularly limited, but is preferably, for example, cylindrical or substantially cylindrical. The size of the discharge hole is not particularly limited, but when the discharge hole is provided in a cylindrical or substantially cylindrical shape, the diameter thereof is preferably about 0.1 μm or more and about 1 μm or less, for example.

When the opening is provided in either the surface of the first main surface TS1 or the surface of the second main surface TS2, firing may be performed after the hole are formed in a laminate sheet prior to firing.

Figure 13A:
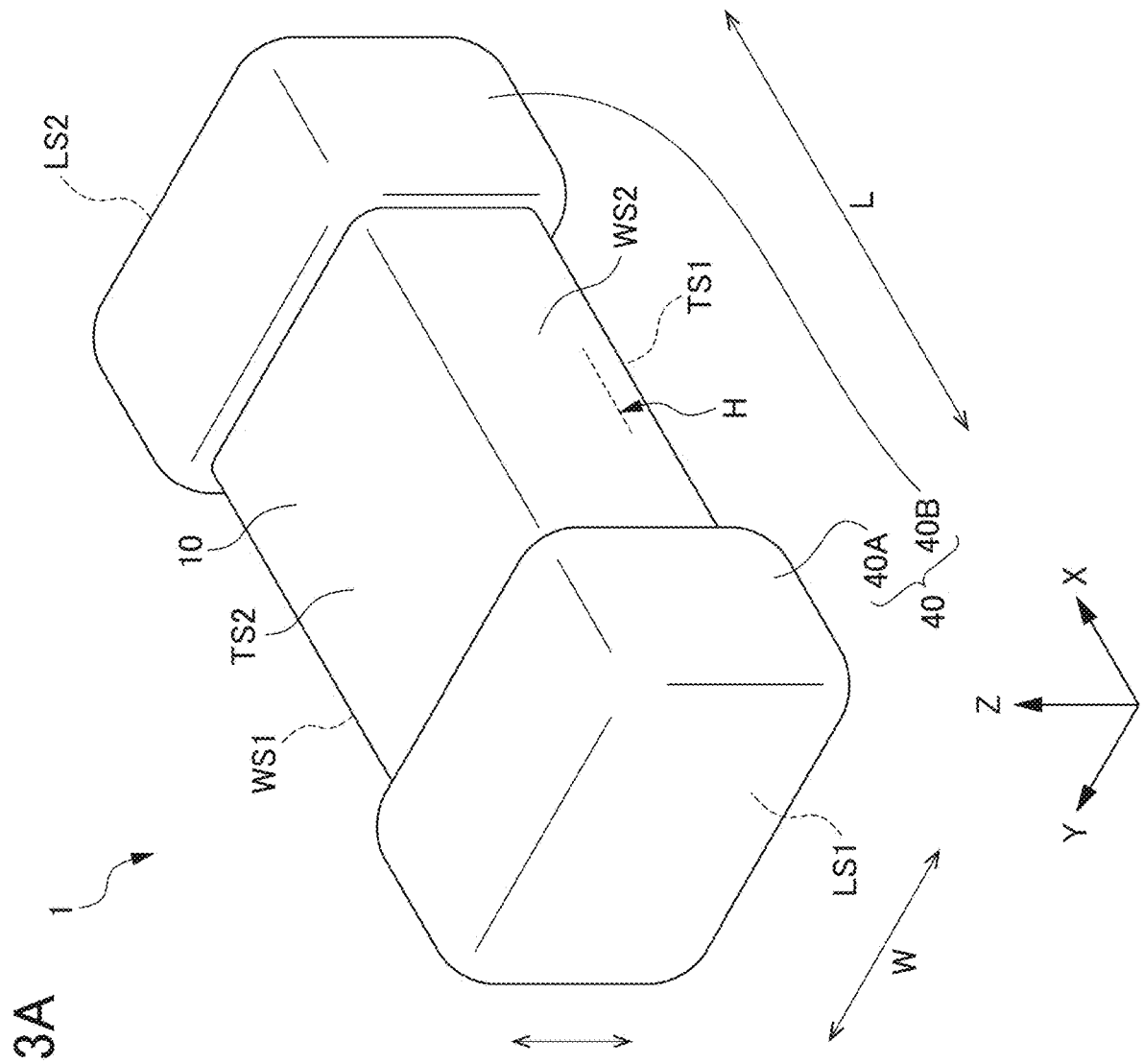
FIG. 13A is an external perspective view of a multilayer ceramic capacitor of a second modified example of the first preferred embodiment of the present invention, and corresponding to FIG. 1.
Figure 13B:
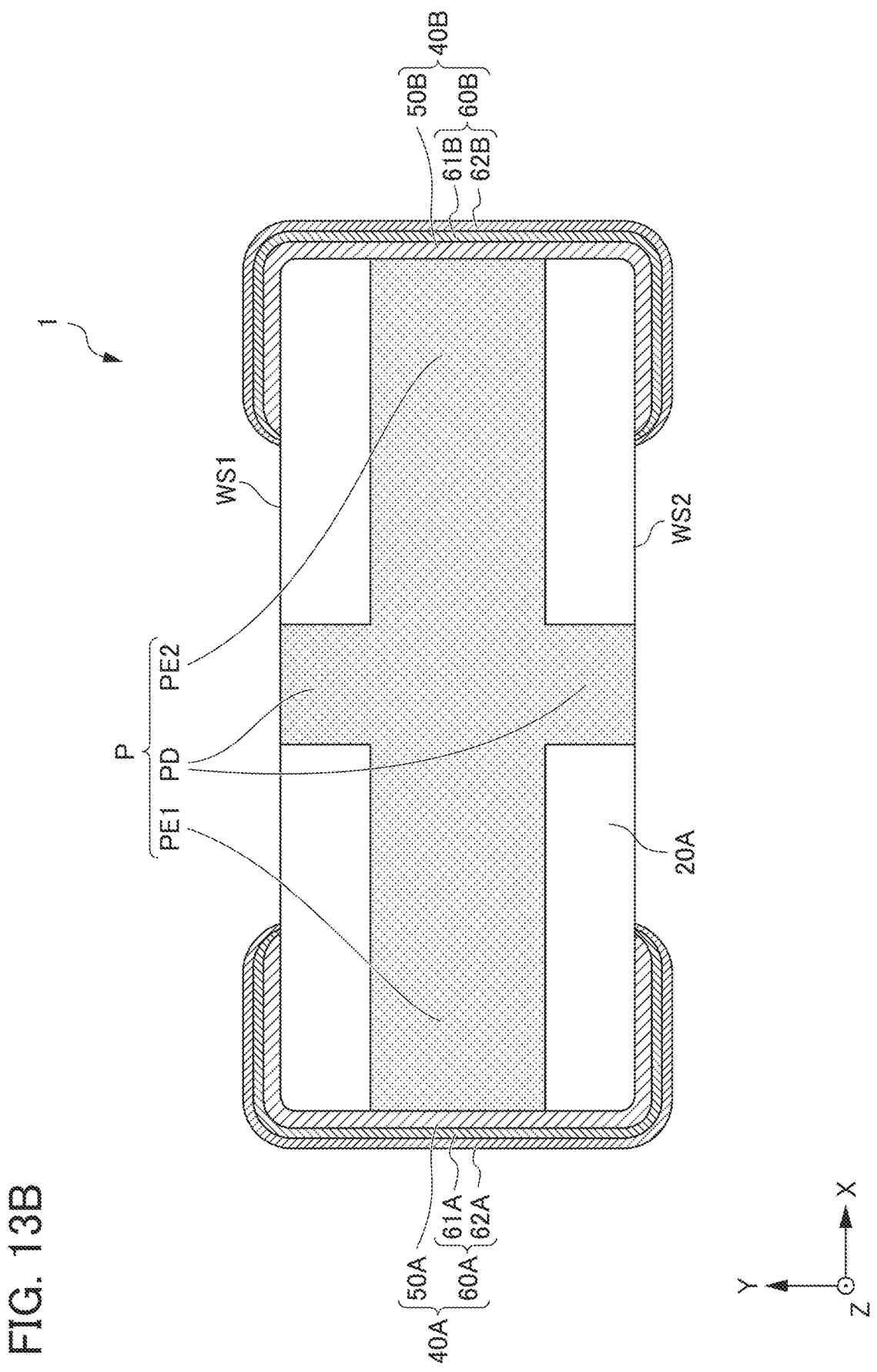
FIG. 13B is a LW cross-sectional view taken along a plane where a discharge path is provided in the multilayer ceramic capacitor of the second modified example of the first preferred embodiment of the present invention, and corresponding to FIG. 7.

Hereinafter, a second modified example of the multilayer ceramic capacitor 1 of the present preferred embodiment of the present invention will be described. In the following, components which are the same as or correspond to those of the first preferred embodiment of the present invention are denoted by the same reference numerals, and detailed description thereof is omitted. FIG. 13A is an external perspective view of a multilayer ceramic capacitor 1 of the second modified example of the present preferred embodiment of the present invention, and corresponds to FIG. 1. FIG. 13B is a LW cross-sectional view along a plane where the discharge path P is provided, in a multilayer ceramic capacitor 1 of a second modified example of the present preferred embodiment of the present invention. FIG. 13B corresponds to FIG. 7.

The discharge path P is not limited to a path provided by the plurality of cavities 80 provided over the entire or substantially the entire surface of the dielectric layer 20. As shown in this modified example, the region in which the plurality of cavities 80 providing the discharge path P are provided may be a specific region.

For example, the plurality of cavities 80 providing the discharge path P may be provided in a cross-shaped region of the surface of the dielectric layer 20 between the plurality of dielectric layers 20 including the first main surface-side outer layer portion 12. More specifically, as shown in FIG. 13B, the recesses 80 providing the discharge path P may be provided in the cross-shaped area of the surface of the first dielectric layer 20A. Similarly, the recesses 80 providing the discharge path P may be provided in the cross-shaped area of the surface of the second dielectric layer 20B. In this case, the discharge path P is provided in a cross-shaped area or substantially in a cross-shaped area of the surface of the first dielectric layer 20A.

The recesses 80 define and function as cavities providing the discharge path P. The region in which the recesses 80 are provided include, for example, a first extension region PE1, a second extension region PE2, and a discharge extension region PD. The first extension region PE1 extends toward the first external electrode 40A. The second extension region PE2 extends toward the second external electrode 40B. The discharge extension region PD extends toward an exposed surface of the multilayer body 10. In the example shown in FIG. 13B, the first extension region PE1 extends toward the first end surface LS1. The second extension region PE2 extends toward the second end surface LS2. The discharge extension region PD extends toward the first side surface WS1 and the second side surface WS2.

The discharge extension region PD extending toward the exposed surface of the multilayer body 10 provides an opening H in the exposed surface of the multilayer body 10. FIG. 13A shows a region of the opening H provided in the first main surface-side outer layer portion 12 in the vicinity of the first main surface TS1. The opening H is preferably provided in at least one of the first side surface WS1 or the second side surface WS2, for example. In the present preferred embodiment of the present invention, the opening H is provided in both of the first side surface WS1 and the second side surface WS2.

With such a configuration, a path connecting between the opening H provided in the surface of the multilayer body 10 which is exposed from the external electrode 40 and the first end surface LS1 where the first external electrode 40A is provided, and a path connecting between the opening H provided in the surface of the multilayer body 10 which is exposed from the external electrode 40 and the second end surface LS2 where the second external electrode 40B is provided, are provided as the discharge path P. Then, according to the configuration of the present modified example, the contact area of the first dielectric layer 20A and the second dielectric layer 20B is increased. Therefore, it is possible to improve the adhesion between the first dielectric layer 20A and the second dielectric layer 20B between which the discharge path P is provided.

Figure 14:
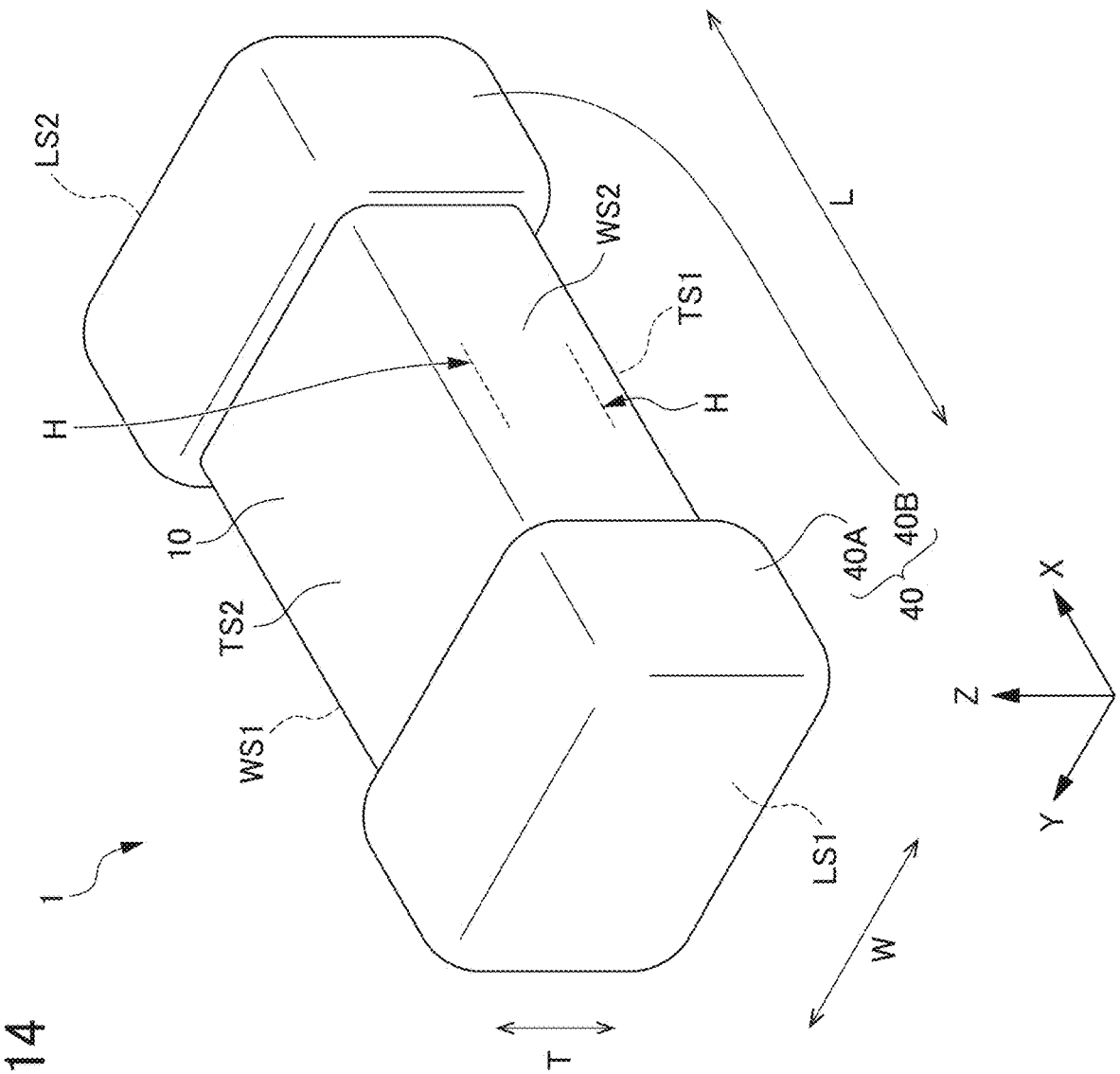
FIG. 14 is an external perspective view of a multilayer ceramic capacitor of a third modified example of a first preferred embodiment of the present invention, and corresponding to FIG. 13A.

Hereinafter, a third modified example of the multilayer ceramic capacitor 1 of the present preferred embodiment of the present invention will be described. In the following, components which are the same as or correspond to those of the first preferred embodiment of the present invention are denoted by the same reference numerals, and detailed description thereof is omitted. FIG. 14 is an external perspective view of a multilayer ceramic capacitor 1 of the third modified example of the present preferred embodiment of the present invention, and corresponds to FIG. 13A.

In this modified example, discharge paths P are provided on the first main surface-side outer layer portion 12 and the second main surface-side outer layer portion 13 of the multilayer body 10. The discharge path P as shown in FIG. 13B is also provided in the second main surface-side outer layer portion 13. The discharge path P shown in FIG. 13B is the same as or similar to the discharge path P provided in the first main surface-side outer layer portion 12.

In the first side surface WS1 and the second side surface WS2, openings H are provided in the second main surface-side outer layer portion 13. The openings H are the same as or similar to the opening H provided in the first main surface-side outer layer portion 12. FIG. 14 shows a region of the opening H provided in the first main surface-side outer layer portion 12 in the vicinity of the first main surface TS1 and a region of the opening H provided in the second main surface-side outer layer portion 13 in the vicinity of the second main surface TS2.

In this manner, it is preferable that the discharge path P is provided in the first main surface-side outer layer portion 12 and the second main surface-side outer layer portion 13. In other words, it is preferable that the discharge paths P are provided on both sides of the first main surface-side outer layer portion 12 and the second main surface-side outer layer portion 13. With such a configuration, it is possible to discharge the hydrogen occluded in the internal electrode layers 30 to the outside of the multilayer ceramic capacitor 1 from not only one of the surfaces, but from the discharge paths P provided on both surfaces of the first main surface-side outer layer portion 12 and the second main surface-side outer layer portion 13.

Figure 15A:
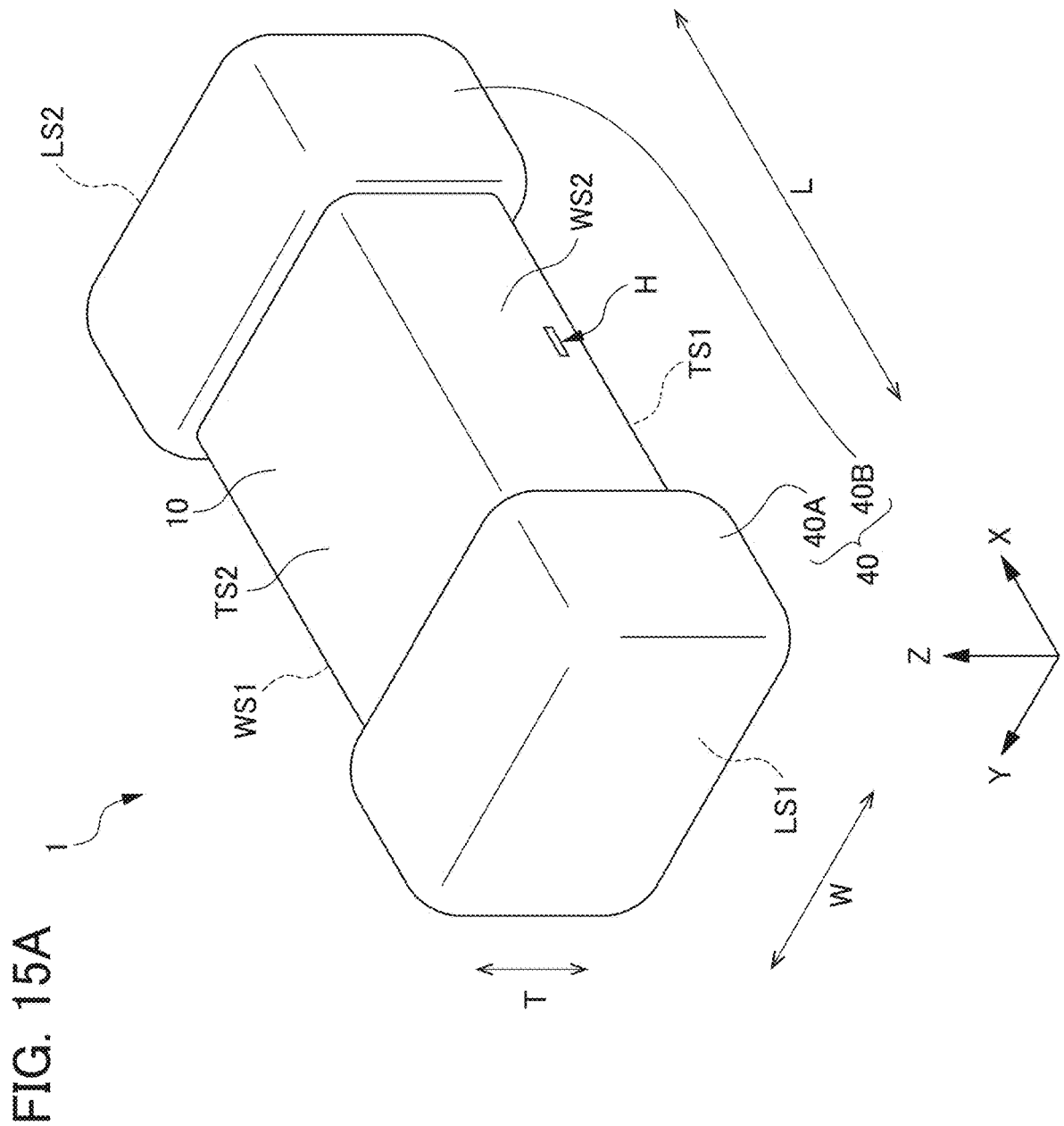
FIG. 15A is an external perspective view of a multilayer ceramic capacitor of a fourth modified example of the first preferred embodiment of the present invention, and corresponding to FIG. 1.

Hereinafter, a fourth modified example of the multilayer ceramic capacitor 1 of the present preferred embodiment of the present invention will be described. In the following, components which are the same as or correspond to those of the first preferred embodiment of the present invention are denoted by the same reference numerals, and detailed description thereof is omitted. FIG. 15A is an external perspective view of a multilayer ceramic capacitor 1 of the fourth modified example of the present preferred embodiment of the present invention, and corresponds to FIG. 1. FIG. 15B is an LW cross-sectional view along a plane where the discharge path P is provided, in a multilayer ceramic capacitor 1 of a fourth modified example of the present preferred embodiment of the present invention. FIG. 15B corresponds to FIG. 7.

The discharge path P is not limited to a path provided by the plurality of cavities 80 provided on the surface of the dielectric layer 20. As shown in this modified example, the discharge path P may be a path provided by a groove.

For example, a groove providing the discharge path P may be provided in the surface of the dielectric layer 20 between the plurality of dielectric layers 20 including the first main surface-side outer layer portion 12. More specifically, as shown in FIG. 15B, a groove that provides the discharge path P may be provided in the surface of the first dielectric layer 20A. Similarly, a groove that provides the discharge path P may be provided in the surface of the second dielectric layer 20B. Furthermore, a groove that provides the discharge path P may be provided only in one surface of the first dielectric layer 20A or the second dielectric layer 20B.

The groove providing the discharge path P includes, for example, a first extension region PE1, a first extension region PE1, and a discharge extension region PD. The first extension region PE1 extends toward the first external electrode 40A. The second extension region PE2 extends toward the second external electrode 40B. The discharge extension region PD extends toward an exposed surface of the multilayer body 10. In the example shown in FIG. 15B, the first extension region PE1 extends toward the first end surface LS1. The second extension region PE2 extends toward the second end surface LS2. The discharge extension region PD extends toward the first side surface WS1 and the second side surface WS2.

The discharge extension region PD extending toward the exposed surface of the multilayer body 10 provides an opening H in the exposed surface of the multilayer body 10. FIG. 15A shows a region of the opening H provided in the first main surface-side outer layer portion 12 in the vicinity of the first main surface TS1. The opening H is preferably provided in at least one of the first side surface WS1 or the second side surface WS2, for example. In the present preferred embodiment of the present invention, the opening H is provided in both of the first side surface WS1 and the second side surface WS2. Furthermore, the groove that provides the discharge path P is provided in at least one of the first main surface-side outer layer portion 12 and the second main surface-side outer layer portion 13 of the multilayer body 10. The discharge path P may be provided on the first main surface-side outer layer portion 12 and the second main surface-side outer layer portion 13 of the multilayer body 10.

With such a configuration, a path connecting between the opening H provided on the surface of the multilayer body 10 which is exposed from the external electrode 40 and the first end surface LS1 where the first external electrode 40A is provided, and a path connecting between the opening H provided on the surface of the multilayer body 10 which is exposed from the external electrode 40 and the second end surface LS2 where the second external electrode 40B is provided, are provided as the discharge path P.

Furthermore, the path connecting between the opening H provided on the surface of the multilayer body 10 which is exposed from the external electrode 40 and the first end surface LS1 where the first external electrode 40A is provided, and the path connecting between the opening H provided in the surface of the multilayer body 10 which is exposed from the external electrode 40 and the second end surface LS2 where the second external electrode 40B is provided, may be provided as a common path, or may be provided as separate paths.

Figure 16:
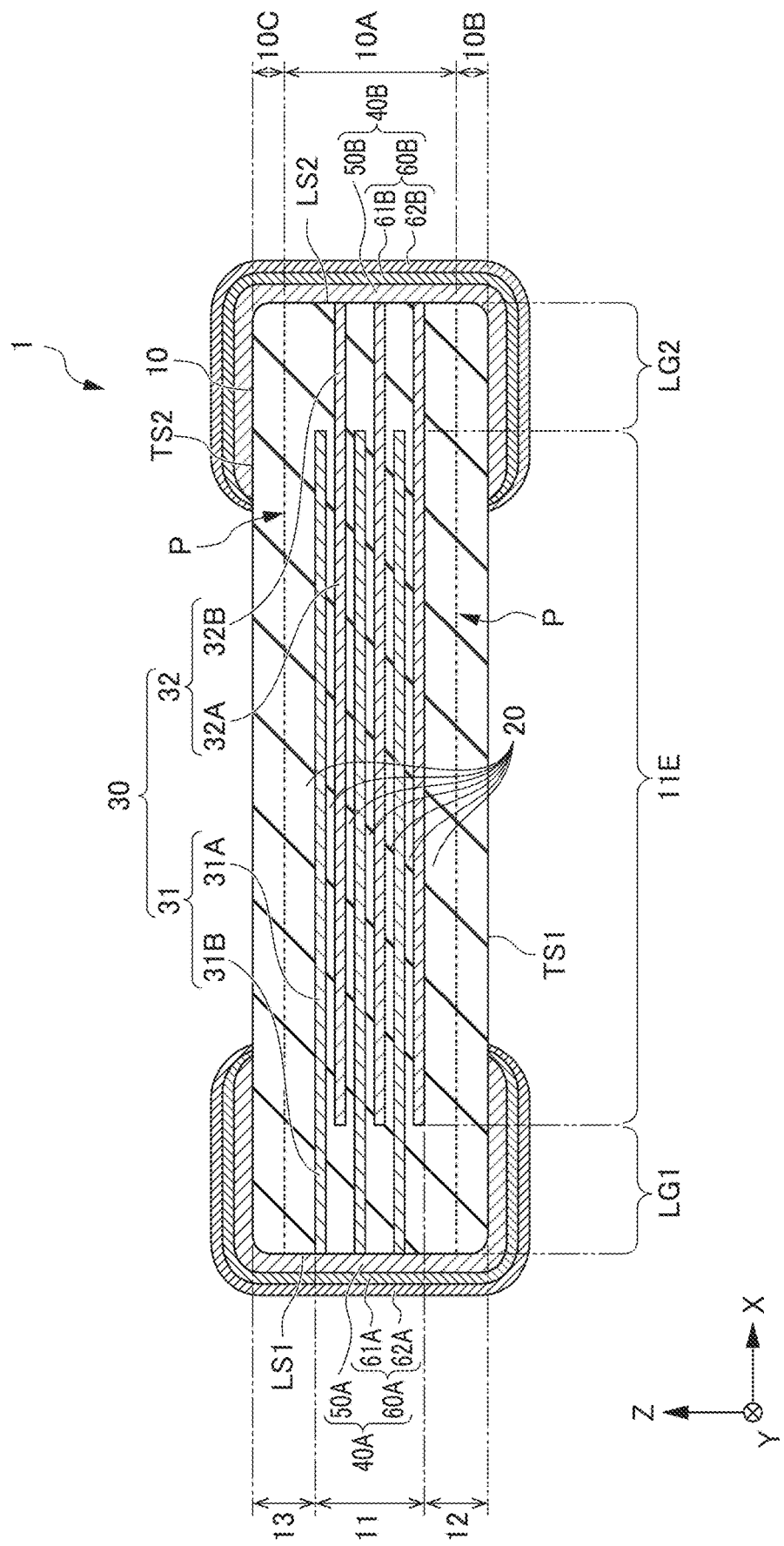
FIG. 16 is a diagram corresponding to FIG. 11B, and is a diagram for explaining the region the demarcation of a multilayer body 10.

Next, a non-limiting example of a method of manufacturing the multilayer ceramic capacitor 1 of the present preferred embodiment of the present invention will be described. FIG. 16 corresponds to FIG. 11B. FIG. 16 is a diagram for explaining the region demarcation of the multilayer body 10.

A dielectric sheet for the dielectric layer 20 and a conductive paste for the internal electrode layer 30 are provided. The conductive paste for the dielectric sheet and the internal electrode includes a binder and a solvent. A known binder and solvent may be used. A paste made of a conductive material is, for example, one in which an organic binder and an organic solvent are added to a metal powder.

On the dielectric sheet, a conductive paste for the internal electrode layer 30 is printed in a predetermined pattern by, for example, screen printing or gravure printing. More specifically, a conductive paste layer is formed by applying a paste made of a conductive material on the dielectric sheet by a method such as the printing method described above. Thus, the dielectric sheet in which the pattern of the first internal electrode layer 31 is provided, and the dielectric sheet in which the pattern of the second internal electrode layer 32 is provided are prepared. Furthermore, as the dielectric sheet for the first main surface-side outer layer portion and the second main surface-side outer layer portion, a dielectric sheet on which the pattern of the internal electrode layer is not formed is also prepared.

A predetermined number of dielectric sheets on which the pattern of the internal electrode layer is not formed are laminated. As a result, a portion of the portion defining and functioning as the first main surface-side outer layer portion 12 is formed. More specifically, in the portion defining and functioning as the first main surface-side outer layer portion 12, a portion is formed which excludes a portion defining and functioning as the first main surface-side region 10B shown in FIG. 16. On top of that, the dielectric sheet on which the pattern of the first internal electrode layer 31 is printed and the dielectric sheet on which the pattern of the second internal electrode layer 32 is printed are sequentially laminated alternately, such that a portion is formed which defines and functions as the inner layer portion 11. On this portion defining and functioning as the inner layer portion 11, a predetermined number of dielectric sheets on which the pattern of the internal electrode layer is not printed are laminated, such that a portion of the portion defining and functioning as the second main surface-side outer layer portion 13 is formed. More specifically, in the portion defining and functioning as the second main surface-side outer layer portion 13, a portion excluding the portion defining and functioning as the second main surface-side region 10C shown in FIG. 15 is formed. As a result, in the portion defining and functioning as the multilayer body 10, the laminated sheet main body of the portion defining and functioning as the main body region 10A of the multilayer body 10 shown in FIG. 15 is manufactured.

The laminated sheet body is pressed in the lamination direction by hydrostatic pressing, for example, such that a laminated block main body of a portion defining and functioning as the main body region 10A of the multilayer body 10 is manufactured. Here, when performing the pressing, it is possible to form recesses in the laminated block main body by crimping a transfer plate provided with an uneven pattern on the surface, at a portion where recesses of the laminated block main body are to be formed. Here, by controlling the shape, size, depth, density, and the like of the concavo-convex pattern provided on the transfer plate, it is possible to form the desired recesses described in the preferred embodiments of the present invention.

The laminated block main body is cut to a predetermined size, such that laminate chips are cut out. At this time, corners and ridges of the laminate chips may be rounded by barrel polishing or the like, for example.

Here, a plurality of dielectric sheets on which the pattern of the internal electrode layer is not formed are laminated, such that, in the portion defining and functioning as the first main surface-side outer layer portion 12, a laminated sheet of the portion defining and functioning as the first main surface-side region 10B shown in FIG. 15 is manufactured as the first main surface-side laminated sheet. Similarly, a plurality of dielectric sheets on which the pattern of the internal electrode layer is not formed are laminated, such that, in the portion defining and functioning as the second main surface-side outer layer portion 13, the laminated sheet of the portion defining and functioning as the second main surface-side region 10C shown in FIG. 15 is manufactured as the second main surface-side laminated sheet.

The first main surface-side laminated sheet and the second main surface-side laminated sheet are pressed in the lamination direction by hydrostatic pressing, for example, such that the first main surface-side laminated block of the portion defining and functioning as the first main surface-side region 10B and the second main surface-side laminated block of the portion defining and functioning as the second main surface-side region 10C are manufactured. Here, when performing the pressing, it is possible to form recesses in the first main surface-side laminated block and the second main surface-side laminated block by crimping a transfer plate provided with an uneven pattern on the surface, at a portion where recesses of the first main surface-side laminated block and the second main surface-side laminated block are to be formed. Here, by controlling the shape, size, depth, density, and the like of the concavo-convex pattern provided on the transfer plate, it is possible to form the desired recesses described in the preferred embodiments of the present invention.

The first main surface-side laminated block and the second main surface-side laminated block are cut out to the same or substantially the same size as the laminated chip main body. The cut-out first main surface-side laminated block is provided in an aligned manner. On the first main surface-side laminated block aligned, the laminated chip main body before firing is superimposed. Furthermore, the cut-out second main surface-side laminated block is superimposed thereon.

In this state, the laminated chip including the laminated chip main body, the first main surface-side laminated block, and the second main surface-side laminated block is subjected to a temporary crimping press at a pressure such that it is possible to maintain a plurality of cavities while heat-treating, such that a laminated chip in which a discharge path is formed by a plurality of cavities is manufactured. The heat treatment temperature at this time is preferably about 60° C. or higher and about 100° C. or less, for example.

Thereafter, a conductive paste for a base electrode layer is applied to the first end surface and the second end surface of the laminated chip by, for example, a dipping method, a screen printing method, or other methods. The conductive paste for the base electrode layer may include a metal component, a ceramic component, a solvent, a dispersant, and other components. In the conductive paste of the present preferred embodiment of the present invention, for example, Ni is used as the metal component, and $BaTiO_3$ is used as the ceramic component. In the present preferred embodiment of the present invention, the conductive paste for the base electrode layer extends from the first end surface and the second end surface of the laminated chip, and covers a portion of each of the first main surface, the second main surface, the first side surface, and the second side surface.

The laminated chip including the internal electrode layers and the dielectric layers, and a conductive paste for the base electrode layer applied to the laminated chip are simultaneously fired. As a result, a multilayer body in which the base electrode layer is formed is manufactured. The temperature of the firing process at this time is preferably about 900° C. or higher and about 1400° C. or lower, for example.

Thereafter, a plated layer is formed on the surface of the base electrode layer. The plated layer includes at least one selected from, for example, Cu, Ni, Sn, Ag, Pd, Ag—Pd alloy, Au or the like. More preferably, the plated layer includes at least one of Cu, Ni, and Sn, for example. Alternatively, the plated layer includes two or more of Cu, Ni, and Sn, for example. In the present preferred embodiment of the present invention, for example, Cu plating, Ni plating, and Sn plating are performed in this order on the base electrode layer to form the plated layer.

The completed multilayer ceramic capacitor 1 is put into an oven and subjected to heat treatment at a temperature of about 150° C. for about one hour, for example. There is no particular limitation on the atmosphere in the oven at this time. By performing such heat treatment, hydrogen atoms accumulated in the internal electrode layers 30 and the external electrodes 40 can be bonded as hydrogen molecules. The bonded hydrogen molecules can be discharged to the outside of the multilayer ceramic capacitor 1 through the discharge path P.

By such a manufacturing process, the multilayer ceramic capacitor 1 is manufactured.

Figure 18:
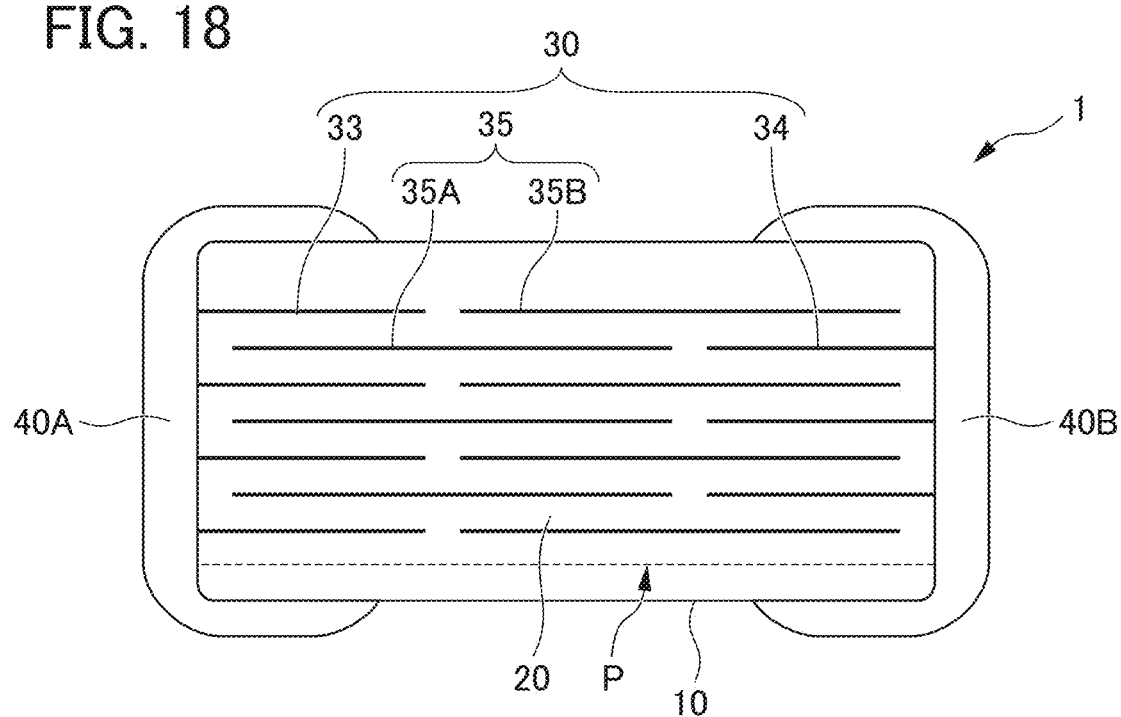
FIG. 18 is a diagram of a multilayer ceramic capacitor including a three-portion structure.
Figure 19:
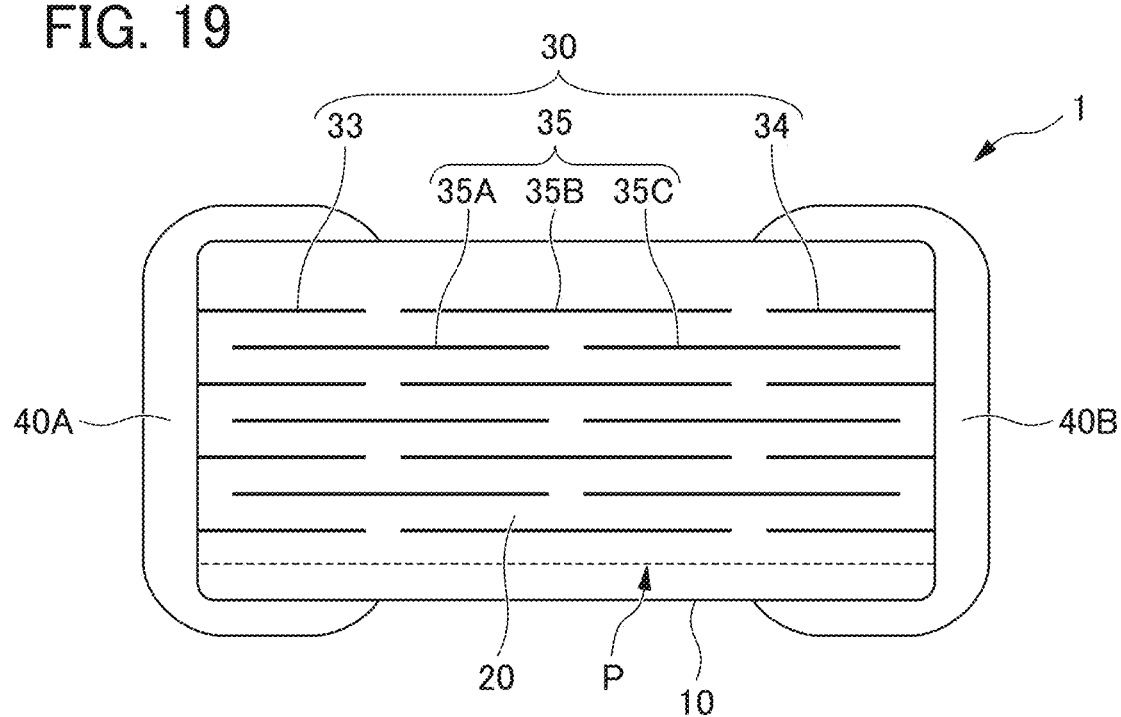
FIG. 19 is a diagram of a multilayer ceramic capacitor including a four-portion structure.

The configuration of the multilayer ceramic capacitor 1 is not limited to the configuration shown in FIGS. 1 to 4. For example, the multilayer ceramic capacitor 1 may be a multilayer ceramic capacitor including a two-portion structure, a three-portion structure, or a four-portion structure as illustrated in FIG. 17, FIG. 18, and FIG. 19, respectively.

Figure 17:
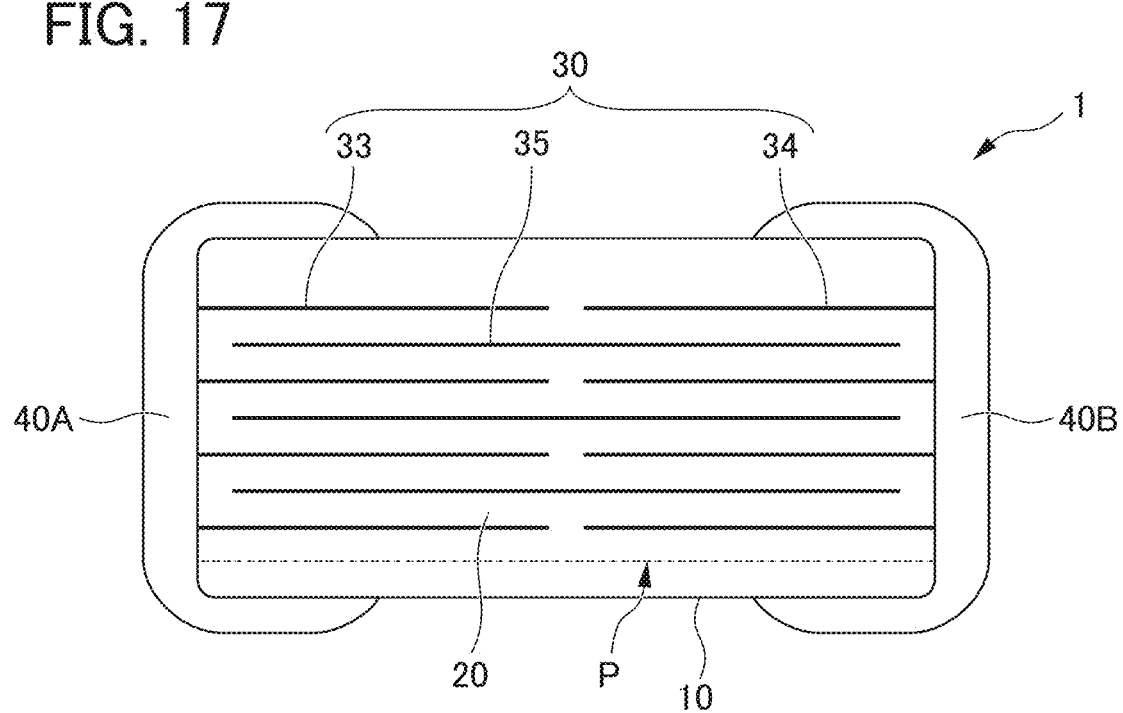
FIG. 17 is a diagram of a multilayer ceramic capacitor including a two-portion structure.

The multilayer ceramic capacitor 1 shown in FIG. 17 is a multilayer ceramic capacitor 1 including a two-portion structure. The internal electrode layer 30 includes a first internal electrode layer 33 and a second internal electrode layer 34. The internal electrode layer 30 further includes a floating internal electrode layer 35. The floating internal electrode layer 35 does not extend to either of the first end surface LS1 and the second end surface LS2. The multilayer ceramic capacitor 1 shown in FIG. 18 is a multilayer ceramic capacitor 1 including a three-portion structure. The three-portion structure includes, as the floating internal electrode layer 35, a first floating internal electrode layer 35A and a second floating internal electrode layer 35B. The multilayer ceramic capacitor 1 shown in FIG. 19 is a multilayer ceramic capacitor 1 including a four-portion structure. The four-portion structure includes, as the floating internal electrode layer 35, a first floating internal electrode layer 35A, a second floating internal electrode layer 35B, and a third floating internal electrode layer 35C. Thus, by providing the floating internal electrode layer 35 as the internal electrode layer 30, the multilayer ceramic capacitor 1 has a structure in which the opposing electrode portion is divided into a plurality of opposing electrode portions. With such a configuration, a plurality of capacitor components are provided between the opposing internal electrode layers 30, such that these capacitor components are connected in series. Therefore, the voltage applied to the respective capacitor components is lowered, such that it is possible to achieve a high breakdown voltage of the multilayer ceramic capacitor 1. In addition, the multilayer ceramic capacitor 1 of the present preferred embodiment may include a five or more-portion structure.

According to the multilayer ceramic capacitor 1 of the present preferred embodiment of the present invention, the following advantageous effects are achieved.

(1) The multilayer ceramic capacitor 1 according to a preferred embodiment of the present invention includes the multilayer body 10 including the plurality of laminated dielectric layers 20, and the plurality of laminated internal electrode layers 30 on the dielectric layers 20, the multilayer body 10 further including the first main surface TS1 and the second main surface TS2 which oppose each other in the lamination direction, the first end surface LS1 and the second end surface LS2 which oppose each other in the length direction perpendicular or substantially perpendicular to the lamination direction, and the first side surface WS1 and the second side surface WS2 which oppose each other in the width direction perpendicular or substantially perpendicular to the lamination direction and the length direction; and the external electrodes 40 connected to the internal electrode layers 30. The multilayer body 10 further includes the inner layer portion 11 including, in the lamination direction, internal electrode layers 30 from an internal electrode layer 30 located closest to the first main surface TS1 to an internal electrode layer 30 located closest to the second main surface TS2 among the plurality of internal electrode layers 30, the plurality of internal electrode layers 30 opposing each other with the dielectric layers 20 interposed therebetween in the inner layer portion 11, the first main surface-side outer layer portion 12 including the plurality of dielectric layers 20 located between the first main surface TS1 and the internal electrode layer 30 located closest to the first main surface TS1 among the plurality of internal electrode layers 30, and the second main surface-side outer layer portion 13 including the plurality of dielectric layers 20 located between the second main surface TS2 and the internal electrode layer 30 located closest to the second main surface TS2 among the plurality of internal electrode layers 30, in which at least one of the first main surface-side outer layer portion 12 or the second main surface-side outer layer portion 13 includes the discharge path P provided along a plane perpendicular or substantially perpendicular to the lamination direction, the discharge path P being configured to discharge a chemical element to an outside of the multilayer body 10. With such a configuration, even when hydrogen is occluded in the internal electrode layers 30, the hydrogen occluded in the internal electrode layer 30 can be discharged to the outside of the multilayer ceramic capacitor 1 through the discharge path P. Therefore, the amount of hydrogen contained in the internal electrode layers 30 can be reduced, and the diffusion of hydrogen into the dielectric layer 20 can be reduced. As a result, it is possible to reduce or prevent the deterioration of the insulation resistance of the multilayer ceramic capacitor 1.

(2) The discharge path P of the multilayer ceramic capacitor 1 of the present preferred embodiment of the present invention connects between a surface of the multilayer body 10 covered by one of the external electrodes 40 and a surface of the multilayer body 10 exposed from one of the external electrodes 40. With such a configuration, hydrogen occluded in the internal electrode layers 30 can be more efficiently discharged to the outside of the multilayer ceramic capacitor 1 through the discharge path P.

(3) The discharge path P of the multilayer ceramic capacitor 1 of the present preferred embodiment includes the plurality of cavities 80 provided in the plane. With such a configuration, the discharge path P for discharging the hydrogen occluded in the internal electrode layers 30 to the outside of the multilayer ceramic capacitor 1 can be provided.

(4) The plurality of cavities 80 that provide the discharge path P of the multilayer ceramic capacitor 1 of the present preferred embodiment each include a spherically curved surface. With such a configuration, the resistance when the fluid passes through the discharge path P is reduced.

(5) The plurality of cavities 80 that provide the discharge path P of the multilayer ceramic capacitor 1 of the present preferred embodiment of the present invention each have a height in the lamination direction of about 0.1 µm or more and about 1 µm or less. With such a configuration, the discharge path P can be easily provided.

(6) The external electrodes 40 of the multilayer ceramic capacitor of the present preferred embodiment of the present invention include the first external electrode 40A provided on the first end surface LS1 and the second external electrode 40B provided on the second end surface LS2. Also in the multilayer ceramic capacitor 1 having such a configuration, the advantageous effects of the present invention can be obtained.

(7) The plurality of internal electrode layers 30 of the multilayer ceramic capacitor 1 of the present preferred embodiment of the present invention include the plurality of first internal electrode layers 31 extending toward the first end surface LS1 and the plurality of second internal electrode layers 32 extending toward the second end surface LS2, the first external electrode 40A is connected to the first internal electrode layers 31, and the second external electrode 40B is connected to the second internal electrode layers 32. Also in such a multilayer ceramic capacitor 1, the advantageous effects of the present invention can be obtained.

(9) The discharge path P of the multilayer ceramic capacitor 1 of the present preferred embodiment of the present invention includes a path connecting between the opening H provided in a surface of the multilayer body 10 which is exposed from one of the external electrodes 40 and the first end surface LS1 on which the first external electrode 40A is provided, and a path connecting between the opening H provided on a surface of the multilayer body 10 which is exposed from one of the external electrodes 40 and the second end surface LS2 on which the second external electrode 40B is provided. With such a configuration, hydrogen occluded in the internal electrode layers 30 can be more efficiently discharged to the outside of the multilayer ceramic capacitor 1 through the discharge path P.

(10) The opening H of the multilayer ceramic capacitor 1 of the present preferred embodiment of the present invention is provided on at least one of the first side surface WS1 and the second side surface WS2, and is provided at the same location in the lamination direction as a plane where the discharge path P is provided. With such a configuration, the discharge path P can be easily provided.

(11) The opening H of the multilayer ceramic capacitor 1 of the present preferred embodiment is provided on either a surface of the first main surface TS1 or a surface of the second main surface TS2. With such a configuration, hydrogen occluded in the internal electrode layers 30 can be more efficiently discharged to the outside of the multilayer ceramic capacitor 1 through the discharge path P.

(12) The first external electrode 40A of the multilayer ceramic capacitor 1 of the present preferred embodiment of the present invention includes the first base electrode layer 50A provided on the first end surface LS1 and the first plated layer 60A provided on the first base electrode layer 50A, and the second external electrode 40B includes the second base electrode layer 50B provided on the second end surface LS2 and the second plated layer 60B provided on the second base electrode layer 50B. Also in such a multilayer ceramic capacitor 1, the advantageous effects of the present invention can be obtained.

(13) The first base electrode layer 50A of the multilayer ceramic capacitor 1 of the present preferred embodiment of the present invention is provided on the first end surface LS1, a portion of the first main surface TS1, a portion of the second main surface TS2, a portion of the first side surface WS1, and a portion of the second side surface WS2, the second base electrode layer 50B is provided on the second end surface LS2, a portion of the first main surface TS1, a portion of the second main surface TS2, a portion of the first side surface WS1, and a portion of the second side surface WS2, the first plated layer 60A is provided on the first base electrode layer 50A, and the second plated layer 60B is provided on the second base electrode layer 50B. Also in such a multilayer ceramic capacitor 1, the advantageous effects of the present invention can be obtained.

(14) The first base electrode layer 50A and the second base electrode layer 50B of the multilayer ceramic capacitor 1 of the present preferred embodiment of the present invention include a metal component and a dielectric material. Also in such a multilayer ceramic capacitor 1, the advantageous effects of the present invention can be obtained.

(15) The first plated layer 60A and the second plated layer 60B of the multilayer ceramic capacitor 1 of the present preferred embodiment of the present invention include at least one of Cu, Ni, and Sn. Also in such a multilayer ceramic capacitor 1, the advantageous effects of the present invention can be obtained.

(16) The first plated layer 60A of the multilayer ceramic capacitor 1 of the present preferred embodiment of the present invention includes the first Cu plated layer 63A provided on the first base electrode layer 50A, the first Ni plated layer 61A provided on the first Cu plated layer 63A, and the first Sn plated layer 62A provided on the first Ni plated layer 61A, and the second plated layer 60B includes the second Cu plated layer 63B provided on the second base electrode layer 50B, the second Ni plated layer 61B provided on the second Cu plated layer 63B, and the second Sn plated layer 62B provided on the second Ni plated layer 61B. Also in such a multilayer ceramic capacitor 1, the advantageous effects of the present invention can be obtained.

(17) The first plated layer 60A of the multilayer ceramic capacitor 1 of the present preferred embodiment of the present invention includes the first Ni plated layer 61A provided on the first base electrode layer 50A, and the first Sn plated layer 62A provided on the first Ni plated layer 61A, and the second plated layer 60B includes the second Ni plated layer 61B provided on the second base electrode layer 50B and the second Sn plated layer 62B provided on the second Ni plated layer 61B. Also in such a multilayer ceramic capacitor 1, the advantageous effects of the present invention can be obtained.

(18) The first plated layer 60A of the multilayer ceramic capacitor 1 of the present preferred embodiment of the present invention includes the first Sn plated layer 62A provided on the first base electrode layer 50A, and the second plated layer 60B includes the second Sn plated layer 62B provided on the second base electrode layer 50B. Also in such a multilayer ceramic capacitor 1, the advantageous effects of the present invention can be obtained.

(19) The first external electrode 40A of the multilayer ceramic capacitor 1 of the present preferred embodiment of the present invention includes the first plated layer 60A provided directly on the first end surface LS1, and the second external electrode 40B includes the second plated layer 60B provided directly on the second end surface LS2. Also in such a multilayer ceramic capacitor 1, the advantageous effects of the present invention can be obtained.

(20) The first plated layer 60A of the multilayer ceramic capacitor 1 of the present preferred embodiment of the present invention includes the first Ni plated layer 61A provided on the first end surface LS1, and the first Sn plated layer 62A provided on the first Ni plated layer 61A, and the second plated layer 60B includes the second Ni plated layer 61B provided on the second end surface LS2, and the second Sn plated layer 62B provided on the second Ni plated layer 61B. Also in such a multilayer ceramic capacitor 1, the advantageous effects of the present invention can be obtained.

(21) The discharge path P of the multilayer ceramic capacitor 1 of the present preferred embodiment of the present invention is provided in the first main surface-side outer layer portion 12 and the second main surface-side outer layer portion 13. With such a configuration, hydrogen occluded in the internal electrode layers 30 can be more efficiently discharged to the outside of the multilayer ceramic capacitor 1 through the discharge path P.

Second Preferred Embodiment

Figure 20:
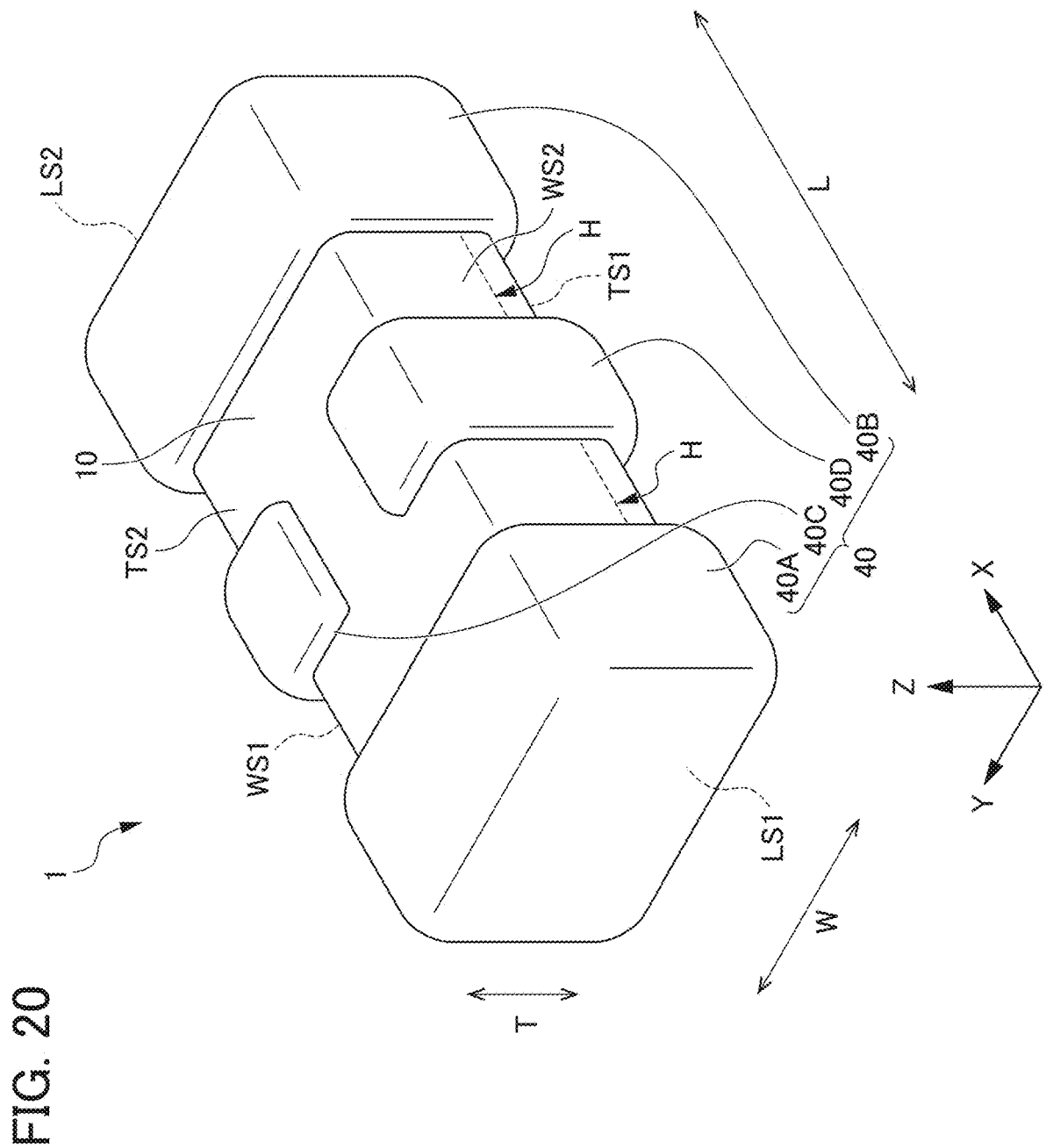
FIG. 20 is an external perspective view of a multilayer ceramic capacitor according to a second preferred embodiment of the present invention.
Figure 21:
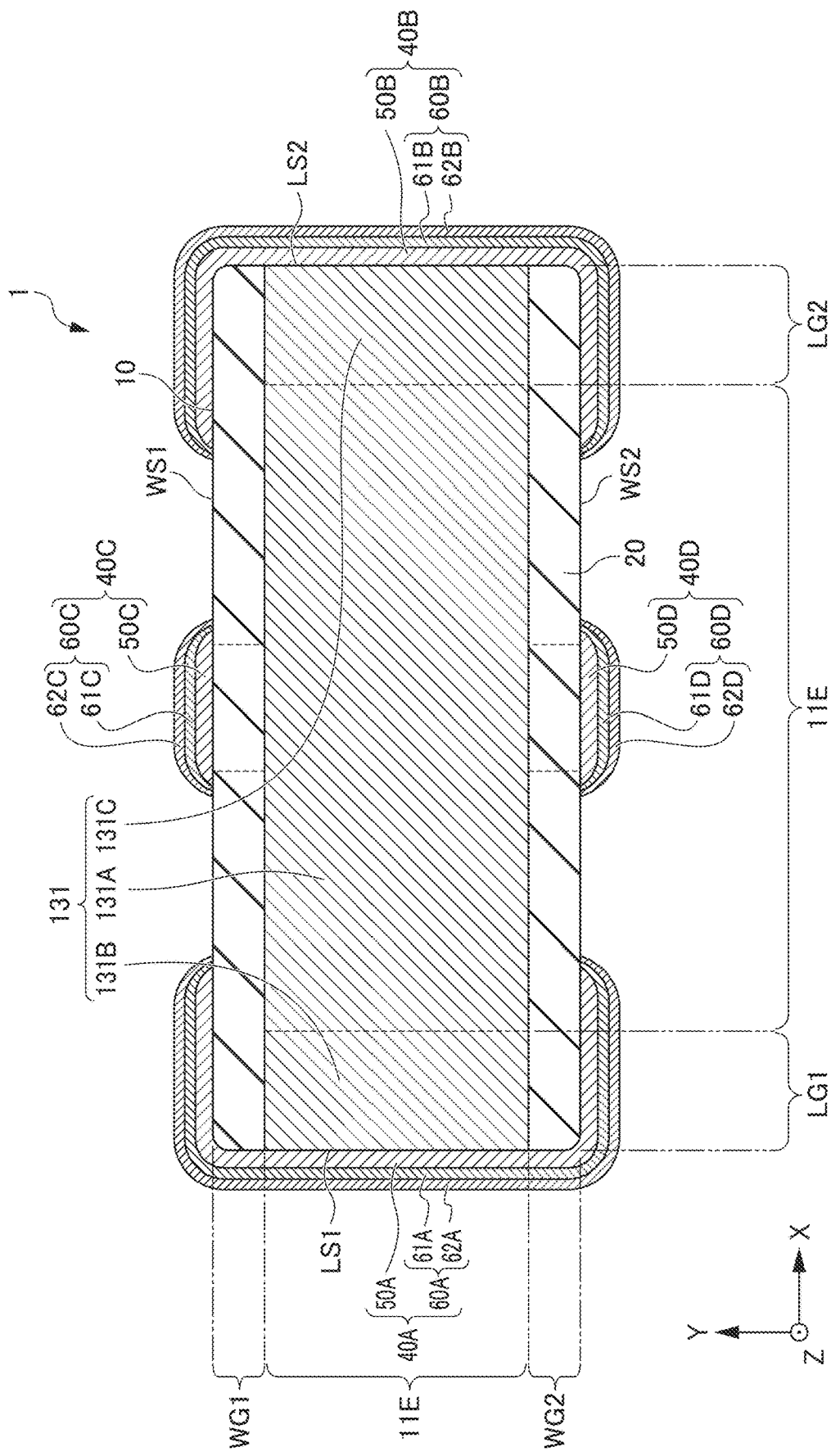
FIG. 21 is an LW cross-sectional view of a first internal electrode layer of the multilayer ceramic capacitor according to the second preferred embodiment of the present invention, and is a view corresponding to FIG. 4.
Figure 22:
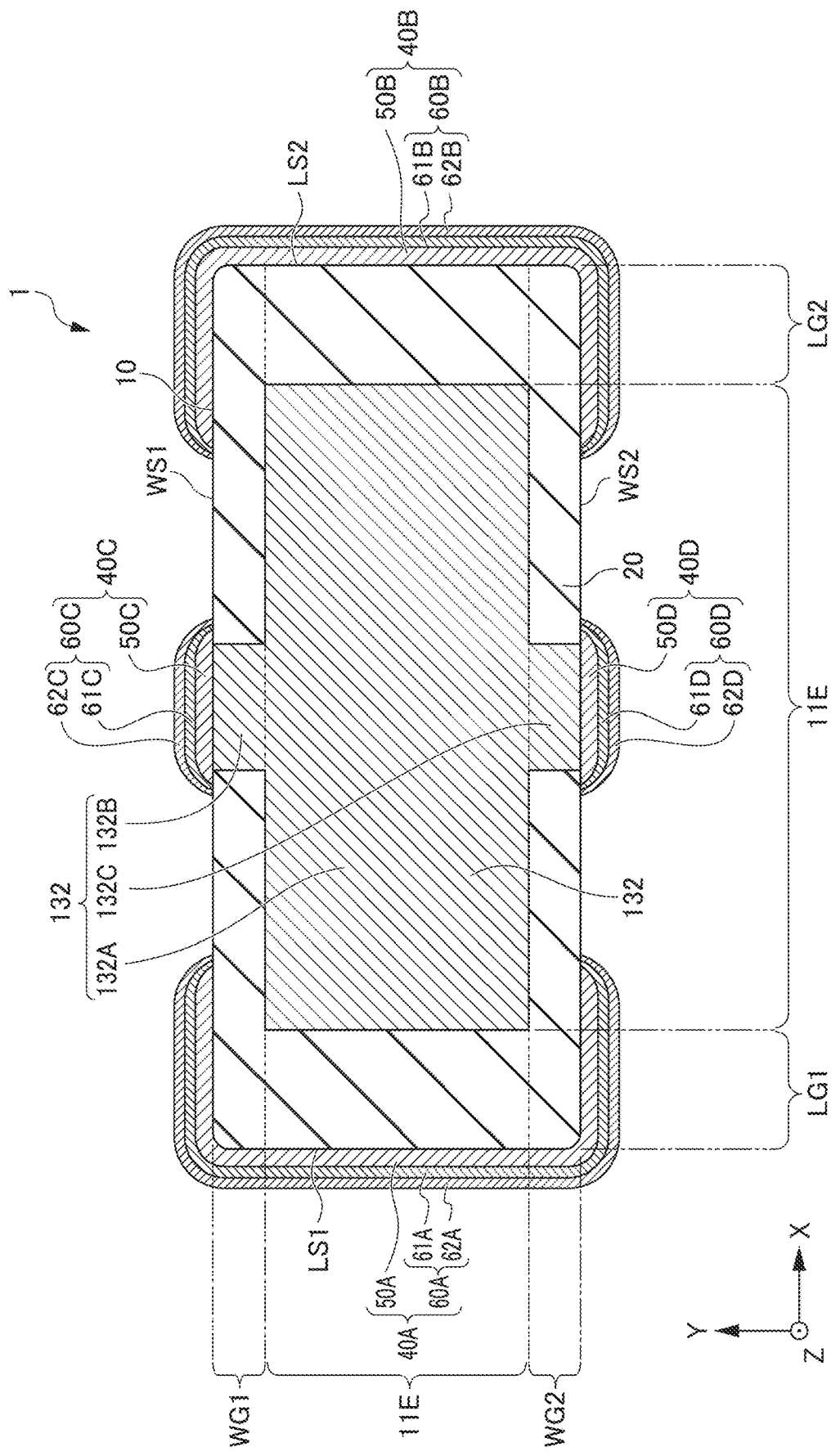
FIG. 22 is an LW cross-sectional view of a second internal electrode layer of the multilayer ceramic capacitor according to the second preferred embodiment of the present invention.
Figure 23:
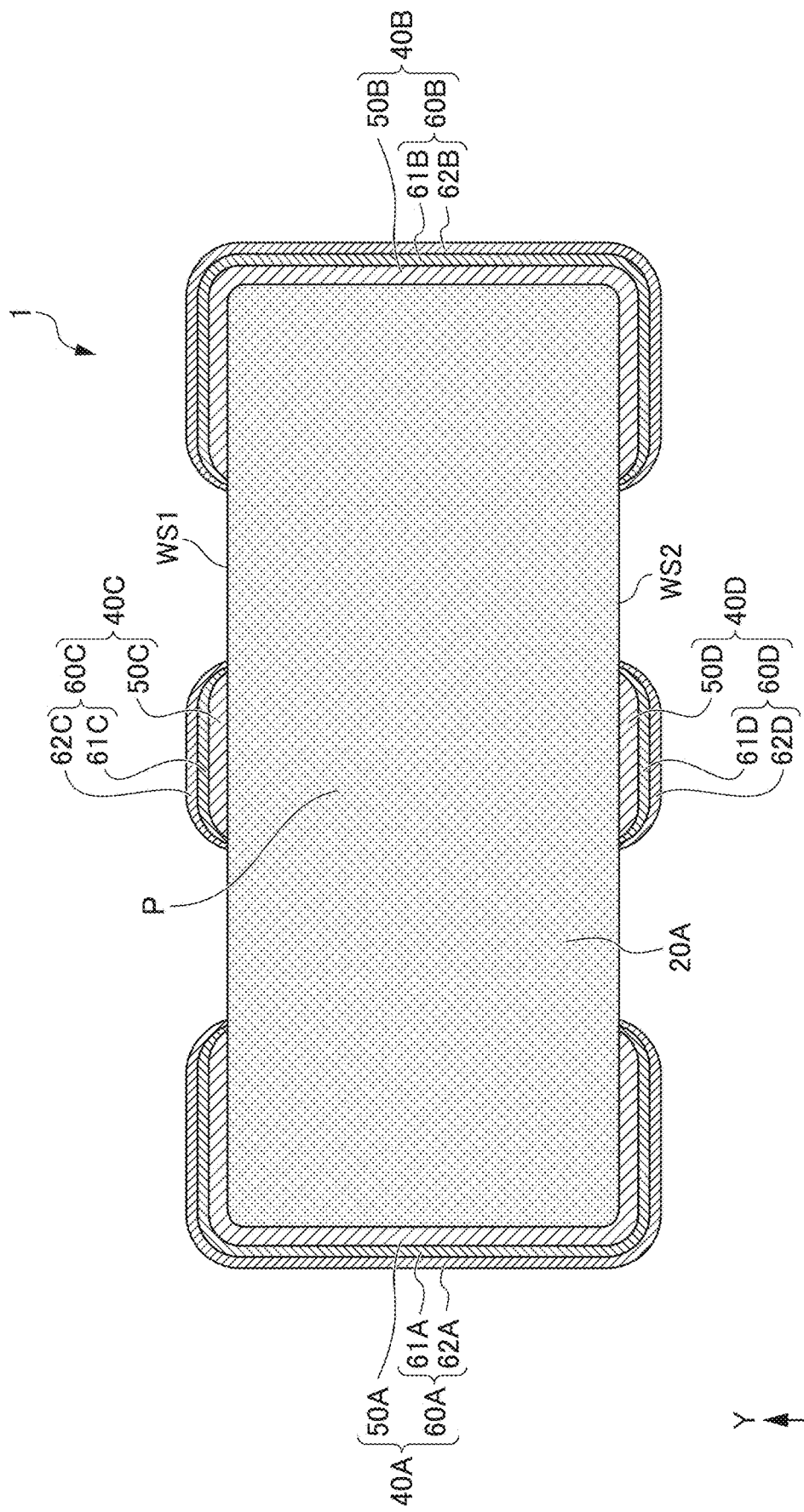
FIG. 23 is an LW cross-sectional view taken along a plane where a discharge path is provided in the multilayer ceramic capacitor of the second preferred embodiment of the present invention, and corresponding to FIG. 7.

Hereinafter, a multilayer ceramic capacitor 1 according to a second preferred embodiment of the present invention will be described. In the following description, the same or corresponding components as those of the first preferred embodiment of the present invention are denoted by the same reference numerals, and the detailed descriptions thereof are omitted. FIG. 20 is an external perspective view of a multilayer ceramic capacitor 1 of the second preferred embodiment of the present invention. FIG. 21 is an LW sectional view of a first internal electrode layer 131 of the multilayer ceramic capacitor 1 of the second preferred embodiment of the present invention. FIG. 21 corresponds to FIG. 4. FIG. 22 is an LW sectional view of a second internal electrode layer 132 of the multilayer ceramic capacitor 1 of the second preferred embodiment of the present invention. FIG. 23 is an LW cross-sectional view along a plane where a discharge path is provided, in the multilayer ceramic capacitor 1 of the second preferred embodiment of the present invention. FIG. 23 corresponds to FIG. 7.

The multilayer ceramic capacitor 1 of the second preferred embodiment of the present invention differs from the first preferred embodiment of the present invention in the internal electrode layers and the external electrodes 40 inside the multilayer body 10.

The plurality of internal electrode layers include a plurality of first internal electrode layers 131 and a plurality of second internal electrode layers 132. The plurality of first internal electrode layers 131 extend toward the first end surface LS1 and the second end surface LS2. The plurality of second internal electrode layers 132 extend toward the first side surface WS1 and the second side surface WS2. The plurality of first internal electrode layers 131 are provided on the plurality of dielectric layers 20. The plurality of second internal electrode layers 132 are provided on the plurality of dielectric layers 20. The plurality of first internal electrode layers 131 and the plurality of second internal electrode layers 132 are alternately provided with the dielectric layers 20 interposed therebetween in the stacking direction T of the multilayer body 10. The first internal electrode layer 131 and the second internal electrode layer 132 sandwich the dielectric layer 20.

The first internal electrode layer 131 is provided on the dielectric layer 20. The first internal electrode layer 131 extends from the first end surface LS1 over the second end surface LS2. The first internal electrode layer 131 is exposed on the first end surface LS1 and the second end surface LS2. More specifically, the first internal electrode layer 131 includes a first opposing portion 131A, a first extension portion 131B, and a second extension portion 131C. The first opposing portion 131A opposes the second internal electrode layer 132. The first extension portion 131B extends from the first opposing portion 131A toward the first end surface LS1. The second extension portion 131C extends from the first opposing portion 131A to the second end surface LS2. The first opposing portion 131A is located at the middle portion on the dielectric layer 20. The first extension portion 131B is exposed on the first end surface LS1. The second extension portion 131C is exposed on the second end surface LS2. The first internal electrode layer 131 is not exposed on the first side surface WS1 or on the second side surface WS2. The shape of the first opposing portion 131A, the shape of the first extension portion 131B, and the shape of the second extension portion 131C of the first internal electrode layer 131 are not particularly limited.

The second internal electrode layer 132 is provided on the dielectric layer 20. The second internal electrode layer 132 is not exposed on the first end surface LS1 or the second end surface LS2, and is exposed on the first side surface WS1 and the second side surface WS2. Specifically, the second internal electrode layer 132 extends between the first side surface WS1 and the second side surface WS2. More specifically, the second internal electrode layer 132 includes a second opposing portion 132A, a third extension portion 132B, and a fourth extension portion 132C. The second opposing portion 132A opposes the first internal electrode layer 131. The third extension portion 132B extends from the second opposing portion 132A toward the first side surface WS1. The fourth extension portion 132C extends from the second opposing portion 132A toward the second side surface WS2. The second opposing portion 132A is located at the middle portion on the dielectric layer 20. The second opposing portion 132A has a rectangular shape. The second opposing portion 132A extends in the direction of the first end surface LS1 and in the direction of the second end surface LS2. The third extension portion 132B is exposed on the first side surface WS1. The fourth extension portion 132C is exposed on the second side surface WS2. The second internal electrode layer 132 is not exposed on the first end surface LS1 or the second end surface LS2. The shape of the second opposing portion 132A, the shape of the third extension portion 132B, and the shape of the fourth extension portion 132C of the second internal electrode layer 132 are not particularly limited.

In the second preferred embodiment of the present invention, the first opposing portion 131A and the second opposing portion 132A are opposed to each other with the dielectric layers 20 interposed therebetween, such that a capacitance is generated, and the characteristics of a capacitor are provided.

The external electrode 40 includes a first external electrode 40A, a second external electrode 40B, a third external electrode 40C, and a fourth external electrode 40D.

The first external electrode 40A is provided on the first end surface LS1, and is connected to the first internal electrode layer 131. More specifically, the first external electrode 40A is connected to the first extension portions 131B of the first internal electrode layers 131. In the second preferred embodiment of the present invention, the first external electrode 40A extends from the first end surface LS1 to a portion of the first main surface TS1 and a portion of the second main surface TS2. The first external electrode 40A further extends from the first end surface LS1 to a portion of the first side surface WS1 and a portion of the second side surface WS2.

The second external electrode 40B is provided on the second end surface LS2, and is connected to the first internal electrode layer 131. More specifically, the second external electrode 40B is connected to the second extension portion 131C of the first internal electrode layers 131. In the second preferred embodiment of the present invention, the second external electrode 40B extends from the second end surface LS2 to a portion of the first main surface TS1 and the second main surface TS2. The second external electrode 40B further extends from the second end surface LS2 to a portion of the first side surface WS1 and a portion of the second side surface WS2.

The third external electrode 40C is provided on the first side surface WS1, and is connected to the second internal electrode layer 132. More specifically, the third external electrode 40C is connected to the third extension portion 132B of the second internal electrode layer 132. In the second preferred embodiment of the present invention, the third external electrode 40C extends from the first side surface WS1 to a portion of the first main surface TS1 and a portion of the second main surface TS2.

The fourth external electrode 40D is provided on the second side surface WS2, and connected to the second internal electrode layer 132. More specifically, the fourth external electrode 40D is connected to the fourth extension portion 132C of the second internal electrode layer 132. In the second preferred embodiment of the present invention, the fourth external electrode 40D extends from the second side surface WS2 to a portion of the first main surface TS1 and a portion of the second main surface TS2.

As the layer configuration of the external electrode 40 of the second preferred embodiment of the present invention, for example, it is possible to use various layer configurations the same as or similar to the external electrodes 40 of the first preferred embodiment of the present invention.

For example, the first external electrode 40A may include a first base electrode layer 50A and a first plated layer 60A. The first plated layer 60A may include a first Ni plated layer 61A and a first Sn plated layer 62A, for example. The second external electrode 40B may include a second base electrode layer 50B and a second plated layer 60B. The second plated layer 60B may include a second Ni plated layer 61B and a second Sn plated layer 62B, for example. The third external electrode 40C may include a third base electrode layer 50C and a third plated layer 60C. The third plated layer 60C may include a third Ni plated layer 61C and a third Sn plated layer 62C, for example. The fourth external electrode 40D may include a fourth base electrode layer 50D and a fourth plated layer 60D. The fourth plated layer 60D may include a fourth Ni plated layer 61D and a fourth Sn plated layer 62D, for example. The first base electrode layer 50A, the second base electrode layer 50B, the third base electrode layer 50C, and the fourth base electrode layer 50D may each be a fired layer, for example.

Similar to the first preferred embodiment of the present invention, the multilayer ceramic capacitor 1 of the second preferred embodiment of the present invention includes a discharge path P through which a chemical element can be discharged to the outside of the multilayer body 10.

Similar to the first preferred embodiment of the present invention, the discharge path P is provided in at least one of the first main surface-side outer layer portion 12 and the second main surface-side outer layer portion 13 of the multilayer body 10. In the second preferred embodiment of the present invention, the discharge path P is provided in the first main surface-side outer layer portion 12.

The discharge path P includes a path connecting between an opening H provided in the surface of the multilayer body 10 which is exposed from the external electrode 40, and the first end surface LS1 on which the first external electrode 40A is provided, and a path connecting between the opening H provided on the surface of the multilayer body 10 which is exposed from the external electrode 40, and the second end surface LS2 in which the second external electrode 40B is provided. Furthermore, the discharge path P preferably includes a path connecting between the opening H provided in the surface of the multilayer body 10 which is exposed from the external electrode 40, and the first side surface WS1 on which the third external electrode 40C is provided, and a path connecting between the opening H provided in the surface of the multilayer body 10 which is exposed from the external electrode 40, and the second side surface WS2 on which the fourth external electrode 40D is provided.

The opening H is preferably provided in at least one of the first side surface WS1 or the second side surface WS2, for example. In the second preferred embodiment of the present invention, the opening H is provided in the first side surface WS1 and the second side surface WS2.

FIG. 20 shows the region of the opening H provided in the second side surface WS2. The opening H is provided in the surface of the multilayer body 10 which is exposed from the first external electrode 40A, the second external electrode 40B, the third external electrode 40C, and the fourth external electrode 40D. That is, the opening H is provided in the exposed surface of the multilayer body 10. In the second preferred embodiment of the present invention, the opening H is provided at the same or substantially the same location in the lamination direction T as the plane in which the discharge path P is provided, on the first side surface WS1 and the second side surface WS2. In the present preferred embodiment of the present invention, the opening H is provided as a continuous portion from the planar discharge path P.

Also in the second preferred embodiment of the present invention, a plurality of cavities 80 to provide the discharge path P are provided in the entire or substantially the entire surface of the dielectric layer 20, i.e., the entire or substantially the entire surface of the plane perpendicular or substantially perpendicular to the stacking direction T between the plurality of dielectric layers 20 including the first main surface-side outer layer portion 12. More specifically, as shown in FIG. 23, the recesses 80 providing the discharge path P are provided over the entire or substantially the entire surface of the first dielectric layer 20A. That is, the discharge path P is provided substantially on the entire surface of the plane perpendicular or substantially perpendicular to the stacking direction T of the first dielectric layer 20A.

As described above, it is preferable that the plurality of cavities 80 are provided in the entire or substantially the entire surface of the dielectric layer 20 which provides at least one of the first main surface-side outer layer portion 12 and the second main surface-side outer layer portion 13. As a result, the total area of the path through which the fluid passes can be increased.

Figure 24:
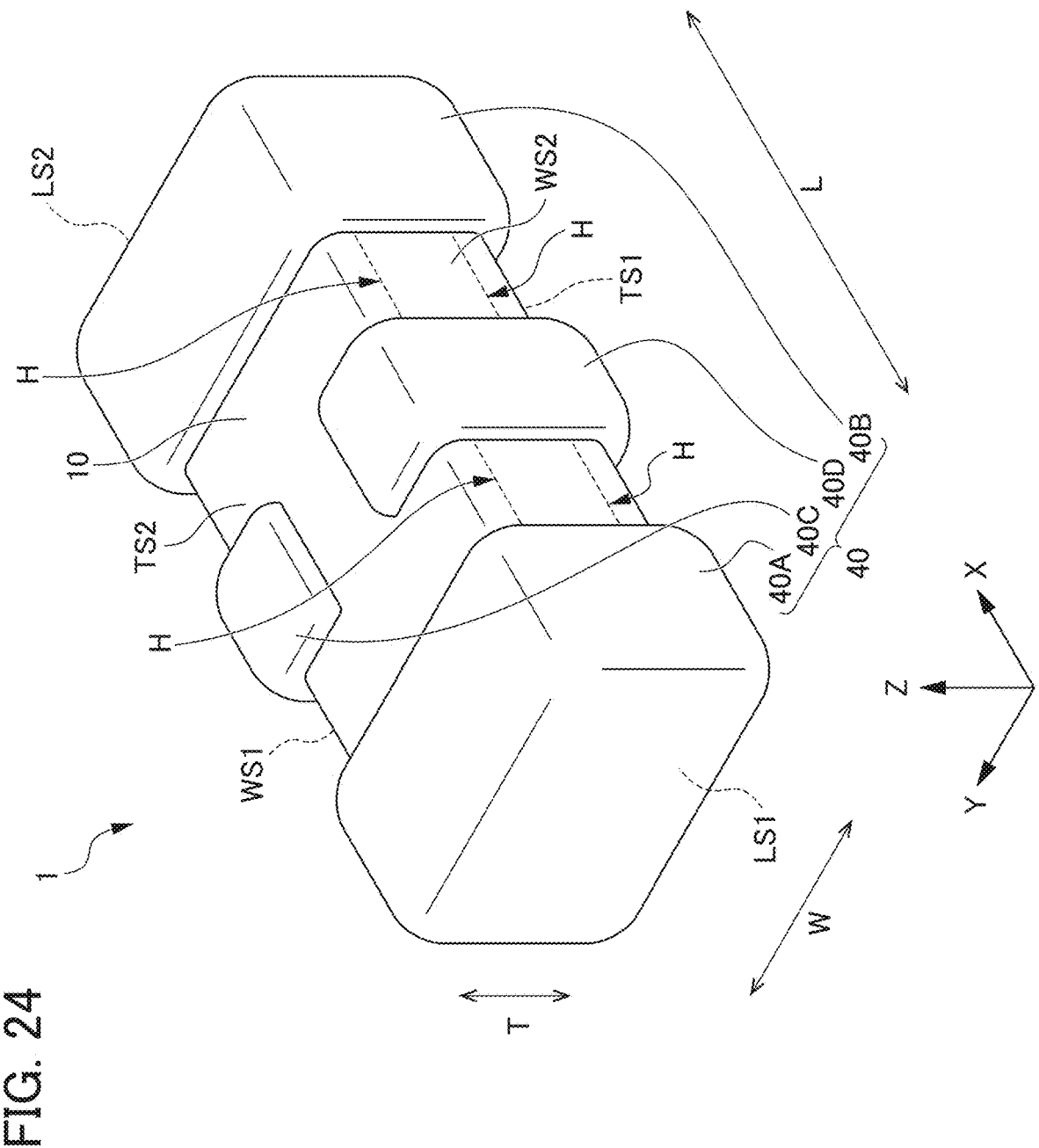
FIG. 24 is an external perspective view of a multilayer ceramic capacitor of a first modified example of the second preferred embodiment of the present invention, and corresponding to FIG. 20.

Hereinafter, a first modified example of the multilayer ceramic capacitor 1 of the present preferred embodiment of the present invention will be described. In the following, components which are the same as or correspond to those of the first preferred embodiment of the present invention are denoted by the same reference numerals, and detailed description thereof is omitted. FIG. 24 is an external perspective view of a multilayer ceramic capacitor 1 of the first modified example of the present preferred embodiment of the present invention, and corresponds to FIG. 20.

In this modified example, a discharge path P is provided on the first main surface-side outer layer portion 12 and the second main surface-side outer layer portion 13 of the multilayer body 10. A discharge path P as shown in FIG. 23 is provided in the second main surface-side outer layer portion 13. The discharge path P shown in FIG. 23 is the same or substantially the same discharge path as the discharge path P provided in the first main surface-side outer layer portion 12.

In the first side surface WS1 and the second side surface WS2, the opening H is also provided in the second main surface-side outer layer portion 13. The opening H is an opening the same as or similar to the opening H provided in the first main surface-side outer layer portion 12. FIG. 24 shows a region of the opening H provided in the first main surface-side outer layer portion 12 in the vicinity of the first main surface TS1, and a region of the opening H provided in the second main surface-side outer layer portion 13 in the vicinity of the second main surface TS2.

In this manner, it is preferable that the discharge paths P are provided in the first main surface-side outer layer portion 12 and the second main surface-side outer layer portion 13. In other words, it is preferable that the discharge paths P are provided on both sides of the first main surface-side outer layer portion 12 and the second main surface-side outer layer portion 13. With such a configuration, it is possible to discharge the hydrogen occluded in the internal electrode layers 30 to the outside of the multilayer ceramic capacitor 1 from not only one of the surfaces, but from the discharge paths P provided on both surfaces of the first main surface-side outer layer portion 12 and the second main surface-side outer layer portion 13. Furthermore, even in a case where the plurality of cavities 80 providing the discharge paths P are provided on both sides of the first main surface-side outer layer portion 12 and the second main surface-side outer layer portion 13, the plurality of cavities 80 is preferably provided in the entire or substantially the entire surface of the first main surface-side outer layer portion 12 and the entire or substantially the entire surface of the second main surface-side outer layer portion 13.

Figure 25A:
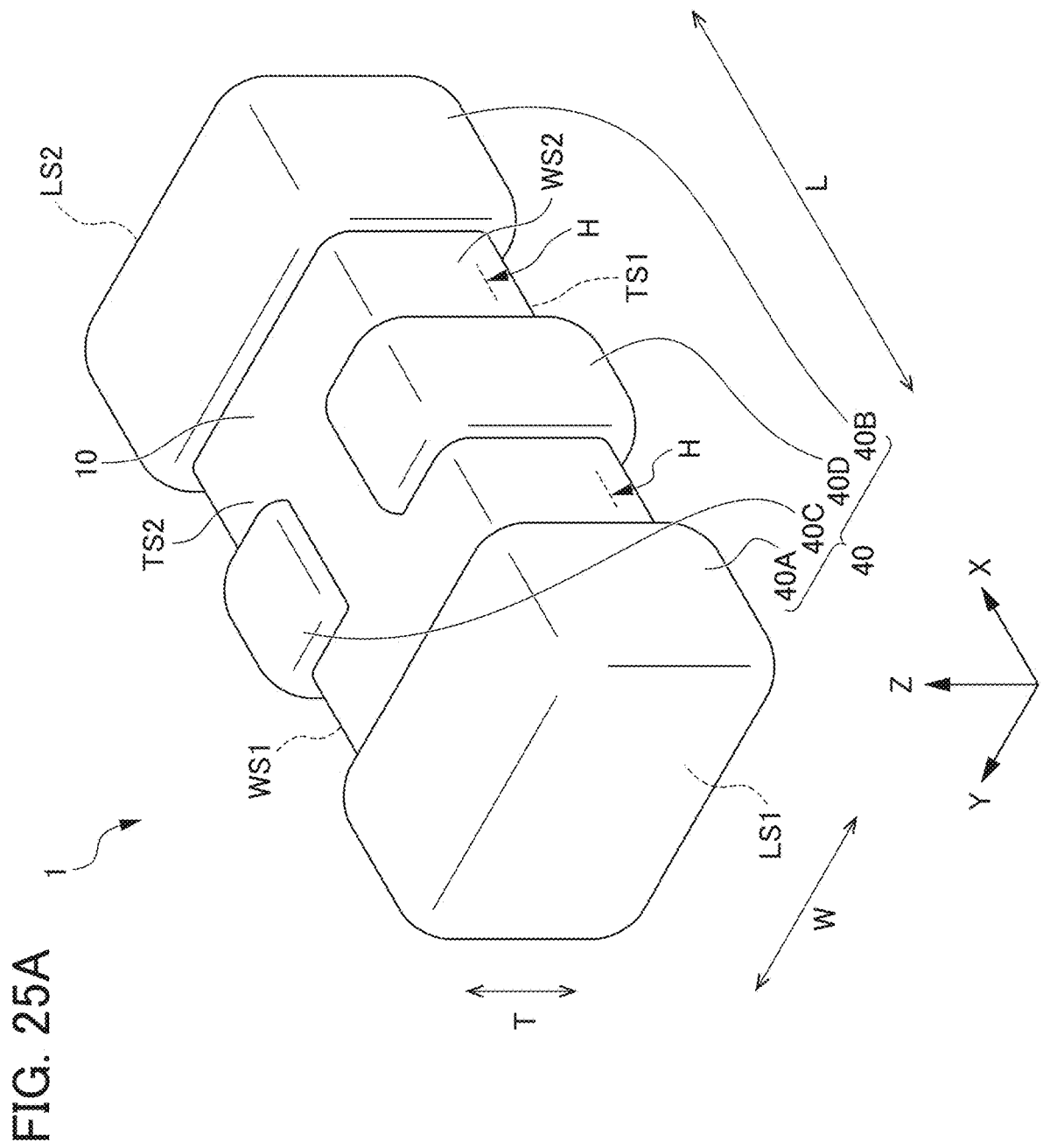
FIG. 25A is an external perspective view of a multilayer ceramic capacitor of a second modified example of the second preferred embodiment of the present invention.
Figure 25B:
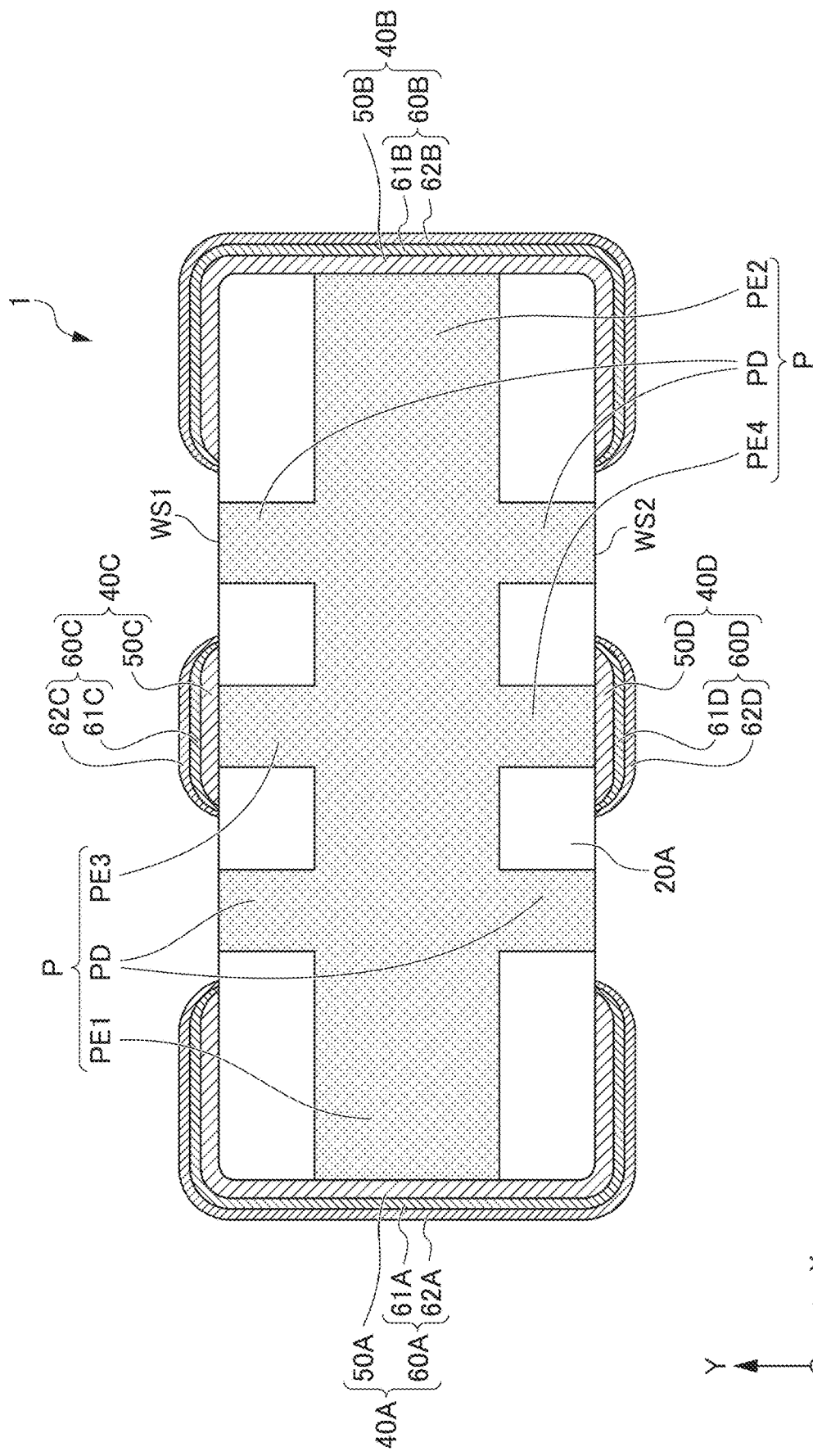
FIG. 25B is an LW cross-sectional view taken along a plane where a discharge path is provided, in the multilayer ceramic capacitor of the second modified example of the second preferred embodiment of the present invention, and corresponding to FIG. 23.

Hereinafter, a second modified example of the multilayer ceramic capacitor 1 of the present preferred embodiment of the present invention will be described. In the following, components which are the same as or correspond to those of the first preferred embodiment of the present invention are denoted by the same reference numerals, and detailed description thereof is omitted. FIG. 25A is an external perspective view of a multilayer ceramic capacitor 1 of the second modified example of the present preferred embodiment of the present invention, and corresponds to FIG. 20. FIG. 25B is an LW cross-sectional view taken along a plane where a discharge path is provided in a multilayer ceramic capacitor of the second modified example of the second preferred embodiment of the present invention, and corresponding to FIG. 23.

The discharge path P is not limited to a path provided by the plurality of cavities 80 provided over the entire or substantially the entire surface of the dielectric layer 20. As shown in this modified example, the region in which the plurality of cavities 80 providing the discharge path P are provided may be a specific region.

For example, the plurality of cavities 80 providing the discharge path P may be provided in the region shown in FIG. 25B, of the surface of the dielectric layer 20 between the plurality of dielectric layers 20 including the first main surface-side outer layer portion 12.

The region in which the recesses 80 defining and functioning as cavities providing the discharge path P are provided includes, for example, a first extension region PE1, a second extension region PE2, a third extension region PE3, a fourth extension region PE4, and discharge extension regions PD. The first extension region PE1 extends toward the first external electrode 40A. The second extension region PE2 extends toward the second external electrode 40B. The third extension region PE3 extends toward the third external electrode 40C. The fourth extension region PE4 extends toward the fourth external electrode 40D. The discharge extension regions PD extend toward the exposed surface of the multilayer body 10. In the example shown in FIG. 25B, the first extension region PE1 extends to the first end surface LS1. The second extension region PE2 extends to the second end surface LS2. The third extension region PE3 extends to the first side surface WS1. The fourth extension region PE4 extends to the second side surface WS2. The discharge extension regions PD extend the first side surface WS1 and the second side surface WS2. The discharge extension regions PD respectively extend to a region between the first external electrode 40A and the third external electrode 40C and a region between the second external electrode 40B and the third external electrode 40C in the first side surface WS1. Furthermore, the discharge extension regions PD respectively extend to a region between the first external electrode 40A and the fourth external electrode 40D and a region between the second external electrode 40B and the fourth external electrode 40D in the second side surface WS2.

The discharge extension regions PD extending to the exposed surface of the multilayer body 10 provide openings H in the exposed surface of the multilayer body 10. FIG. 25A shows the regions of the openings H provided in the first main surface-side outer layer portion 12 in the vicinity of the first main surface TS1. The openings H are preferably provided in at least one of the first side surface WS1 or the second side surface WS2, for example. In this modified example, the openings H are provided in both of the first side surface WS1 and the second side surface WS2.

With such a configuration, a path connecting between the opening H provided in the surface of the multilayer body 10 which is exposed from the external electrode 40 and the first end surface LS1 where the first external electrode 40A is provided, and a path connecting between the opening H provided in the surface of the multilayer body 10 which is exposed from the external electrode 40 and the second end surface LS2 where the second external electrode 40B is provided, are provided as the discharge paths P. Furthermore, a path connecting between the opening H provided on the surface of the multilayer body 10 which is exposed from the external electrode 40, and the region of the first side surface WS1 in which the third external electrode 40C is provided, and a path connecting between the opening H provided on the surface of the multilayer body 10 which is exposed from the external electrode 40 and the region of the second side surface WS2 in which the fourth external electrode 40D is provided, are provided as the discharge paths P. Then, according to the configuration of the present modified example, the contact area of the first dielectric layer 20A and the second dielectric layer 20B is increased. Therefore, it is possible to improve the adhesion between the first dielectric layer 20A and the second dielectric layer 20B between which the discharge path P is provided.

Figure 26:
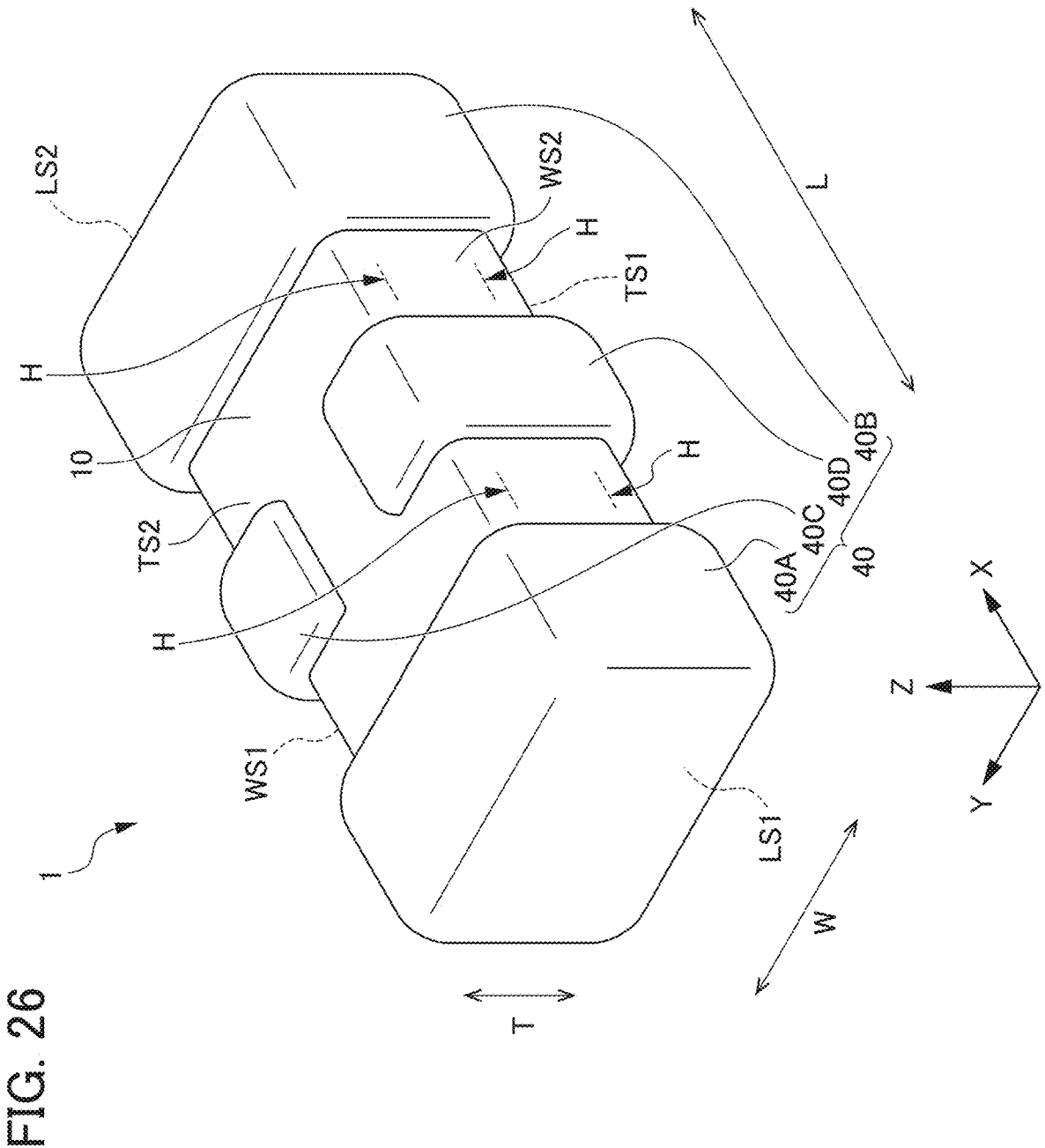
FIG. 26 is an external perspective view of a multilayer ceramic capacitor of a third modified example of the second preferred embodiment of the present invention, and corresponding to FIG. 25A.

Hereinafter, a third modified example of the multilayer ceramic capacitor 1 of the present preferred embodiment of the present invention will be described. In the following, components which are the same as or correspond to those of the second modified example of the preferred embodiment of the present invention are denoted by the same reference numerals, and detailed description thereof is omitted. FIG. 26 is an external perspective view of a multilayer ceramic capacitor 1 of the third modified example of the present preferred embodiment of the present invention, and corresponds to FIG. 25A.

In this modified example, discharge paths P are provided on the first main surface-side outer layer portion 12 and the second main surface-side outer layer portion 13 of the multilayer body 10. The discharge path P as shown in FIG. 25B is also provided in the second main surface-side outer layer portion 13. The discharge path P shown in FIG. 25B is similar to the discharge path P provided in the first main surface-side outer layer portion 12.

In the first side surface WS1 and the second side surface WS2, openings H are provided in the second main surface-side outer layer portion 13. The openings H are the same as or similar to the opening H provided in the first main surface-side outer layer portion 12. FIG. 24 shows a region of the opening H provided in the first main surface-side outer layer portion 12 in the vicinity of the first main surface TS1 and a region of the opening H provided in the second main surface-side outer layer portion 13 in the vicinity of the second main surface TS2.

In this manner, it is preferable that the discharge path P is provided in the first main surface-side outer layer portion 12 and the second main surface-side outer layer portion 13. In other words, it is preferable that the discharge paths P are provided on both sides of the first main surface-side outer layer portion 12 and the second main surface-side outer layer portion 13. With such a configuration, it is possible to discharge the hydrogen occluded in the internal electrode layers 30 to the outside of the multilayer ceramic capacitor 1 from not only one of the surfaces, but from the discharge paths P provided on both surfaces of the first main surface-side outer layer portion 12 and the second main surface-side outer layer portion 13.

According to the multilayer ceramic capacitor 1 of the second preferred embodiment, the following advantageous effects are obtained in addition to the above-mentioned (1) to (7) and (9) to (21).

(8) The plurality of internal electrode layers of the multilayer ceramic capacitor 1 of the present preferred embodiment of the present invention includes the plurality of first internal electrode layers 131 extending toward the first end surface LS1 and the second end surface LS2, and the plurality of second internal electrode layers 132 extending toward the first side surface WS1 and the second side surface WS2, and the external electrodes 40 include the first external electrode 40A provided on the first end surface LS1 and connected to the first internal electrode layers 131, the second external electrode 40B provided on the second end surface LS2 and connected to the first internal electrode layers 131, the third external electrode 40C provided on the first side surface WS1 and connected to the second internal electrode layers 132, and the fourth external electrode 40D provided on the second side surface WS2 and connected to the second internal electrode layers 132. Also in the multilayer ceramic capacitor having such a configuration, the advantageous effects of the present invention can be obtained.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic capacitor comprising:
a multilayer body including a plurality of laminated dielectric layers, a plurality of laminated internal conductive material layers on the dielectric layers, a first main surface and a second main surface which oppose each other in a lamination direction, a first end surface and a second end surface which oppose each other in a length direction perpendicular or substantially perpendicular to the lamination direction, and a first side surface and a second side surface which oppose each other in a width direction perpendicular or substantially perpendicular to the lamination direction and the length direction; and
external electrodes connected to the internal conductive material layers; wherein
the multilayer body further includes:
an inner layer portion including, in the lamination direction, internal conductive material layers from an internal conductive material layer located closest to the first main surface to an internal conductive material layer located closest to the second main surface among the plurality of internal conductive material layers, the plurality of internal conductive material layers opposing each other with respective ones of the plurality of dielectric layers interposed therebetween in the inner layer portion;
a first main surface-side outer layer portion including a plurality of the dielectric layers located between the first main surface and an internal conductive material layer located closest to the first main surface among the plurality of internal conductive material layers; and
a second main surface-side outer layer portion including a plurality of the dielectric layers located between the second main surface and an internal conductive material layer located closest to the second main surface among the plurality of internal conductive material layers;
at least one of the first main surface-side outer layer portion or the second main surface-side outer layer portion includes a discharge path along a plane perpendicular or substantially perpendicular to the lamination direction to discharge a chemical element to outside of the multilayer body; and
the discharge path is included in only the plurality of dielectric layers of the at least one of the first main surface-side outer layer portion or the second main surface-side outer layer portion.

2. The multilayer ceramic capacitor according to claim 1, wherein the discharge path connects between a surface of the multilayer body covered by one of the external electrodes and a surface of the multilayer body exposed from one of the external electrodes.

3. The multilayer ceramic capacitor according to claim 1, wherein the discharge path includes a plurality of cavities in the plane.

4. The multilayer ceramic capacitor according to claim 3, wherein the plurality of cavities each include a spherically curved surface.

5. The multilayer ceramic capacitor according to claim 3, wherein the plurality of cavities each have a height in the lamination direction of about 0.1 µm or more and about 1 µm or less.

6. The multilayer ceramic capacitor according to claim 1, wherein the external electrodes include a first external electrode on the first end surface and a second external electrode on the second end surface.

7. The multilayer ceramic capacitor according to claim 6, wherein
the plurality of internal conductive material layers include a plurality of first internal conductive material layers extending toward the first end surface and a plurality of second internal conductive material layers extending toward the second end surface;
the first external electrode is connected to the first internal conductive material layers; and
the second external electrode is connected to the second internal conductive material layers.

8. The multilayer ceramic capacitor according to claim 6, wherein
the plurality of internal conductive material layers include a plurality of first internal conductive material layers extending toward the first end surface and the second end surface, and a plurality of second internal conductive material layers extending toward the first side surface and the second side surface; and
the external electrodes include the first external electrode on the first end surface and connected to the first internal conductive material layers, the second external electrode on the second end surface and connected to the first internal conductive material layers, a third external electrode on the first side surface and connected to the second internal conductive material layers, and a fourth external electrode on the second side surface and connected to the second internal conductive material layers.

9. The multilayer ceramic capacitor according to claim 6, wherein
the discharge path includes a path connecting between an opening in a surface of the multilayer body which is exposed from one of the external electrodes and the first end surface on which the first external electrode is provided; and
a path connecting between an opening in a surface of the multilayer body which is exposed from one of the external electrodes and the second end surface on which the second external electrode is provided.

10. The multilayer ceramic capacitor according to claim 9, wherein the opening is in at least one of the first side surface and the second side surface, and is located at a same or substantially a same location in the lamination direction as a plane where the discharge path is provided.

11. The multilayer ceramic capacitor according to claim 9, wherein the opening is in either a surface of the first main surface or a surface of the second main surface.

12. The multilayer ceramic capacitor according to claim 6, wherein the first external electrode includes a first base electrode layer on the first end surface and a first plated layer on the first base electrode layer; and
the second external electrode includes a second base electrode layer on the second end surface and a second plated layer on the second base electrode layer.

13. The multilayer ceramic capacitor according to claim 12, wherein
the first base electrode layer is on the first end surface, a portion of the first main surface, a portion of the second main surface, a portion of the first side surface, and a portion of the second side surface;
the second base electrode layer is on the second end surface, a portion of the first main surface, a portion of the second main surface, a portion of the first side surface, and a portion of the second side surface;
the first plated layer is on the first base electrode layer; and
the second plated layer is on the second base electrode layer.

14. The multilayer ceramic capacitor according to claim 12, wherein the first base electrode layer and the second base electrode layer include a metal component and a dielectric material.

15. The multilayer ceramic capacitor according to claim 12, wherein the first plated layer and the second plated layer include at least one of Cu, Ni, and Sn.

16. The multilayer ceramic capacitor according to claim 15, wherein
the first plated layer includes a first Cu plated layer on the first base electrode layer, a first Ni plated layer on the first Cu plated layer, and a first Sn plated layer on the first Ni plated layer; and
the second plated layer includes a second Cu plated layer on the second base electrode layer, a second Ni plated layer on the second Cu plated layer, and a second Sn plated layer on the second Ni plated layer.

17. The multilayer ceramic capacitor according to claim 15, wherein
the first plated layer includes a first Ni plated layer on the first base electrode layer, and a first Sn plated layer on the first Ni plated layer; and
the second plated layer includes a second Ni plated layer on the second base electrode layer and a second Sn plated layer on the second Ni plated layer.

18. The multilayer ceramic capacitor according to claim 15, wherein
the first plated layer includes a first Sn plated layer on the first base electrode layer; and
the second plated layer includes a second Sn plated layer on the second base electrode layer.

19. The multilayer ceramic capacitor according to claim 6, wherein
the first external electrode includes a first plated layer directly on the first end surface; and
the second external electrode includes a second plated layer directly on the second end surface.

20. The multilayer ceramic capacitor according to claim 1, wherein the discharge path is in the first main surface-side outer layer portion and the second main surface-side outer layer portion.

21. A multilayer ceramic capacitor comprising:
a multilayer body including a plurality of laminated dielectric layers, a plurality of laminated internal conductive material layers on the dielectric layers, a first main surface and a second main surface which oppose each other in a lamination direction, a first end surface and a second end surface which oppose each other in a length direction perpendicular or substantially perpendicular to the lamination direction, and a first side surface and a second side surface which oppose each other in a width direction perpendicular or substantially perpendicular to the lamination direction and the length direction; and external electrodes connected to the internal conductive material layers; wherein the multilayer body further includes:

an inner layer portion including, in the lamination direction, internal conductive material layers from an internal conductive material layer located closest to the first main surface to an internal conductive material layer located closest to the second main surface among the plurality of internal conductive material layers, the plurality of internal conductive material layers opposing each other with respective ones of the plurality of dielectric layers interposed therebetween in the inner layer portion;

a first main surface-side outer layer portion including a plurality of the dielectric layers located between the first main surface and an internal conductive material layer located closest to the first main surface among the plurality of internal conductive material layers; and a second main surface-side outer layer portion including a plurality of the dielectric layers located between the second main surface and an internal conductive material layer located closest to the second main surface among the plurality of internal conductive material layers;

at least one of the first main surface-side outer layer portion or the second main surface-side outer layer portion includes a discharge path along a plane perpendicular or substantially perpendicular to the lamination direction to discharge a chemical element to outside of the multilayer body; and the discharge path is not included in any internal conductive material layer.

* * * * *